(12) United States Patent
Baird, III

(10) Patent No.: US 11,734,260 B2
(45) Date of Patent: Aug. 22, 2023

(54) METHODS AND APPARATUS FOR A DISTRIBUTED DATABASE WITHIN A NETWORK

(71) Applicant: Hedera Hashgraph, LLC, Las Vegas, NV (US)

(72) Inventor: Leemon C. Baird, III, Richardson, TX (US)

(73) Assignee: Hedera Hashgraph, LLC, Las Vegas, NV (US)

( * ) Notice: Subject to any disclaimer, the term of this patent is extended or adjusted under 35 U.S.C. 154(b) by 241 days.

(21) Appl. No.: 16/907,616

(22) Filed: Jun. 22, 2020

(65) Prior Publication Data

US 2020/0320064 A1 Oct. 8, 2020

Related U.S. Application Data

(63) Continuation of application No. 15/906,668, filed on Feb. 27, 2018, now Pat. No. 10,747,753, which is a
(Continued)

(51) Int. Cl.
*G06F 16/23* (2019.01)
*G06F 16/28* (2019.01)
(Continued)

(52) U.S. Cl.
CPC ...... *G06F 16/2379* (2019.01); *G06F 11/0709* (2013.01); *G06F 16/1837* (2019.01);
(Continued)

(58) Field of Classification Search
CPC .. G06F 16/2379; G06F 16/1837; G06F 16/28; G06F 16/9014; G06F 16/9024; G06F 11/0709
See application file for complete search history.

(56) References Cited

U.S. PATENT DOCUMENTS 4,309,569 A 1/1982 Merkle
5,701,480 A 12/1997 Raz
(Continued)

FOREIGN PATENT DOCUMENTS

CA 2845306 A1 2/2013
CN 101627395 A 1/2010
(Continued)

OTHER PUBLICATIONS

Non-Final Office Action issued by The United States Patent and Trademark Office for U.S. Appl. No. 15/846,402, dated Aug. 24, 2020, 17 pages.
(Continued)

*Primary Examiner* — Marc S Somers
(74) *Attorney, Agent, or Firm* — Cooley LLP

(57) ABSTRACT

In some embodiments, an apparatus includes an instance of a distributed database at a first compute device configured to be included within a set of compute devices that implement the distributed database. The apparatus also includes a processor configured to define a first event linked to a first set of events. The processor is configured to receive, from a second compute device from the set of compute devices, a signal representing a second event (1) defined by the second compute device and (2) linked to a second set of events. The processor is configured to identify an order associated with a third set of events based at least one a result of a protocol. The processor is configured to store in the instance of the distributed database the order associated with the third set of events.

23 Claims, 19 Drawing Sheets

Related U.S. Application Data continuation of application No. PCT/US2016/049067, filed on Aug. 26, 2016.

(60) Provisional application No. 62/344,682, filed on Jun. 2, 2016, provisional application No. 62/211,411, filed on Aug. 28, 2015.

(51) Int. Cl.
*G06F 16/901* (2019.01)
*G06F 16/182* (2019.01)
*G06F 11/07* (2006.01)

(52) U.S. Cl.
CPC .......... *G06F 16/28* (2019.01); *G06F 16/9014* (2019.01); *G06F 16/9024* (2019.01)

(56) References Cited

U.S. PATENT DOCUMENTS

| | | | |
|---|---|---|---|
| 5,991,414 A | 11/1999 | Garay et al. | |
| 5,999,931 A * | 12/1999 | Breitbart | G06F 16/27 |
| 6,446,092 B1 | 9/2002 | Sutter | |
| 6,457,007 B1 | 9/2002 | Kikuchi et al. | |
| 6,584,476 B1 | 6/2003 | Chatterjee et al. | |
| 6,594,328 B1 | 7/2003 | Chen et al. | |
| 6,966,836 B1 | 11/2005 | Rush et al. | |
| 7,062,490 B2 | 6/2006 | Ady et al. | |
| 7,240,060 B2 | 7/2007 | Ady et al. | |
| 7,555,516 B2 | 6/2009 | Lamport | |
| 7,558,883 B1 | 7/2009 | Lamport | |
| 7,590,632 B1 | 9/2009 | Caronni et al. | |
| 7,797,457 B2 | 9/2010 | Lamport | |
| 7,844,745 B1 | 11/2010 | Darbyshire et al. | |
| 7,849,223 B2 | 12/2010 | Malkhi et al. | |
| 7,890,508 B2 | 2/2011 | Gerber et al. | |
| 8,037,279 B2 | 10/2011 | Schuba et al. | |
| 8,112,452 B2 | 2/2012 | Ady et al. | |
| 8,285,689 B2 | 10/2012 | Du et al. | |
| 8,423,678 B2 | 4/2013 | Darbyshire et al. | |
| 8,478,114 B1 | 7/2013 | Beach et al. | |
| 8,533,169 B1 | 9/2013 | Bailey et al. | |
| 8,533,582 B2 | 9/2013 | Rao et al. | |
| 8,571,519 B2 | 10/2013 | Ginzboorg | |
| 8,600,944 B2 | 12/2013 | Bryant et al. | |
| 8,612,386 B2 | 12/2013 | Tien et al. | |
| 8,654,650 B1 | 2/2014 | Vermeulen et al. | |
| 8,713,038 B2 | 4/2014 | Cohen et al. | |
| 8,732,140 B2 | 5/2014 | Bird et al. | |
| 8,766,980 B2 | 7/2014 | Miyashita et al. | |
| 8,775,464 B2 | 7/2014 | Bulkowski et al. | |
| 8,799,248 B2 | 8/2014 | Bulkowski et al. | |
| 8,862,617 B2 | 10/2014 | Kesselman | |
| 8,868,467 B2 | 10/2014 | Serebrennikov | |
| 8,880,486 B2 | 11/2014 | Driesen et al. | |
| 8,886,601 B1 | 11/2014 | Landau et al. | |
| 8,914,333 B2 | 12/2014 | Bird et al. | |
| 9,189,342 B1 | 11/2015 | Von Thenen et al. | |
| 9,244,717 B2 | 1/2016 | Pissay et al. | |
| 9,251,235 B1 | 2/2016 | Hurst et al. | |
| 9,280,591 B1 | 3/2016 | Kharatishvili et al. | |
| 9,390,154 B1 | 7/2016 | Baird, III | |
| 9,407,516 B2 | 8/2016 | Gordon | |
| 9,529,923 B1 | 12/2016 | Baird, III | |
| 9,568,943 B1 * | 2/2017 | Carman | G06F 3/0619 |
| 9,646,029 B1 | 5/2017 | Baird, III | |
| 9,842,031 B1 | 12/2017 | Kharatishvili | |
| 9,965,731 B2 * | 5/2018 | Dantzig | G06F 9/5038 |
| 10,097,356 B2 | 10/2018 | Zinder | |
| 10,318,505 B2 | 6/2019 | Baird, III | |
| 10,353,888 B1 | 7/2019 | Cogan | |
| 10,354,325 B1 | 7/2019 | Skala et al. | |
| 10,375,037 B2 | 8/2019 | Baird, III et al. | |
| 10,489,385 B2 | 11/2019 | Baird, III et al. | |
| 10,572,455 B2 | 2/2020 | Baird, III | |
| 10,747,753 B2 | 8/2020 | Baird, III | |
| 10,887,096 B2 | 1/2021 | Baird, III | |
| 11,222,006 B2 | 1/2022 | Baird, III | |
| 11,232,081 B2 | 1/2022 | Baird, III | |
| 11,256,832 B2 | 2/2022 | Rorato et al. | |
| 11,475,150 B2 | 10/2022 | Baird, III | |
| 11,537,593 B2 | 12/2022 | Baird, III et al. | |
| 2001/0025351 A1 | 9/2001 | Kursawe et al. | |
| 2002/0129087 A1 | 9/2002 | Cachin et al. | |
| 2002/0143800 A1 | 10/2002 | Lindberg et al. | |
| 2002/0186848 A1 | 12/2002 | Shaik | |
| 2003/0147536 A1 | 8/2003 | Andivahis et al. | |
| 2004/0012630 A1 | 1/2004 | Carels et al. | |
| 2004/0172421 A1 | 9/2004 | Saito et al. | |
| 2005/0038831 A1 | 2/2005 | Souder et al. | |
| 2005/0102268 A1 | 5/2005 | Ady et al. | |
| 2005/0114666 A1 | 5/2005 | Sudia | |
| 2006/0047720 A1 | 3/2006 | Kulkarni et al. | |
| 2006/0136369 A1 | 6/2006 | Douceur et al. | |
| 2006/0168011 A1 | 7/2006 | Lamport | |
| 2006/0212759 A1 * | 9/2006 | Campbell | G06F 11/36 714/38.14 |
| 2007/0050415 A1 | 3/2007 | Amangau et al. | |
| 2007/0165865 A1 | 7/2007 | Talvitie | |
| 2008/0120300 A1 * | 5/2008 | Detlefs | G06F 9/3842 |
| 2008/0220873 A1 | 9/2008 | Lee et al. | |
| 2008/0256078 A1 | 10/2008 | Bhashyam | |
| 2008/0298579 A1 | 12/2008 | Abu-Amara | |
| 2009/0012932 A1 * | 1/2009 | Romem | G06F 11/18 |
| 2009/0150566 A1 | 6/2009 | Malkhi et al. | |
| 2009/0158413 A1 | 6/2009 | Gentry et al. | |
| 2009/0248624 A1 | 10/2009 | Lammel et al. | |
| 2010/0172504 A1 | 7/2010 | Allen et al. | |
| 2010/0198914 A1 | 8/2010 | Gehrke et al. | |
| 2010/0257198 A1 | 10/2010 | Cohen et al. | |
| 2011/0029689 A1 | 2/2011 | Darbyshire et al. | |
| 2011/0173455 A1 | 7/2011 | Spalka et al. | |
| 2011/0191251 A1 | 8/2011 | Al-Herz et al. | |
| 2011/0196834 A1 | 8/2011 | Kesselman | |
| 2011/0196873 A1 | 8/2011 | Kesselman | |
| 2011/0250974 A1 | 10/2011 | Shuster | |
| 2012/0078847 A1 | 3/2012 | Bryant et al. | |
| 2012/0102006 A1 * | 4/2012 | Larson | G06F 16/2365 707/703 |
| 2012/0131093 A1 | 5/2012 | Hamano et al. | |
| 2012/0150802 A1 | 6/2012 | Popov et al. | |
| 2012/0150844 A1 | 6/2012 | Lindahl et al. | |
| 2012/0198450 A1 | 8/2012 | Yang et al. | |
| 2012/0209822 A1 | 8/2012 | Prabhakar et al. | |
| 2012/0233134 A1 | 9/2012 | Barton et al. | |
| 2012/0254163 A1 | 10/2012 | Bandyopadhyay et al. | |
| 2012/0278293 A1 | 11/2012 | Bulkowski et al. | |
| 2012/0303631 A1 | 11/2012 | Bird et al. | |
| 2013/0110767 A1 | 5/2013 | Tatemura et al. | |
| 2013/0145426 A1 | 6/2013 | Wright et al. | |
| 2013/0246377 A1 | 9/2013 | Gaitonde | |
| 2013/0263119 A1 | 10/2013 | Pissay et al. | |
| 2013/0290249 A1 | 10/2013 | Merriman et al. | |
| 2013/0311422 A1 | 11/2013 | Walker et al. | |
| 2014/0012812 A1 | 1/2014 | Zunger | |
| 2014/0025443 A1 | 1/2014 | Onischuk | |
| 2014/0108415 A1 | 4/2014 | Bulkowski et al. | |
| 2014/0222829 A1 | 8/2014 | Bird et al. | |
| 2014/0310243 A1 | 10/2014 | McGee et al. | |
| 2014/0324905 A1 | 10/2014 | Matsumoto | |
| 2014/0337393 A1 | 11/2014 | Burchall et al. | |
| 2015/0067002 A1 | 3/2015 | Shvachko et al. | |
| 2015/0067819 A1 | 3/2015 | Shribman et al. | |
| 2015/0074050 A1 | 3/2015 | Landau et al. | |
| 2015/0172412 A1 | 6/2015 | Escriva et al. | |
| 2015/0186497 A1 | 7/2015 | Patton | |
| 2015/0200774 A1 | 7/2015 | Le Saint | |
| 2015/0242478 A1 | 8/2015 | Cantwell et al. | |
| 2015/0277969 A1 | 10/2015 | Strauss et al. | |
| 2015/0281344 A1 | 10/2015 | Grootwassink et al. | |
| 2015/0294308 A1 | 10/2015 | Pauker et al. | |
| 2016/0085772 A1 | 3/2016 | Vermeulen et al. | |
| 2016/0088424 A1 | 3/2016 | Polo et al. | |
| 2016/0091988 A1 | 3/2016 | Letourneau | |
| 2016/0140548 A1 | 5/2016 | Ahn | |

(56) References Cited

U.S. PATENT DOCUMENTS

| | | | |
|---|---|---|---|
| 2016/0150060 A1* | 5/2016 | Meng | H04L 67/10 709/223 |
| 2016/0205218 A1 | 7/2016 | Tan et al. | |
| 2016/0218875 A1 | 7/2016 | Le Saint et al. | |
| 2016/0241392 A1 | 8/2016 | Vandervort | |
| 2016/0283920 A1 | 9/2016 | Fisher et al. | |
| 2016/0292213 A1 | 10/2016 | Stanfill | |
| 2016/0328429 A1 | 11/2016 | Lipcon | |
| 2016/0342976 A1 | 11/2016 | Davis | |
| 2017/0006097 A1 | 1/2017 | Johnson | |
| 2017/0048261 A1 | 2/2017 | Gmach et al. | |
| 2017/0075938 A1 | 3/2017 | Black et al. | |
| 2017/0116095 A1 | 4/2017 | Schatz et al. | |
| 2017/0132257 A1 | 5/2017 | Baird, III | |
| 2017/0180367 A1 | 6/2017 | Warren | |
| 2017/0300550 A1 | 10/2017 | Emberson et al. | |
| 2017/0308548 A1 | 10/2017 | Baird, III | |
| 2018/0005186 A1 | 1/2018 | Hunn | |
| 2018/0006820 A1 | 1/2018 | Arasu et al. | |
| 2018/0018370 A1 | 1/2018 | Feiks et al. | |
| 2018/0026782 A1 | 1/2018 | Xiao et al. | |
| 2018/0101777 A1 | 4/2018 | Benja-Athon | |
| 2018/0173747 A1 | 6/2018 | Baird, III | |
| 2019/0020629 A1 | 1/2019 | Baird, III et al. | |
| 2019/0034517 A1 | 1/2019 | Byrd | |
| 2019/0042619 A1 | 2/2019 | Baird, III | |
| 2019/0129893 A1 | 5/2019 | Baird, III et al. | |
| 2019/0235946 A1 | 8/2019 | Guo et al. | |
| 2019/0268147 A1 | 8/2019 | Baird, III | |
| 2019/0286623 A1 | 9/2019 | Baird, III | |
| 2020/0012676 A1 | 1/2020 | Singh Narang et al. | |
| 2020/0073758 A1 | 3/2020 | Natarajan et al. | |
| 2020/0097459 A1 | 3/2020 | Baird, III et al. | |
| 2020/0125538 A1 | 4/2020 | Baird, III | |
| 2020/0145387 A1 | 5/2020 | Baird, III et al. | |
| 2020/0320064 A1 | 10/2020 | Baird, III | |
| 2020/0372015 A1 | 11/2020 | Baird, III | |
| 2021/0126780 A1 | 4/2021 | Baird, III | |
| 2021/0209885 A1 | 7/2021 | Lundin et al. | |
| 2022/0107960 A1 | 4/2022 | Baird, III | |
| 2022/0129438 A1 | 4/2022 | Baird, III | |
| 2022/0237312 A1 | 7/2022 | Baird, III et al. | |
| 2022/0391358 A1 | 12/2022 | Baird, III | |

FOREIGN PATENT DOCUMENTS

| | | |
|---|---|---|
| CN | 102419764 A | 4/2012 |
| CN | 102474682 A | 5/2012 |
| CN | 102567453 A | 7/2012 |
| CN | 102819585 A | 12/2012 |
| CN | 103842995 A | 6/2014 |
| CN | 103858123 A | 6/2014 |
| CN | 105681301 A | 6/2016 |
| CN | 106022917 A | 10/2016 |
| CN | 106789095 A | 5/2017 |
| JP | H09-509268 A | 9/1997 |
| JP | 2003-202964 | 7/2003 |
| JP | 2005216167 A | 8/2005 |
| JP | 2010033227 A | 2/2010 |
| JP | 2010146103 A | 7/2010 |
| JP | 2010-225148 A | 10/2010 |
| JP | 2012-027685 A | 2/2012 |
| JP | 5211342 B | 6/2013 |
| JP | 2014506345 A | 3/2014 |
| JP | 2015526832 A | 9/2015 |
| JP | 2016096547 A | 5/2016 |
| JP | 2016519379 A | 6/2016 |
| JP | 2017510002 A | 4/2017 |
| KR | 20100014941 A | 2/2010 |
| KR | 20160140800 A | 12/2016 |
| RU | 2376635 C2 | 12/2009 |
| RU | 2417426 C2 | 4/2011 |
| RU | 2449358 C1 | 4/2012 |
| RU | 2510623-02 | 4/2014 |
| RU | 2560810 C2 | 8/2015 |
| RU | 2595493 C2 | 8/2016 |
| WO | WO 95/14279 A1 | 5/1995 |
| WO | WO 2014/037901 | 3/2014 |
| WO | WO 2015/008377 A1 | 1/2015 |
| WO | WO-2015094329 A1 | 6/2015 |
| WO | WO-2015111152 A1 | 7/2015 |
| WO | WO-2016143095 A1 | 9/2016 |
| WO | WO 2017/040313 A1 | 3/2017 |
| WO | WO-2017176523 A1 | 10/2017 |

OTHER PUBLICATIONS

Office Action issued by the Russian Patent Office for Application No. 2019115233, dated Sep. 24, 2020, 13 pages including English translation.

Office Action issued by the Russian Patent Office for Application No. 2020113415, dated Oct. 5, 2020, 11 pages including English translation.

Examination Report No. 1 issued by the Australian Patent Office for Application No. 2020201827, dated Oct. 13, 2020, 4 pages.

Office Action issued by the Japanese Patent Office for Application No. 2020-065934, dated Oct. 13, 2020, 5 pages including English translation.

Office Action issued by the Canadian Patent office for Application No. 3,027,398, dated Nov. 12, 2020, 5 pages.

Office Action issued by the Chinese Patent Office for Application No. 201880069335.5, dated Nov. 4, 2011, 11 pages including English translation.

Office Action issued by the Indian Patent Office for Application No. 201817007410, dated Nov. 23, 2020, 8 pages.

Non-Final Office Action issued by The United States Patent and Trademark Office for U.S. Appl. No. 16/430,646, dated Dec. 2, 2020, 10 pages.

Tseng, et al., Byzantine Consensus in Directed Graphs. ArXiv, abs/1208.5075. A1, dated Feb. 19, 2014, 33 pages.

Vaidya et al., "Iterative approximate Byzantine consensus in arbitrary directed graphs," In Proceedings of the 2012 ACM symposium on Principles of distributed computing, pp. 365-374 (2012).

Office Action issued by the Korean Patent Office for Application No. 10-2019-7021248, dated Nov. 18, 2020, 10 pages (including English translation).

Office Action issued by the Russian Patent Office for Application No. 2019118333, dated Oct. 2, 2020,18 pages including English translation.

Extended European Search Report issued by the European Patent Office or Application No. 18874680.4, dated Dec. 23, 2020, 9 pages.

Office Action issued by the Chinese Patent Office for Application No. 201910908046.6, dated Jun. 2, 2020, 19 pages including English translation.

Advisory Action issued by The United States Patent and Trademark Office for U.S. Appl. No. 16/405,069, dated Jul. 16, 2020, 10 pages.

Bitcoin—"you-need-to-know" archived Sep. 5, 2015 and retrieved from https://web.archive.org/web/20150905115130/https:// bitcoin.org/en/you-need-to-know on Jul. 13, 2020, 2 pages.

International Search Report and Written Opinion issued by the International Searching Authority for Application No. PCT/US20/34197, dated Jul. 31, 2020, 13 pages.

https://web.archive.org/web/20150811233709/https://en.wikipedia.org/wiki/Paxos_(computer_science). Jun. 17, 2015, 15 pages.

Knutsson et al., "Peer-to-Peer Support tor Massively Multiplayer Games", Department of Computer and Information Science, University of Pennsylvania, IEEE INFOCOM 2004.

GauthierDickey, Chris, et al. "Low latency and cheat-proof event ordering for peer-to-peer games." Proceedings of the 14th international workshop on Network and operating systems support for digital audio and video. ACM, 2004.

GauthierDickey, Chris, Virginia Lo, and Daniel Zappala. "Using n-trees for scalable event ordering in peer-to-peer games." Proceedings of the international workshop on Network and operating systems support for digital audio and video. ACM, 2005.

Lumezanu, Cristian, Neil Spring, and Bobby Bhattacharjee. "Decentralized message ordering for publish/subscribe systems." Proceed-

(56) References Cited

OTHER PUBLICATIONS ings of the ACM/IFIP/USENIX 2006 International Conference on Middleware. Springer-Verlag New York, Inc., 2006.
Moser, Louise E., and Peter M. Melliar-Smith, "Byzantine-resistant total ordering algorithms." Information and Computation 150.1 (1999): 75-111.
Defago, Xavier, et al., "Total Order broadcast and multicast algorithms: Taxonomy and survey." ACM Computing Surveys (CSUR) 36.4 (2004): 372-421.
U.S. Office Action dated Sep. 20, 2016 for U.S. Appl. No. 15/153,011, 18 pages.
Moser, Louise E., and Peter M. Melliar-Smith, "Total Ordering Algorithms for Asynchronous Byzantine Systems," International Workshop on Distributed Algorithms, 1995.
International Search Report and Written Opinion dated Jan. 5, 2017 for International Application No. PCT/US2016/049067, 16 pages.
U.S. Office Action dated May 30, 2017 for U.S. Appl. No. 15/205,688, 9 pages.
U.S. Office Action dated Oct. 26, 2017 for U.S. Appl. No. 15/205,688, 12 pages.
Lamport, Leslie, Robert Shostak, and Marshall Pease. "The Byzantine generals problem." ACM Transactions on Programming Languages and Systems (TOPLAS) 4(3): 382-401 (1982).
Wikipedia, Copy-on-write, Jul. 31, 2015, accessed Oct. 20, 2017 at https://en.wikipedia.org/w/index.php?title=Copy-on-write&oldid=673938951, 3 pages.
International Search Report and Written Opinion dated Feb. 1, 2018 for International Application No. PCT/US17/61135, 14 pages.
International Search Report and Written Opinion dated Mar. 8, 2018 for International Application No. PCT/US1767329, 13 pages.
First Office Action issued by the Australian Patent Office for Patent Application No. 2016316777, dated Mar. 29, 2018, 5 pages.
Office Action issued by the Canadian Patent Office for Application No. 2,996,714, dated Apr. 11, 2018, 7 pages.
Non-Final Office Action issued by The United States Patent and Trademark Office for U.S. Appl. No. 15/205,688, dated Apr. 13, 2018, 9 pages.
Extended European Search Report issued by the European Patent Office for Application No. 16842700.3, dated May 14, 2018, 15 pages.
Reed, "Bitcoin Cooperative Proof--of--Stake," May 21, 2014 (May 21, 2014, Retrieved from the Internet: URL:https://arxiv.org/ftp/arxiv/papers/1405/1405.5741.pdf [retrieved on May 2, 2018], 16 pages.
Nakamoto: "Bitcoin: A Peer-to-Peer Electronic Cash System," Jan. 13, 2009 (Jan. 13, 2009), Retrieved from the Internet: URL:https://web.archive.org/web/20090131115053/http://www.bitcoin.org/bitcoin.pdf [retrieved on Jun. 30, 2017], 9 pages.
Reed, "Bitcoin Cooperative Proof-of-Stake," Feb. 14, 2015 (Feb. 14, 2015), XP055472093, Retrieved from the Internet: URL:https://web.archive.org/web/20150214181302/https://arxiv.org/abs/1405.5741 [retrieved on May 3, 2018], 16 pages.
Extended European Search Report issued by the European Patent Office for U.S. Appl. No. 18/177,122, dated Jul. 31, 2018, 12 pages.
Kwon, J., "Tendermint: Consensus without Mining," Mar. 19, 2015, Retrieved from the Internet: URL:https://web.archive.org/web/2015031903 5333if/http://tendermint.com:80/docs/tendermint.pdf [retrieved on Jul. 19, 2018], 11 pages.
Bonneau et al., SoK: Research Perspectives and Challenges for Bitcoin and Cryptocurrencies, International Association for Cryptologic Research vol. 20150323:173252, 18 pages (2015), DOI: 10.1109/SP.2015.14 [retrieved on Mar. 23, 2015].
Kwon, J., "Tendermint (capture)", Mar. 19, 2015 (Mar. 19, 2015), Retrieved from the Internet: URL:https://web.archive.org/web/20150319035333if_/http://tendermint.com:80/docs/tendermint.pdf [retrieved on Jul. 19, 2018], 1 page.
Extended European Search Report issued by the European Patent Office for Application No. 18177124.7 , dated Jul. 31, 2018, 14 pages.

Extended European Search Report issued by the European Patent Office for Application No. 18177127.0, dated Jul. 31, 2018, 10 pages.
Extended European Search Report issued by the European Patent Office for Application No. 18177129.6, dated Aug. 31, 2018, 12 pages.
Office Action issued by the Korean Patent Office for Application No. 10-2018-7008784, dated Aug. 22, 2018, 4 pages including English translation summary of OA.
Office Action issued by the Japanese Patent Office for Application No. 2018-521625, dated Sep. 26, 2018, 11 pages including English translation.
Invitation to Pay Additional Fees issued by the International Searching Authority for Application No. PCT/US18/41625, dated Sep. 18, 2018, 3 pages.
Non-Final Office Action issued by The United States Patent and Trademark Office for U.S. Appl. No. 16/032,652, dated Oct. 12, 2018, 32 pages.
Notice of Allowance issued by the Canadian Patent Office for Application No. 2,996,714, dated Nov. 8, 2018, 1 page.
Notice of Eligibility for Grant and Supplementary Examination Report issued by the Intellectual Property Office of Singapore for Application No. 11201801311T, dated Nov. 26, 2018, 5 pages.
International Search Report and Written Opinion issued by the International Searching Authority for Application No. PCT/US18/41625, dated Nov. 20, 2018, 18 pages.
Examination Report No. 3 issued by the Australian Patent Office for Application No. 2016316777, dated Dec. 20, 2018, 5 pages.
Alfred V. Aho, John E. Hopcroft, and Jeffrey Ullman. 1983. Data Structures and Algorithms (1st ed.). Addison-Wesley Longman Publishing Co., Inc., Boston, MA, USA, 620 pages.
Notice of Preliminary Rejection issued by the Korean Patent Office for Application 10-2018-7008784, dated Dec. 28, 2018, 4 pages including English translation.
Office Action issued by the Canadian Patent Office for Application No. 3,027,398, dated Jan. 7, 2019, 7 pages.
Invitation to Pay Additional Fees issued by the International Searching Authority for Application No. PCT/US2018/058432, dated Jan. 16, 2019, 2 pages.
Office Action—Restriction Requirement issued by The United States Patent and Trademark Office for U.S. Appl. No. 16/176,125, dated Jan. 19, 2019, 7 pages.
Interview Summary dated Mar. 1, 2019, from The United States Patent and Trademark Office for U.S. Appl. No. 15/205,688, 3 pages.
Sompolinsky, Yonatan and Zohar, Aviv, "Secure High-Rate Transaction Processing in Bitcoin," International Conference on Financial Cryptography and Data Security (FC 2015), Springer,2015, 31 pages cited as 7(16):507-527,<DOI: 10.1007/978-3-662-47854-7_32>.
Supplementary Examination Report and Notice of Eligibility issued by the Singapore Patent Office for Application No. 10201805458P, dated Apr. 8, 2019, 5 pages.
Office Action issued by the Russian Patent Office for Application No. 2018110579, dated Apr. 4, 2019, 14 pages including English translation.
Boneh, "Functional Encryption: A New Vision for Public-Key Cryptography, "Communication of the ACM 55:56-64 (2012).
Office Action issued by the Australian Patent Office for Application No. 2019202138, dated May 15, 2019, 4 pages.
International Preliminary Report on Patentability dated Jun. 25, 2019 for International Application No. PCT/US1767329, 7 pages.
Office Action issued by the European Patent Office for Application No. 18177124.7 , dated Jul. 15, 2019, 9 pages.
Office Action issued by the European Patent Office for Application No. 18177127.0, dated Jul. 15, 2019, 7 pages.
Non-Final Office Action issued by The United States Patent and Trademark Office for U.S. Appl. No. 16/405,069, dated Aug. 6, 2019, 13 pages.
Office Action issued by the Canadian Patent Office for Application No. 3,027,398, dated Aug. 12, 2019, 4 pages.

(56) References Cited

OTHER PUBLICATIONS

Non-Final Office Action issued by The United States Patent and Trademark Office for U.S. Appl. No. 15/366,584, dated Sep. 12, 2019, 6 pages.
Office Action issued by the Japanese Patent Office for Application No. 2019-081303, 4 pages including English translation.
Office Action issued by the European Patent Office for Application No. 16842700.3, dated Nov. 4, 2019, 10 pages.
Office Action issued by the European Patent Office for Application No. 18177122.1, dated Nov. 4, 2019, 9 pages.
Baird, "Hashgraph Consensus: Fair, Fast Byzantine Fault Tolerance," Swirlds Tech Report TR-2016-01, dated May 31, 2016, 24 pages.
Baird et al., "Hedera: A Governing Council & Public Hashgraph Network," Whitepaper, v.1.4, dated Oct. 17, 2018, 76 pages.
Baird, "Hashgraph Consensus: Detailed Examples," Swirlds Tech Report Swirlds-TR-2016-02, dated Dec. 11, 2016, 29 pages.
Office Action issued by the Australian Patent Office for Application No. 2018300147, dated Jan. 15, 2020 2 pages.
International Preliminary Report on Patentability issued by the International Searching Authority for Application No. PCT/US18/41625, dated Jan. 14, 2020, 7 pages.
Examination Report No. 1 issued by the Australian Patent Office for Application No. 2020200149, dated Jan. 29, 2020, 2 pages.
Final Office Action issued by The United States Patent and Trademark Office for U.S. Appl. No. 16/405,069, dated Mar. 6, 2020, 16 pages.
Office Action issued by the Korean Patent Office for Application No. KR10-2020-7003982, dated Feb. 24, 2020, 3 pages, Non-English.
Notice of Allowance issued by The United States Patent and Trademark Office for U.S. Appl. No. 15/906,668, dated May 4, 2020, 6 pages.
International Preliminary Report on Patentability issued by the International Searching Authority for Application No. PCT/US2018/058432, dated May 5, 2020, 7 pages.
Extended European Search Report issued by the European Patent Office for Application No. 17883223.4, dated May 15, 2020, 14 pages.
Lerner, "DagCoin Draft," dated Sep. 11, 2015, 6 pages, Retrieved from the Internet: URL:https://bitslog.files.wordpress.com/2015/09/dagcoin-v41.pdf [retrieved on May 6, 2020].
Wikipedia webpage for Merkle Tree, Retrieved from the Internet: https://en.wikipedia.org/wiki/Merkle_tree, dated May 17, 2020, 5 pages.
Extended European Search Report issued by the European Patent Office for Application No. 17870565.3, dated May 25, 2020, 8 pages.
Office Action issued by the Russian Patent Office for Application No. 2020100003, dated May 29, 2020, 10 pages including English translation.
Office Action issued by the Korean Patent Office for Application No. 10-2020-7014386, dated Jun. 2, 2020, 4 pages including English translation.
Advisory Action issued by The United States Patent and Trademark Office for U.S. Appl. No. 16/430,646, dated Sep. 2, 2021, 3 pages.
Anonymous: "Sammantics," Oct. 30, 2016 (Oct. 30, 2016), pp. 1-164, Retrieved from the Internet: URL:https://web.archive.org/web/2016103018 2822/https://web.archive.org/web/2016103018 [retrieved on Apr. 11, 2022].
Baird et al., "Hedera: A Public Hashgraph Network and Governing Council," WhitePaper V 2.0, Aug. 29, 2019, available from http://tokeninsight.com/api/upload/content/whitepaper/HBAR_en .pdf (Year: 2019), 97 pages.
Examination Report No. 2 issued by the Australian Patent Office for Application No. 2016316777, dated Oct. 30, 2018, 5 pages.
Extended European Search Report issued by the European Patent Office for Application No. 20199607.1, dated Dec. 1, 2020, 14 pages.
Final Office Action issued by The United States Patent and Trademark Office for U.S. Appl. No. 16/430,646, dated May 18, 2021, 13 pages.
Kshemkalyani., et al., "Consensus and agreement algorithms," Distributed computing: principles, algorithms, and systems. Cambridge University Press, pp. 510-531 (2011).
Non-Final Office Action issued by The United States Patent and Trademark Office for U.S. Appl. No. 16/430,646, dated Jan. 26, 2022, 19 pages.
Non-Final Office Action issued by The United States Patent and Trademark Office for U.S. Appl. No. 16/718,299, dated Jul. 2, 2021, 11 pages.
Office Action for Australian Application No. 2021200938, dated Mar. 8, 2022, 3 pages.
Office Action issued by the Canadian Patent Office for Application No. 3,027,398, dated Nov. 8, 2021, 3 pages.
Office Action issued by the Korean Patent Office for Application No. 10-2019-7038923, 6 pages including English translation.
Shirriff, Ken: "Bitcoins the hard way: Using the raw Bitcoin protocol", Oct. 14, 2016 (Oct. 14, 2016), pp. 1-31, Retrieved from the Internet: URL:https://web.archive.org/web/20161014002912/ https://web.archive.org/web/2016101400 s-hard-way-using-raw-bitcoin.html [retrieved on Apr. 12, 2022].
Tang et al., "Improved Hybrid Consensus Scheme with Privacy-Preserving Property," IACR, International Association for Cryptologic Research 2010407:004100, pp. 1-8 (2017).
Final Rejection Office Action for U.S. Appl. No. 16/430,646 dated Sep. 8, 2022, 33 pages.
Office Action issued by The United States Patent and Trademark Office for U.S. Appl. No. 16/430,646, dated Dec. 28, 2022, 7 pages.
Office Action for European Application No. 20199607.1 dated Oct. 19, 2022, 9 pages.
Office Action issued by the Japanese Patent Office for Application No. 2021-076407, dated Jul. 29, 2022, 10 pages including English translation.
Office Action issued by the Canadian Patent Office for Application No. 3,129,804, dated Dec. 28, 2022, 4 pages.
Office Action issued by the Chinese Patent Office for Application No. 201910908023.5, dated Oct. 26, 2022, 11 pages including English translation.
Office Action issued by the Indian Patent Office for Application No. IN20211802182,[8] dated May 5, 2022, 7 pages.

* cited by examiner

| YES | NO | NO | YES | YES |
| Value 411 | Value 412 | Value 413 | Value 414 | Value 415 |

Vector of Values 410

FIG. 9a

| {A, B, C, D} | {A, B, C, E} | {A, B, C, F} | {A, B, F, G} | {A, B, G, H} |
| Value 421 | Value 422 | Value 423 | Value 424 | Value 425 |

Vector of Values 420

FIG. 9b

| 1. Alice | 1. Bob | 1. Bob | 1. Alice | 1. Alice |
| 2. Bob | 2. Alice | 2. Alice | 2. Bob | 2. Bob |
| 3. Chuck | 3. Chuck | 3. Chuck | 3. Chuck | 3. Ed |
| 4. David | 4. David | 4. David | 4. Ed | 4. Chuck |
| 5. Ed | 5. Ed | 5. Frank | 5. David | 5. David |
| 6. Frank | 6. Frank | 6. Ed | 6. Frank | 6. Frank |
| Value 431 | Value 432 | Value 433 | Value 434 | Value 435 |

Vector of Values 430

FIG. 9c

| YES | YES | YES | YES | YES |
|---|---|---|---|---|
| Value 515 | Value 514 | Value 513 | Value 512 | Value 511 |

Vector of Values 510

FIG. 10a

| NO | YES | YES | YES | YES |
|---|---|---|---|---|
| Value 516 | Value 515 | Value 514 | Value 513 | Value 512 |

Vector of Values 520

FIG. 10b

| NO | NO | YES | YES | YES |
|---|---|---|---|---|
| Value 517 | Value 516 | Value 515 | Value 514 | Value 513 |

Vector of Values 530

FIG. 10c

| YES | NO | NO | YES | YES |
|---|---|---|---|---|
| Value 518 | Value 517 | Value 516 | Value 515 | Value 514 |

Vector of Values 540

FIG. 10d

An event is a tuple $e = \{d, h, t, c, s\}$ where:

$$
\begin{aligned}
d &= data(e) &&= \text{the "payload" data, which may include transactions.} \\
h &= hashes(e) &&= \text{a list of hashes of the event's parents, self-parent first.} \\
t &= time(e) &&= \text{creator's claimed date and time of the event's creation.} \\
c &= creator(e) &&= \text{creator's ID number.} \\
s &= sig(e) &&= \text{creator's digital signature of } \{d,h,t,c\}. \\
n &= &&\text{the number of members in the population} \\
m &= 1 + \lfloor 2n/3 \rfloor \\
first &= &&\text{the unique event that has no parents} \\
E &= &&\text{the set of all events} \\
\mathbb{T} &= &&\text{set of all possible } (time, date) \text{ pairs} \\
\mathbb{B} &= \{true, false\} \\
\mathbb{N} &= \{0, 1, 2, ...\}
\end{aligned}
$$

$$
\begin{aligned}
ancestor &: E \times E \to \mathbb{B} \\
selfAncestor &: E \times E \to \mathbb{B} \\
see &: E \times E \to \mathbb{B} \\
stronglySee &: E \times E \to \mathbb{B} \\
parentRound &: E \to \mathbb{N} \\
witness &: E \to \mathbb{B} \\
round &: E \to \mathbb{N} \\
roundDiff &: E \times E \to \mathbb{I} \\
votes &: E \times E \times \mathbb{B} \to \mathbb{N} \\
voteFraction &: E \times E \to \mathbb{R} \\
vote &: E \times E \to \mathbb{B} \\
decide &: E \times E \to \mathbb{B} \\
allFamous &: \mathbb{I} \to 2^E \\
famous &: E \to \mathbb{B} \\
roundReceived &: E \to \mathbb{N} \\
timeReceived &: E \to \mathbb{T}
\end{aligned}
$$

FIG. 16a $$\begin{aligned}
\text{ancestor}(x,y) &= (x=y) \vee (\exists z \in \text{parents}(x) : \text{ancestor}(z,y)) \\
\text{selfAncestor}(x,y) &= \text{ancestor}(x,y) \wedge ((\text{selfParent}(x)=y) \vee \text{selfAncestor}(\text{selfParent}(x),y)) \\
\text{see}(x,y) &= \text{ancestor}(x,y) \wedge \neg(\exists a,b,c \in E : \\
&\quad (\text{ancestor}(y,a) \wedge \text{ancestor}(y,b) \wedge c \in \text{parents}(x) \wedge c \in \text{parents}(b))) \wedge \\
&\quad \text{creator}(a) = \text{creator}(b) = \text{creator}(c) \\
\text{stronglySee}(x,y) &= \text{see}(x,y) \wedge (\exists S \in 2^E : (|S|=m) \wedge (z \in S \iff (\text{see}(x,z) \wedge \text{see}(z,y)))) \\
\text{parentRound}(x) &= \begin{cases} 0 & \text{if } x = first \\ \max_{y \in \text{parents}(x)} \text{round}(y) & \text{otherwise} \end{cases} \\
\text{witness}(x) &= \exists S \in 2^E : (|S|=m \wedge \\
&\quad (\forall y \in S : (\text{round}(y) = \text{parentRound}(x) \wedge \text{stronglySee}(x,y)))) \\
\text{round}(x) &= \begin{cases} 1+\text{parentRound}(x) & \text{if witness}(x) \\ \text{parentRound}(x) & \text{otherwise} \end{cases} \\
\text{roundDiff}(x,y) &= \text{round}(x) - \text{round}(y) \\
\text{votes}(x,y,v) &= |\{z \in E \mid \text{see}(x,y) \wedge \text{roundDiff}(x,z) = 1 \wedge \\
&\quad \text{stronglySee}(x,z) \wedge \text{vote}(z,y) = v\}| \\
\text{voteFraction}(x,y) &= \text{votes}(x,true)/(\text{votes}(x,true)+\text{votes}(x,false)) \\
\text{vote}(x,y) &= \begin{cases} \text{see}(x,y) & \text{if roundDiff}(x,y) = 1 \\ (\text{voteFraction}(x,y) >= 1/2) & \text{if } (\text{roundDiff}(x,y) \bmod 5 \neq 1) \vee \\ & \quad |\text{voteFraction}(x,y) - 1/2| > 1/6 \\ (1 = \text{LSB}(\text{signature}(x))) & \text{otherwise} \end{cases} \\
\text{decide}(x,y) &= \text{vote}(x,y) \wedge (\text{roundDiff}(x,y) \bmod 5 \neq 1) \wedge (\text{voteFraction}(x,y) > 2/3) \\
\text{allFamous}(r) &= \{x \in E \mid \text{famous}(x) \wedge \text{round}(x) = 4\} \\
\text{famous}(x) &= \text{witness}(x) \wedge \exists y \in E : \text{decide}(y,x) \\
\text{roundReceived}(x) &= \min_{r \in \mathbb{S}}(|\{y \in E \mid \text{round}(y) = r \wedge \text{famous}(y) \wedge \text{see}(y,x)\}| / \\
&\quad |\{y \in E \mid \text{round}(y) = r \wedge \text{famous}(y)\}| >= 1/2) \\
\text{timeReceived}(x) &= \text{median}(\{\text{time}(y) \mid y \in E \wedge \text{see}(y,x) \wedge \\
&\quad (\exists z \in E : \text{round}(z) = \text{roundReceived}(x) \wedge \text{selfAncestor}(z,y)) \wedge \\
&\quad \neg(\exists w \in E : \text{selfAncestor}(y,w) \wedge \text{see}(w,x))\})
\end{aligned}$$

FIG. 16b

An event is a tuple $e = \{d, h, t, c, s\}$ where:

$d = data(e)$ = the "payload" data, which may include transactions.
$h = hashes(e)$ = a list of hashes of the event's parents, self-parent first.
$t = time(e)$ = creator's claimed date and time of the event's creation.
$i = creator(e)$ = creator's ID number.
$s = sig(e)$ = creator's digital signature of $\{d,h,t,c\}$.
$n$ = the number of members in the population
$c$ = frequency of coin rounds (e.g., $c = 6$)
$E$ = (the set of all events) $\cup \{\varnothing\}$
$\mathbb{T}$ = set of all possible $(time, date)$ pairs
$\mathbb{B}$ = $\{true, false\}$
$\mathbb{N}$ = $\{0, 1, 2, ...\}$ $$
\begin{aligned}
parents &: E \to 2^E \\
selfParent &: E \to E \\
ancestor &: E \times E \to \mathbb{B} \\
selfAncestor &: E \times E \to \mathbb{B} \\
see &: E \times E \to \mathbb{B} \\
stronglySee &: E \times E \to \mathbb{B} \\
parentRound &: E \to \mathbb{N} \\
roundInc &: E \to \mathbb{B} \\
round &: E \to \mathbb{N} \\
witness &: E \to \mathbb{B} \\
roundDiff &: E \times E \to \mathbb{I} \\
votes &: E \times E \times \mathbb{B} \to \mathbb{N} \\
fractTrue &: E \times E \to \mathbb{R} \\
decide &: E \times E \to \mathbb{B} \\
vote &: E \times E \to \mathbb{B} \\
famous &: E \to \mathbb{B} \\
roundReceived &: E \to \mathbb{N} \\
timeReceived &: E \to \mathbb{T}
\end{aligned}
$$

FIG. 17a $\text{parents}(x)$ = set of parents of event x $\text{selfParent}(x)$ = the self-parent of event x, or $\emptyset$ if none $\text{ancestor}(x,y)$ = $(x \neq \emptyset) \wedge ((x = y) \vee (\exists z \in \text{parents}(x) : \text{ancestor}(z,y)))$ $\text{selfAncestor}(x,y)$ = $(x \neq \emptyset) \wedge ((x = y) \vee \text{selfAncestor}(\text{selfParent}(x),y))$ $\text{see}(x,y)$ = $\text{ancestor}(x,y) \wedge \neg(\exists a,b \in E : \text{creator}(y) = \text{creator}(a) = \text{creator}(b) \wedge \text{ancestor}(x,a) \wedge \text{ancestor}(x,b) \wedge \neg\text{selfAncestor}(a,b) \wedge \neg\text{selfAncestor}(b,a))$ $\text{stronglySee}(x,y)$ = $\text{see}(x,y) \wedge (\exists S \in 2^E : (|S| > 2n/3 \wedge (z \in S \iff (\text{see}(x,z) \wedge \text{see}(z,y))))$ $\text{parentRound}(x)$ = $\max(\{0\} \cup \{\text{round}(y) | y \in \text{parents}(x)\})$ $\text{roundInc}(x)$ = $\exists S \in 2^E : (|S| > 2n/3 \wedge (\forall y \in S : (\text{round}(y) = \text{parentRound}(x) \wedge \text{stronglySee}(x,y))))$ $\text{round}(x)$ = $\text{parentRound}(x) + \begin{cases} 1 & \text{if roundInc}(x) \\ 0 & \text{otherwise} \end{cases}$ $\text{witness}(x)$ = $(\text{selfParent}(x) = \emptyset) \vee (\text{round}(x) > \text{round}(\text{selfParent}(x)))$ $\text{roundDiff}(x,y)$ = $\text{round}(x) - \text{round}(y)$ $\text{votes}(x,y,v)$ = $|\{z \in E | \text{roundDiff}(x,z) = 1 \wedge \text{stronglySee}(x,z) \wedge \text{vote}(z,y) = v\}|$ $\text{fractTrue}(x,y)$ = $\dfrac{\text{votes}(x,y,\text{true})}{(\text{votes}(x,y,\text{true}) + \text{votes}(x,y,\text{false}))}$ $\text{decide}(x,y)$ = $(x \neq \emptyset) \wedge (\text{roundDiff}(x,y) > 1) \wedge (\text{decide}(\text{selfParent}(x),y) \vee (\text{witness}(x) \wedge (\text{roundDiff}(x,y) \mod c \neq 1) \wedge \neg(\frac{1}{3} \leq \text{fractTrue}(x,y) \leq \frac{2}{3})))$ $\text{vote}(x,y)$ = $\begin{cases} \text{vote}(\text{selfParent}(x),y) & \text{if } (\neg\text{witness}(x)) \vee \text{decide}(\text{selfParent}(x),y) \\ 1 = \text{middleBit}(\text{signature}(x)) & \text{if witness}(x) \\ & \wedge \neg\text{decide}(\text{selfParent}(x),y) \\ & \wedge (\text{roundDiff}(x,y) \neq 1) \\ & \wedge (\text{roundDiff}(x,y) \mod c = 1) \\ \text{fractTrue}(x,y) \geq \frac{1}{2} & \text{otherwise} \end{cases}$ $\text{famous}(x)$ = $\text{witness}(x) \wedge \exists y \in E : \text{decide}(y,x) \wedge \text{vote}(y,x)$ $\text{roundReceived}(x)$ = $\min_{r \in \mathbb{R}} \dfrac{|\{y \in E | \text{round}(y) = r \wedge \text{famous}(y) \wedge \text{see}(y,x)\}|}{|\{y \in E | \text{round}(y) = r \wedge \text{famous}(y)\}|} \geq 1/2$ $\text{timeReceived}(x)$ = $\text{median}(\{\text{time}(y) | y \in E \wedge \text{see}(y,x) \wedge (\exists z \in E : \text{round}(z) = \text{roundReceived}(x) \wedge \text{selfAncestor}(z,y)) \wedge \neg(\exists w \in E : \text{selfAncestor}(y,w) \wedge \text{see}(w,x))\})$

FIG. 17b

METHODS AND APPARATUS FOR A DISTRIBUTED DATABASE WITHIN A NETWORK

CROSS-REFERENCE TO RELATED APPLICATIONS

This application is a continuation of U.S. patent application Ser. No. 15/906,668, filed on Feb. 27, 2018, and titled "METHODS AND APPARATUS FOR A DISTRIBUTED DATABASE WITHIN A NETWORK," now U.S. Pat. No. 10,747,753, which is a continuation of PCT Application No. PCT/US2016/049067, filed on Aug. 26, 2016, and titled "METHODS AND APPARATUS FOR A DISTRIBUTED DATABASE WITHIN A NETWORK," which claims priority to and the benefit of U.S. Provisional Patent Application No. 62/211,411, filed Aug. 28, 2015 and titled "METHODS AND APPARATUS FOR A DISTRIBUTED DATABASE WITHIN A NETWORK" and U.S. Provisional Patent Application No. 62/344,682, filed Jun. 2, 2016 and titled "METHODS AND APPARATUS FOR A DISTRIBUTED DATABASE WITH CONSENSUS DETERMINED BASED ON WEIGHTED STAKES," each of which is incorporated herein by reference in its entirety.

BACKGROUND

Embodiments described herein relate generally to a database system and more particularly to methods and apparatus for implementing a database system across multiple devices in a network.

Some known distributed database systems attempt to achieve consensus for values within the distributed database systems (e.g., regarding the order in which transactions occur). For example, an online multiplayer game might have many computer servers that users can access to play the game. If two users attempt to pick up a specific item in the game at the same time, then it is important that the servers within the distributed database system eventually reach agreement on which of the two users picked up the item first.

Such distributed consensus can be handled by methods and/or processes such as the Paxos algorithm or its variants. Under such methods and/or processes, one server of the database system is set up as the "leader," and the leader decides the order of events. Events (e.g., within multiplayer games) are forwarded to the leader, the leader chooses an ordering for the events, and the leader broadcasts that ordering to the other servers of the database system.

Such known approaches, however, use a server operated by a party (e.g., central management server) trusted by users of the database system (e.g., game players). Accordingly, a need exists for methods and apparatus for a distributed database system that does not require a leader or a trusted third party to operate the database system.

Other distributed databases are designed to have no leader, but are inefficient. For example, one such distributed database is based on a "block chain" data structure, which can achieve consensus. Such a system, however, can be limited to a small number of transactions per second total, for all of the participants put together (e.g., 7 transactions per second), which is insufficient for a large-scale game or for many traditional applications of databases. Accordingly, a need exists for a distributed database system that achieves consensus without a leader, and which is efficient.

SUMMARY

In some embodiments, an apparatus includes an instance of a distributed database at a first compute device configured to be included within a set of compute devices that implement the distributed database. The apparatus also includes a processor configured to define a first event linked to a first set of events. The processor is configured to receive, from a second compute device from the set of compute devices, a signal representing a second event (1) defined by the second compute device and (2) linked to a second set of events. The processor is configured to identify an order associated with a third set of events based at least one a result of a protocol. The processor is configured to store in the instance of the distributed database the order associated with the third set of events.

BRIEF DESCRIPTION OF THE DRAWINGS

FIGS. 9a-9c are vector diagrams that illustrate examples of vectors of values.

FIGS. 10a-10d are vector diagrams that illustrate examples of vectors of values being updated to include new values.

FIGS. 16a-16b illustrate an example consensus method for use with a hashDAG, according to an embodiment.

FIGS. 17a-17b illustrate an example consensus method for use with a hashDAG, according to another embodiment.

DETAILED DESCRIPTION

Figure 1:
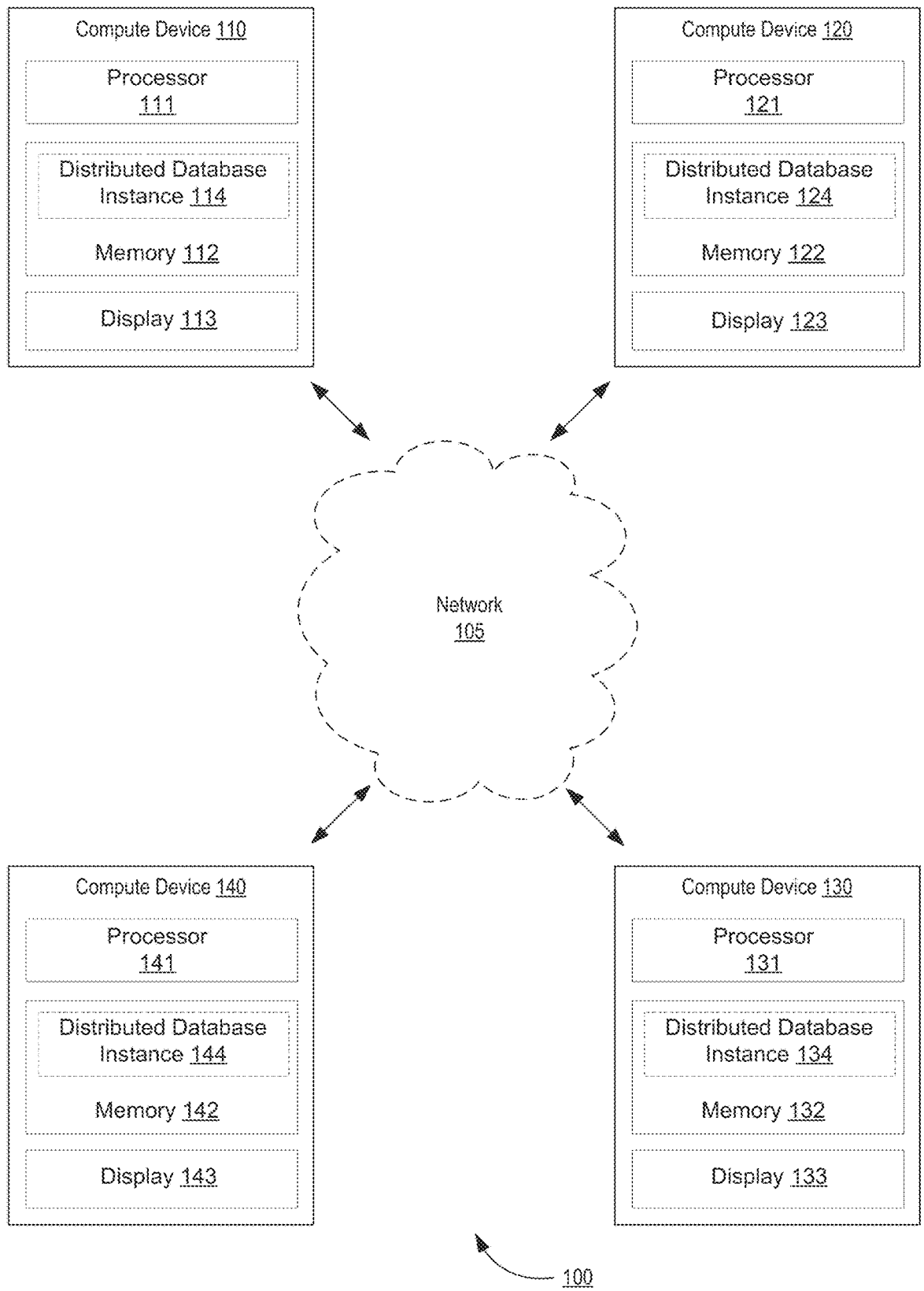
FIG. 1 is a high level block diagram that illustrates a distributed database system, according to an embodiment.

In some embodiments, an apparatus includes an instance of a distributed database at a first compute device configured to be included within a set of compute devices that implement the distributed database via a network operatively coupled to the set of compute devices. The apparatus also includes a processor operatively coupled to the memory storing the instance of the distributed database. The processor is configured to define, at a first time, a first event linked to a first set of events. The processor is configured to receive, at a second time after the first time and from a second compute device from the set of compute devices, a signal representing a second event (1) defined by the second compute device and (2) linked to a second set of events. The processor is configured to identify an order associated with a third set of events based at least one a result of a protocol. Each event from the third set of events being from at least one of the first set of events or the second set of events. The processor is configured to store in the instance of the distributed database the order associated with the third set of events.

In some instances, each event from the third set of events is associated with a set of attributes (e.g., sequence number, generation number, round number, received number, and/or timestamp, etc.). The result of the protocol can include a value for each attribute from the set of attributes for each event from the third set of events. The value for a first attribute from the set of attributes can include a first numeric value and the value for a second attribute from the set of attributes can include a binary value associated with the first numeric value. The binary value for the second attribute (e.g., a round increment value) for an event from the third set of events can be based on whether a relationship between that event and a fourth set of events linked to that event satisfies a criterion (e.g., a number of events strongly identified by that event). Each event from the fourth set of events is (1) an ancestor of the event from the third set of events and (2) associated with a first common attribute as the remaining events from the fourth set of events (e.g., a common round number, an indication of being a round R first event, etc.). The first common attribute can be indicative of a first instance that an event defined by each compute device from the set of compute devices is associated with a first particular value (e.g., an indication of being a round R first event, etc.).

The value for a third attribute (e.g., a received round number) from the set of attributes can include a second numeric value based on a relationship between the event and a fifth set of events linked to the event. Each event from the fifth set of events is a descendant of the event and associated with a second common attribute (e.g., is famous) as the remaining events from the fifth set of events. The second common attribute can be associated with (1) a third common attribute (e.g., being a round R first event or a witness) indicative of a first instance a second event defined by each compute device from the set of compute devices is associated with a second particular value different from the first particular value and (2) a result based on a set of indications. Each indication from the set of indications can be associated with an event from a sixth set of events. Each event from the sixth set of events can be associated with a fourth common attribute indicative of a first instance a third event defined by each compute device from the set of compute devices is associated with a third particular value different from the first particular value and the second particular value. In some instances, the first particular value is a first integer (e.g., a first round number R), the second particular value is a second integer (e.g., a second round number, R+n) greater than the first integer and the third particular value is a third integer (e.g., a third round number, R+n+m) greater than the second integer.

In some embodiments, an apparatus includes a memory and a processor. The memory includes an instance of a distributed database at a first compute device configured to be included within a set of compute devices that implements the distributed database via a network operatively coupled to the set of compute devices. The processor is operatively coupled to the memory storing the instance of the distributed database and is configured to receive a signal representing an event linked to a set of events. The processor is configured to identify an order associated with the set of events based at least on a result of a protocol. The processor is configured to store in the instance of the distributed database the order associated with the set of events.

In some embodiments, a non-transitory processor-readable medium stores code representing instructions to be executed by a processor to receive a signal representing an event linked to a set of events and identify an order associated with the set of events based on a round associated with each event from the set of events and an indication of when to increment the round associated with each event. The code further includes code to cause the processor to store, in an instance of a distributed database at a first compute device configured to be included within a set of compute devices that implements the distributed database via a network operatively coupled to the set of compute devices, the order associated with the set of events. The instance of the distributed database is operatively coupled to the processor In some embodiments, an instance of a distributed database at a first compute device can be configured to be included within a set of compute devices that implements the distributed database via a network operatively coupled to the set of compute devices. The first compute device stores multiple transactions in the instance of a distributed database. A database convergence module can be implemented in a memory or a processor of the first compute device. The database convergence module can be operatively coupled with the instance of the distributed database. The database convergence module can be configured to define, at a first time, a first event linked to a first set of events. Each event from the first set of events is a sequence of bytes and is associated with (1) a set of transactions from multiple sets of transactions, and (b) an order associated with the set of transactions. Each transaction from the set of transactions is from the multiple transactions. The database convergence module can be configured to receive, at a second time after the first time and from a second compute device from the set of compute devices, a second event (1) defined by the second compute device and (2) linked to a second set of events. The database convergence module can be configured to define a third event linked to the first event and the second event. The database convergence module can be configured to identify an order associated with a third set of events based at least on the first set of events and the second set of events. Each event from the third set of events is from at least one of the first set of events or the second set of events. The database convergence module can be configured to identify an order associated with the multiple transactions based at least on (1) the order associated with the third set of events and (2) the order associated with each set of transactions from the multiple sets of transactions. The database convergence module can be configured to store in the instance of the distributed database the order associated with the multiple transactions stored in the first compute device.

In some embodiments, an instance of a distributed database at a first compute device can be configured to be included within a set of compute devices that implements the distributed database via a network operatively coupled to the set of compute devices. A database convergence module can be implemented in a memory or a processor of the first compute device. The database convergence module can be configured to define, at a first time, a first event linked to a first set of events. Each event from the first set of events is a sequence of bytes. The database convergence module can be configured to receive, at a second time after the first time and from a second compute device from the set of compute devices, a second event (1) defined by the second compute device and (2) linked to a second set of events. Each event from the second set of events is a sequence of bytes. The database convergence module can be configured to define a third event linked to the first event and the second event. The database convergence module can be configured to identify an order associated with a third set of events based at least on the first set of events and the second set of events. Each event from the third set of events is from at least one of the first set of events or the second set of events. The database convergence module can be configured to store in the instance of the distributed database the order associated with the third set of events.

In some embodiments, data associated with a first transaction can be received at a first compute device from a set of compute devices that implement a distributed database via a network operatively coupled to the set of compute devices. Each compute device from the set of compute devices has a separate instance of the distributed database. A first transaction order value associated with the first transaction can be defined at a first time. Data associated with a second transaction can be received from a second compute device from the set of compute devices. A set of transactions can be stored in the instance of the distributed database at the first compute device. The set of transactions can include at least the first transaction and the second transaction. A set of transaction order values including at least the first transaction order value and a second transaction order value can be selected at a second time after the first time. The second transaction order value can be associated with the second transaction. A database state variable can be defined based on at least the set of transactions and the set of transaction order values.

In some embodiments, a method includes receiving a first event from an instance of a distributed database at a first compute device from a set of compute devices that implement the distributed database via a network operatively coupled to the set of compute devices. The method further includes defining, based on the first event and a second event, a third event. The third event is linked to a set of events. An order value can be defined for a fourth event based at least in part on a collective stake value associated with the set of events meeting a stake value criterion. The order value can be stored in an instance of the distributed database at a second compute device from the set of compute devices. In some embodiments, the method further includes calculating the collective stake value based on a sum of a set of stake values. Each stake value from the set of stake values is associated with an instance of the distributed database that defined an event from the set of events.

In some embodiments, a method includes receiving a first event from an instance of a distributed database at a first compute device from a set of compute devices that implement the distributed database via a network operatively coupled to the set of compute devices. The method further includes defining, based on the first event and a second event, a third event and determining a first set of events based at least in part on the third event. Each event from the first set of events is a) identified by a second set of vents and b) associated with a first round number. A collective stake value associated with the second set of events meets a first stake value criterion and each event from the second set of events (1) is defined by a different instance of the distributed database and (2) is identified by the third event. A round number for the third event can be calculated based on a determination that a sum of stake values associated with each event from the first set of events meets a second stake value criterion. A round number for the first event corresponds to a second round number greater than the first round number. The method further includes determining a third set of events based on the third event. Each event from the third set of events is a) identified by a fourth set of events including the third event and b) from the first set of events.

Each event from the fourth set of events is defined by a different instance of the distributed database and a collective stake value associated with the fourth set of events meets a third stake value criterion. An order value is then defined for a fourth event based on a collective stake value associated with the third set of events meeting a fourth stake value criterion and the order value can be stored in an instance of the distributed database at a second compute device.

In some embodiments, a set of stake values includes a stake value (1) associated with each instance of the distributed database that defines an event from the second set of events and (2) proportional to an amount of cryptocurrency associated with that instance of the distributed database. The collective stake value associated with the second set of events being based on a sum of stake values from the set of stake values.

In some embodiments, at least one of the first stake value criterion, the second stake value criterion, the third stake value criterion or the fourth stake value criterion is defined based on a collective stake value of the distributed database. Moreover, in some embodiments, the set of compute devices that implement the distributed database at a first time are associated with a set of trusted entities and the set of compute devices that implement the distributed database at a second time after the first time are associated with a set of entities including entities not from the set of trusted entities.

As used herein, a module can be, for example, any assembly and/or set of operatively-coupled electrical components associated with performing a specific function, and can include, for example, a memory, a processor, electrical traces, optical connectors, software (executing in hardware) and/or the like.

As used in this specification, the singular forms "a," "an" and "the" include plural referents unless the context clearly dictates otherwise. Thus, for example, the term "module" is intended to mean a single module or a combination of modules. For instance, a "network" is intended to mean a single network or a combination of networks.

FIG. 1 is a high level block diagram that illustrates a distributed database system 100, according to an embodiment. FIG. 1 illustrates a distributed database 100 implemented across four compute devices (compute device 110, compute device 120, compute device 130, and compute device 140), but it should be understood that the distributed database 100 can use a set of any number of compute devices, including compute devices not shown in FIG. 1. The network 105 can be any type of network (e.g., a local area network (LAN), a wide area network (WAN), a virtual network, a telecommunications network) implemented as a wired network and/or wireless network and used to operatively couple compute devices 110, 120, 130, 140. As described in further detail herein, in some embodiments, for example, the compute devices are personal computers connected to each other via an Internet Service Provider (ISP) and the Internet (e.g., network 105). In some embodiments, a connection can be defined, via network 105, between any two compute devices 110, 120, 130, 140. As shown in FIG. 1, for example, a connection can be defined between compute device 110 and any one of compute device 120, compute device 130, or compute device 140.

In some embodiments, the compute devices 110, 120, 130, 140 can communicate with each other (e.g., send data to and/or receive data from) and with the network via intermediate networks and/or alternate networks (not shown in FIG. 1). Such intermediate networks and/or alternate networks can be of a same type and/or a different type of network as network 105.

Each compute device 110, 120, 130, 140 can be any type of device configured to send data over the network 105 to send and/or receive data from one or more of the other compute devices. Examples of compute devices are shown in FIG. 1. Compute device 110 includes a memory 112, a processor 111, and an output device 113. The memory 112 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 112 of the compute device 110 includes data associated with an instance of a distributed database (e.g., distributed database instance 114). In some embodiments, the memory 112 stores instructions to cause the processor to execute modules, processes and/or functions associated with sending to and/or receiving from another instance of a distributed database (e.g., distributed database instance 124 at compute device 120) a record of a synchronization event, a record of prior synchronization events with other compute devices, an order of synchronization events, a value for a parameter (e.g., a database field quantifying a transaction, a database field quantifying an order in which events occur, and/or any other suitable field for which a value can be stored in a database).

Distributed database instance 114 can, for example, be configured to manipulate data, including storing, modifying, and/or deleting data. In some embodiments, distributed database instance 114 can be a relational database, object database, post-relational database, and/or any other suitable type of database. For example, the distributed database instance 114 can store data related to any specific function and/or industry. For example, the distributed database instance 114 can store financial transactions (of the user of the compute device 110, for example), including a value and/or a vector of values related to the history of ownership of a particular financial instrument. In general, a vector can be any set of values for a parameter, and a parameter can be any data object and/or database field capable of taking on different values. Thus, a distributed database instance 114 can have a number of parameters and/or fields, each of which is associated with a vector of values. The vector of values is used to determine the actual value for the parameter and/or field within that database instance 114.

In some instances, the distributed database instance 114 can also be used to implement other data structures, such as a set of (key, value) pairs. A transaction recorded by the distributed database instance 114 can be, for example, adding, deleting, or modifying a (key, value) pair in a set of (key, value) pairs.

In some instances, the distributed database system 100 or any of the distributed database instances 114, 124, 134, 144 can be queried. For example, a query can consist of a key, and the returned result from the distributed database system 100 or distributed database instances 114, 124, 134, 144 can be a value associated with the key. In some instances, the distributed database system 100 or any of the distributed database instances 114, 124, 134, 144 can also be modified through a transaction. For example, a transaction to modify the database can contain a digital signature by the party authorizing the modification transaction.

The distributed database system 100 can be used for many purposes, such as, for example, storing attributes associated with various users in a distributed identity system. For example, such a system can use a user's identity as the "key," and the list of attributes associated with the users as the "value." In some instances, the identity can be a cryptographic public key with a corresponding private key known to that user. Each attribute can, for example, be digitally signed by an authority having the right to assert that attribute. Each attribute can also, for example, be encrypted with the public key associated with an individual or group of individuals that have the right to read the attribute. Some keys or values can also have attached to them a list of public keys of parties that are authorized to modify or delete the keys or values.

In another example, the distributed database instance 114 can store data related to Massively Multiplayer Games (MMGs), such as the current status and ownership of gameplay items. In some instances, distributed database instance 114 can be implemented within the compute device 110, as shown in FIG. 1. In other instances, the instance of the distributed database is accessible by the compute device (e.g., via a network), but is not implemented in the compute device (not shown in FIG. 1).

The processor 111 of the compute device 110 can be any suitable processing device configured to run and/or execute distributed database instance 114. For example, the processor 111 can be configured to update distributed database instance 114 in response to receiving a signal from compute device 120, and/or cause a signal to be sent to compute device 120, as described in further detail herein. More specifically, as described in further detail herein, the processor 111 can be configured to execute modules, functions and/or processes to update the distributed database instance 114 in response to receiving a synchronization event associated with a transaction from another compute device, a record associated with an order of synchronization events, and/or the like. In other embodiments, the processor 111 can be configured to execute modules, functions and/or processes to update the distributed database instance 114 in response to receiving a value for a parameter stored in another instance of the distributed database (e.g., distributed database instance 124 at compute device 120), and/or cause a value for a parameter stored in the distributed database instance 114 at compute device 110 to be sent to compute device 120. In some embodiments, the processor 111 can be a general purpose processor, a Field Programmable Gate Array (FPGA), an Application Specific Integrated Circuit (ASIC), a Digital Signal Processor (DSP), and/or the like.

The display 113 can be any suitable display, such as, for example, a liquid crystal display (LCD), a cathode ray tube display (CRT) or the like. In other embodiments, any of compute devices 110, 120, 130, 140 includes another output device instead of or in addition to the displays 113, 123, 133, 143. For example, any one of the compute devices 110, 120, 130, 140 can include an audio output device (e.g., a speaker), a tactile output device, and/or the like. In still other embodiments, any of compute devices 110, 120, 130, 140 includes an input device instead of or in addition to the displays 113, 123, 133, 143. For example, any one of the compute devices 110, 120, 130, 140 can include a keyboard, a mouse, and/or the like.

The compute device 120 has a processor 121, a memory 122, and a display 123, which can be structurally and/or functionally similar to the processor 111, the memory 112, and the display 113, respectively. Also, distributed database instance 124 can be structurally and/or functionally similar to distributed database instance 114.

The compute device 130 has a processor 131, a memory 132, and a display 133, which can be structurally and/or functionally similar to the processor 111, the memory 112, and the display 113, respectively. Also, distributed database instance 134 can be structurally and/or functionally similar to distributed database instance 114.

The compute device 140 has a processor 141, a memory 142, and a display 143, which can be structurally and/or functionally similar to the processor 111, the memory 112, and the display 113, respectively. Also, distributed database instance 144 can be structurally and/or functionally similar to distributed database instance 114.

Even though compute devices 110, 120, 130, 140 are shown as being similar to each other, each compute device of the distributed database system 100 can be different from the other compute devices. Each compute device 110, 120, 130, 140 of the distributed database system 100 can be any one of, for example, a computing entity (e.g., a personal computing device such as a desktop computer, a laptop computer, etc.), a mobile phone, a personal digital assistant (PDA), and so forth. For example, compute device 110 can be a desktop computer, compute device 120 can be a smartphone, and compute device 130 can be a server.

In some embodiments, one or more portions of the compute devices 110, 120, 130, 140 can include a hardware-based module (e.g., a digital signal processor (DSP), a field programmable gate array (FPGA)) and/or a software-based module (e.g., a module of computer code stored in memory and/or executed at a processor). In some embodiments, one or more of the functions associated with the compute devices 110, 120, 130, 140 (e.g., the functions associated with the processors 111, 121, 131, 141) can be included in one or more modules (see, e.g., FIG. 2).

The properties of the distributed database system 100, including the properties of the compute devices (e.g., the compute devices 110, 120, 130, 140), the number of compute devices, and the network 105, can be selected in any number of ways. In some instances, the properties of the distributed database system 100 can be selected by an administrator of distributed database system 100. In other instances, the properties of the distributed database system 100 can be collectively selected by the users of the distributed database system 100.

Because a distributed database system 100 is used, no leader is appointed among the compute devices 110, 120, 130, and 140. Specifically, none of the compute devices 110, 120, 130, or 140 are identified and/or selected as a leader to settle disputes between values stored in the distributed database instances 111, 12, 131, 141 of the compute devices 110, 120, 130, 140. Instead, using the event synchronization processes, the voting processes and/or methods described herein, the compute devices 110, 120, 130, 140 can collectively converge on a value for a parameter.

Not having a leader in a distributed database system increases the security of the distributed database system. Specifically, with a leader there is a single point of attack and/or failure. If malicious software infects the leader and/or a value for a parameter at the leader's distributed database instance is maliciously altered, the failure and/or incorrect value is propagated throughout the other distributed database instances. In a leaderless system, however, there is not a single point of attack and/or failure. Specifically, if a parameter in a distributed database instance of a leaderless system contains a value, the value will change after that distributed database instance exchanges values with the other distributed database instances in the system, as described in further detail herein. Additionally, the leaderless distributed database systems described herein increase the speed of convergence while reducing the amount of data sent between devices as described in further detail herein.

Figure 2:
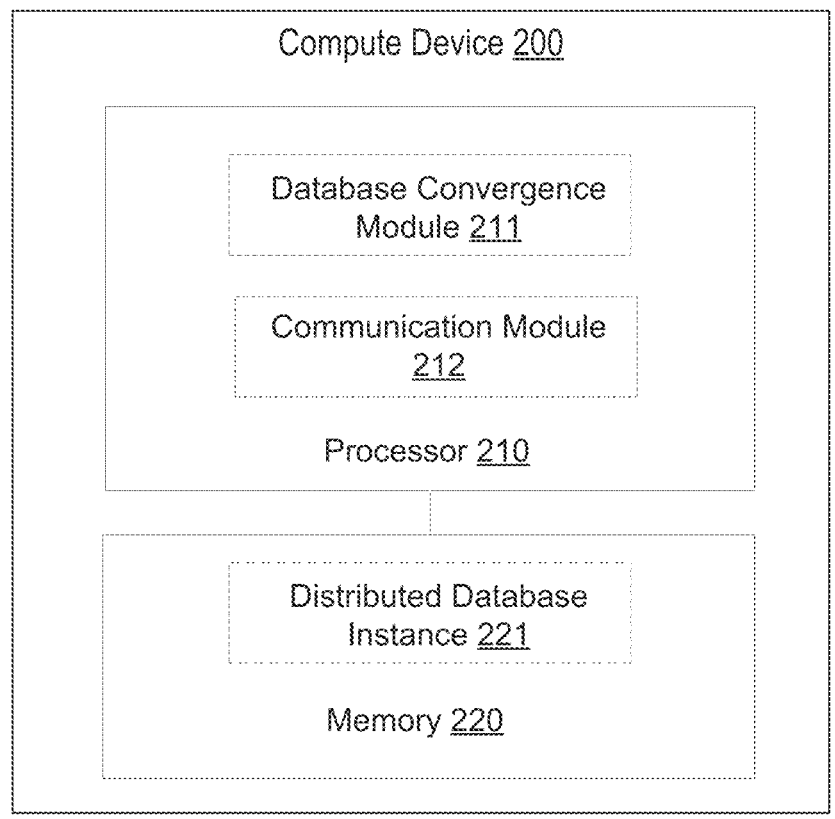
FIG. 2 is a block diagram that illustrates a compute device of a distributed database system, according to an embodiment.

FIG. 2 illustrates a compute device 200 of a distributed database system (e.g., distributed database system 100), according to an embodiment. In some embodiments, compute device 200 can be similar to compute devices 110, 120, 130, 140 shown and described with respect to FIG. 1. Compute device 200 includes a processor 210 and a memory 220. The processor 210 and memory 220 are operatively coupled to each other. In some embodiments, the processor 210 and memory 220 can be similar to the processor 111 and memory 112, respectively, described in detail with respect to FIG. 1. As shown in FIG. 2, the processor 210 includes a database convergence module 211 and communication module 210, and the memory 220 includes a distributed database instance 221. The communication module 212 enables compute device 200 to communicate with (e.g., send data to and/or receive data from) other compute devices. In some embodiments, the communication module 212 (not shown in FIG. 1) enables compute device 110 to communicate with compute devices 120, 130, 140. Communication module 210 can include and/or enable, for example, a network interface controller (NIC), wireless connection, a wired port, and/or the like. As such, the communication module 210 can establish and/or maintain a communication session between the compute device 200 and another device (e.g., via a network such as network 105 of FIG. 1 or the Internet (not shown)). Similarly stated, the communication module 210 can enable the compute device 200 to send data to and/or receive data from another device.

In some instances, the database convergence module 211 can exchange events and/or transactions with other computing devices, store events and/or transactions that the database convergence module 211 receives, and calculate an ordering of the events and/or transactions based on the partial order defined by the pattern of references between the events. Each event can be a record containing a cryptographic hash of two earlier events (linking that event to the two earlier events and their ancestor events, and vice versa), payload data (such as transactions that are to be recorded), other information such as the current time, a timestamp (e.g., date and UTC time) that its creator asserts is the time the event was first defined, and/or the like. In some instances, the first event defined by a member only includes a hash of a single event defined by another member. In such instances, the member does not yet have a prior self-hash (e.g., a hash of an event previously defined by that member). In some instances, the first event in a distributed database does not include a hash of any prior event (since there is no prior event for that distributed database).

In some embodiments, such a cryptographic hash of the two earlier events can be a hash value defined based on a cryptographic hash function using an event as an input. Specifically, in such embodiments, the event includes a particular sequence or string of bytes (that represent the information of that event). The hash of an event can be a value returned from a hash function using the sequence of bytes for that event as an input. In other embodiments, any other suitable data associated with the event (e.g., an identifier, serial number, the bytes representing a specific portion of the event, etc.) can be used as an input to the hash function to calculate the hash of that event. Any suitable hash function can be used to define the hash. In some embodiments, each member uses the same hash function such that the same hash is generated at each member for a given event. The event can then be digitally signed by the member defining and/or creating the event.

In some instances, the set of events and their interconnections can form a Directed Acyclic Graph (DAG). In some instances, each event in a DAG references two earlier events (linking that event to the two earlier events and their ancestor events and vice versa), and each reference is strictly to earlier ones, so that there are no loops. In some embodiments, the DAG is based on cryptographic hashes, so the data structure can be called a hashDAG. The hashDAG directly encodes a partial order, meaning that event X is known to come before event Y if Y contains a hash of X, or if Y contains a hash of an event that contains a hash of X, or for such paths of arbitrary length. If, however, there is no path from X to Y or from Y to X, then the partial order does not define which event came first. Therefore, the database convergence module can calculate a total order from the partial order. This can be done by any suitable deterministic function that is used by the compute devices, so that the compute devices calculate the same order. In some embodiments, each member can recalculate this order after each sync, and eventually these orders can converge so that a consensus emerges.

A consensus algorithm can be used to determine the order of events in a hashDAG and/or the order of transactions stored within the events. The order of transactions in turn can define a state of a database as a result of performing those transactions according to the order. The defined state of the database can be stored as a database state variable.

In some instances, the database convergence module can use the following function to calculate a total order from the partial order in the hashDAG. For each of the other compute devices (called "members"), the database convergence module can examine the hashDAG to discover an order in which the events (and/or indications of those events) were received by that member. The database convergence module can then calculate as if that member assigned a numeric "rank" to each event, with the rank being 1 for the first event that member received, 2 for the second event that member received, and so on. The database convergence module can do this for each member in the hashDAG. Then, for each event, the database convergence module can calculate the median of the assigned ranks, and can sort the events by their medians. The sort can break ties in a deterministic manner, such as sorting two tied events by a numeric order of their hashes, or by some other method, in which the database convergence module of each member uses the same method. The result of this sort is the total order.

Figure 6:
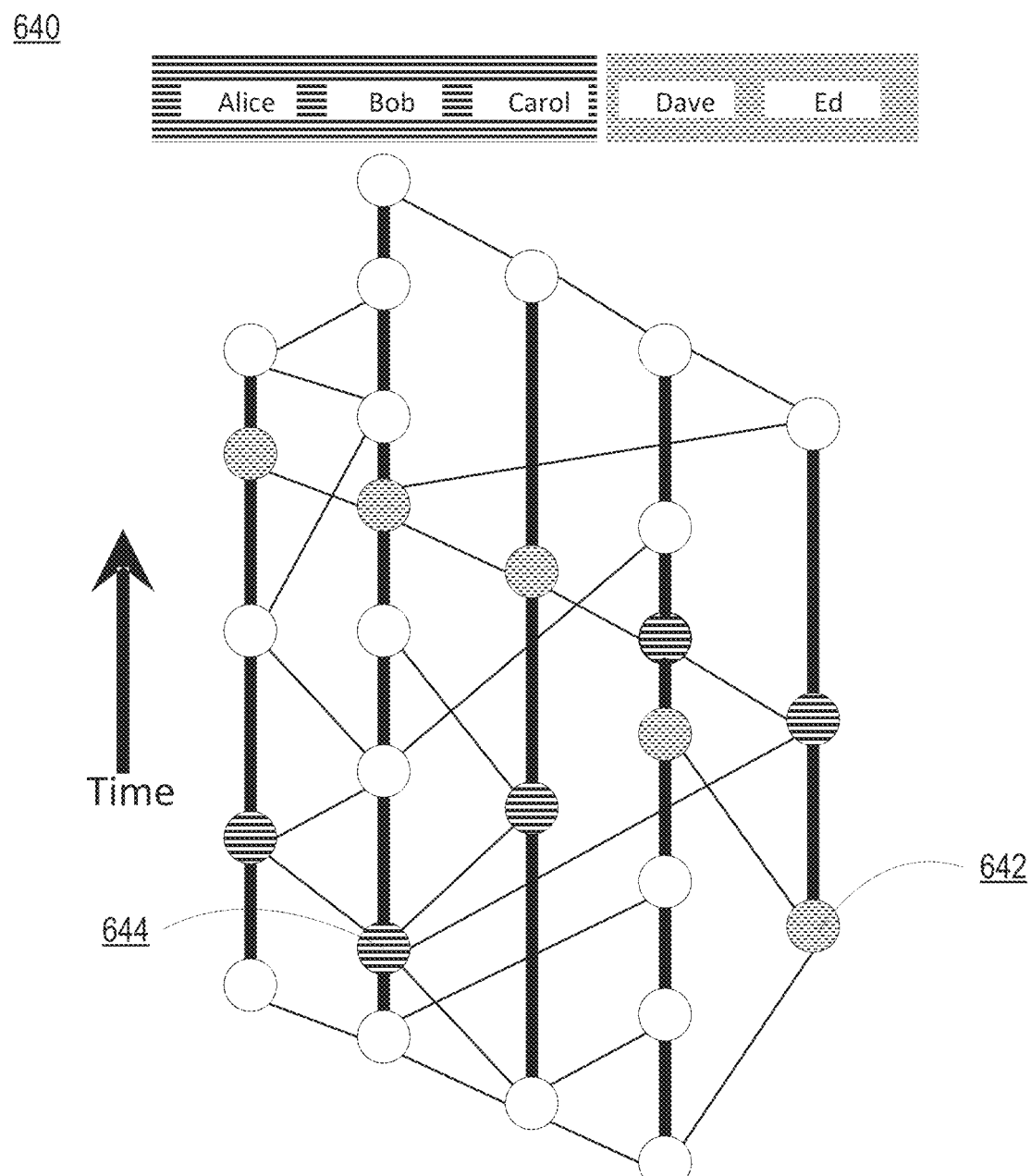

FIG. 6 illustrates a hashDAG 640 of one example for determining a total order. HashDAG 640 illustrates two events (the lowest striped circle and lowest dotted circle) and the first time each member receives an indication of those events (the other striped and dotted circles). Each member's name at the top is colored by which event is first in their slow order. There are more striped initial votes than dotted, therefore consensus votes for each of the members are striped. In other words, the members eventually converge to an agreement that the striped event occurred before the dotted event.

In this example, the members (compute devices labeled Alice, Bob, Carol, Dave and Ed) will work to define a consensus of whether event 642 or event 644 occurred first. Each striped circle indicates the event at which a member first received an event 644 (and/or an indication of that event 644). Similarly, each dotted circle indicates the event at which a member first received an event 642 (and/or an indication of that event 642). As shown in the hashDAG 640, Alice, Bob and Carol each received event 644 (and/or an indication of event 644) prior to event 642. Dave and Ed both received event 642 (and/or an indication of event 642) prior to event 644 (and/or an indication of event 644). Thus, because a greater number of members received event 644 prior to event 642, the total order can be determined by each member to indicate that event 644 occurred prior to event 642.

In other instances, the database convergence module can use a different function to calculate the total order from the partial order in the hashDAG. In such embodiments, for example, the database convergence module can use the following functions to calculate the total order, where a positive integer Q is a parameter shared by the members.

creator(x)=the member who created event x anc(x)=the set of events that are ancestors of x, including x itself other(x)=the event created by the member who synced just before x was created self(x)=the last event before x with the same creator self (x,0)=self (x)

self (x, n)=self (self (X), n−1)

order (x,y)=k, where y is the kth event that creator(x) learned of last(x) $\{y | y \in anc(x) \wedge \neg \exists z \in anc(x), (y \in anc(z) \wedge creator(y) = creator(z))\}$ $$\text{slow}(x, y) = \begin{cases} \infty & \text{if } y \notin anc(x) \\ \text{order }(x, y) & \text{if } y \in anc(x) \wedge y \notin anc(\text{self}(x)) \\ \text{fast }(x, y) & \text{if } \forall i \in \{1, \ldots, Q\}, \\ & \text{fast}(x, y) = \text{fast}(\text{self}(x, i), y) \\ \text{slow}(\text{self }(x), y) & \text{otherwise} \end{cases}$$

fast(x, y) = the position of y in a sorted list, with element $z \in anc(x)$ sorted by $\underset{w \in last(x)}{\text{median}}$ slow(w, z) and with ties broken by the hash of each event In this embodiment, fast(x,y) gives the position of y in the total order of the events, in the opinion of creator(x), substantially immediately after x is created and/or defined. If Q is infinity, then the above calculates the same total order as in the previously described embodiment. If Q is finite, and all members are online, then the above calculates the same total order as in the previously described embodiment. If Q is finite and a minority of the members are online at a given time, then this function allows the online members to reach a consensus among themselves that will remain unchanged as new members come online slowly, one by one. If, however, there is a partition of the network, then the members of each partition can come to their own consensus. Then, when the partition is healed, the members of the smaller partition will adopt the consensus of the larger partition.

Figure 14:
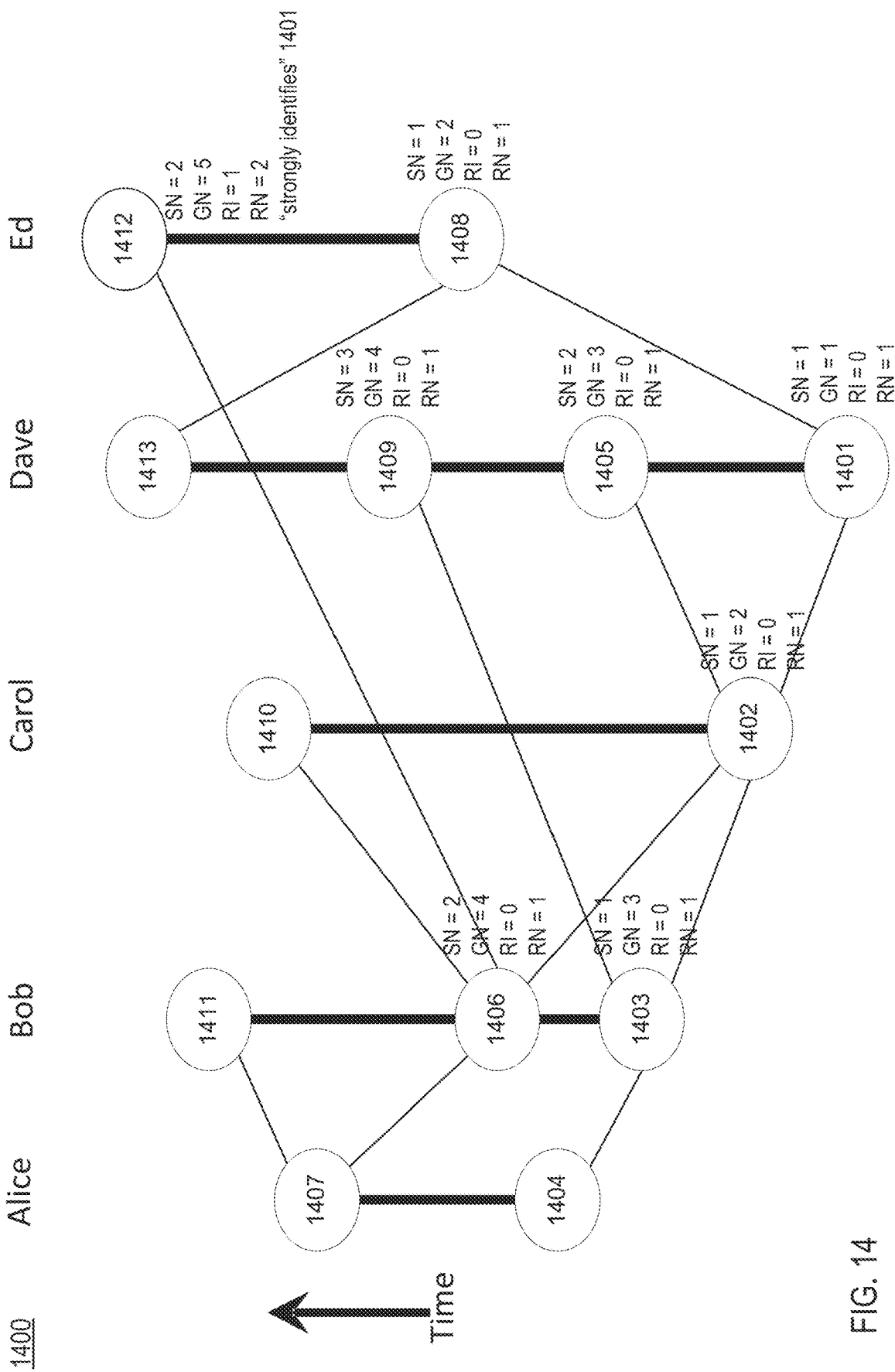
FIG. 14 is an example of a hashDAG, according to an embodiment.
Figure 15:
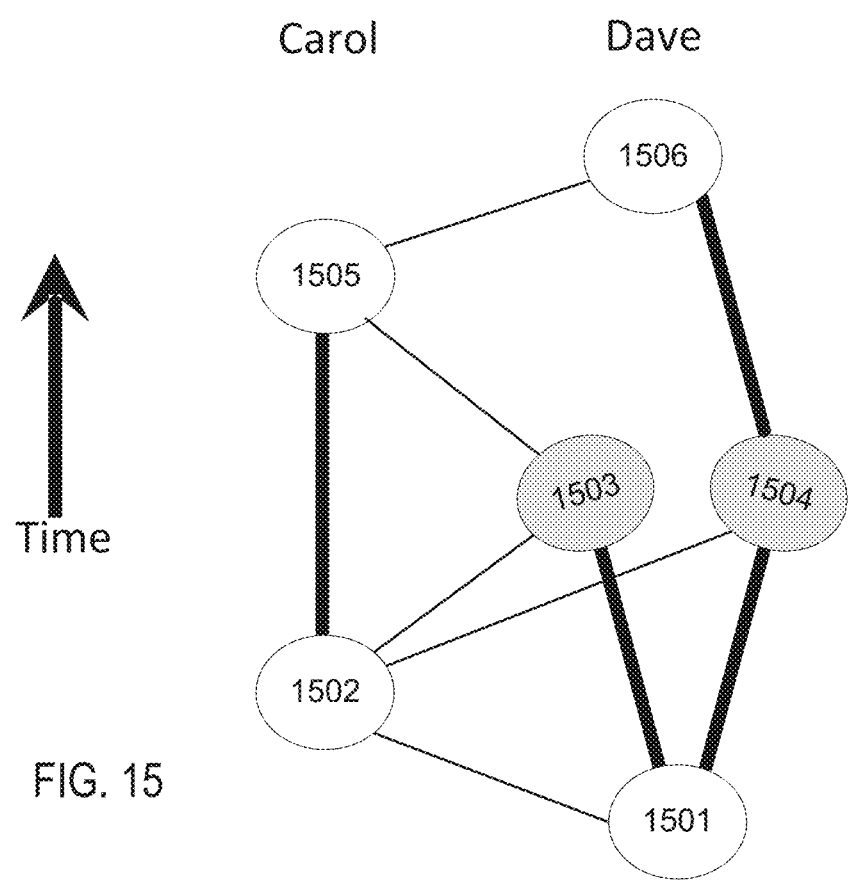
FIG. 15 is an example of a hashDAG, according to an embodiment.

In still other instances, as described with respect to FIGS. 14-17b, the database convergence module can use yet a different function to calculate the total order from the partial order in the hashDAG. As shown in FIGS. 14-15, each member (Alice, Bob, Carol, Dave and Ed) creates and/or defines events (1401-1413 as shown in FIG. 14; 1501-1506 shown in FIG. 15). Using the function and sub-functions described with respect to FIGS. 14-17b, the total order for the events can be calculated by sorting the events by their received round (also referred to herein as an order value), breaking ties by their received timestamp, and breaking those ties by their signatures, as described in further detail herein. In other instances, the total order for the events can be calculated by sorting the events by their received round, breaking ties by their received generation (instead of their received timestamp), and breaking those ties by their signatures. The following paragraphs specify functions used to calculate and/or define an event's received round and received generation to determine an order for the events. The following terms are used and illustrated in connection with FIGS. 14-17*b*.

"Parent": an event X is a parent of event Y if Y contains a hash of X. For example, in FIG. 14, the parents of event 1412 include event 1406 and event 1408.

"Ancestor": the ancestors of an event X are X, its parents, its parents' parents, and so on. For example, in FIG. 14, the ancestors of event 1412 are events 1401, 1402, 1403, 1406, 1408, and 1412. Ancestors of an event can be said to be linked to that event and vice versa.

"Descendant": the descendants of an event X are X, its children, its children's children, and so on. For example, in FIG. 14, the descendants of event 1401 are every event shown in the figure. For another example, the descendants of event 1403 are events 1403, 1404, 1406, 1407, 1409, 1410, 1411, 1412 and 1413. Descendants of an event can be said to be linked to that event and vice versa.

"N": the total number of members in the population. For example, in FIG. 14, the members are compute devices labeled Alice, Bob, Carol, Dave and Ed, and N is equal to five.

"M": the least integer that is more than a certain percentage of N (e.g., more than $2/3$ of N). For example, in FIG. 14, if the percentage is defined to be $2/3$, then M is equal to four. In other instances, M could be defined, for example, to be a different percentage of N (e.g., $1/3$, $1/2$, etc.), a specific predefined number, and/or in any other suitable manner.

"Self-parent": the self-parent of an event X is its parent event Y created and/or defined by the same member. For example, in FIG. 14, the self-parent of event 1405 is 1401.

"Self-ancestor": the self-ancestors of an event X are X, its self-parent, its self-parent's self-parent, and so on.

"Sequence Number" (or "SN"): an integer attribute of an event, defined as the Sequence Number of the event's self-parent, plus one. For example, in FIG. 14, the self-parent of event 1405 is 1401. Since the Sequence Number of event 1401 is one, the Sequence Number of event 1405 is two (i.e., one plus one).

"Generation Number" (or "GN"): an integer attribute of an event, defined as the maximum of the Generation Numbers of the event's parents, plus one. For example, in FIG. 14, event 1412 has two parents, events 1406 and 1408, having Generation Numbers four and two, respectively. Thus, the Generation Number of event 1412 is five (i.e., four plus one).

"Round Increment" (or "RI"): an attribute of an event that can be either zero or one.

"Round Number" (or "RN"): an integer attribute of an event. In some instances, Round Number can be defined as the maximum of the Round Numbers of the event's parents, plus the event's Round Increment. For example, in FIG. 14, event 1412 has two parents, events 1406 and 1408, both having a Round Number of one. Event 1412 also has a Round Increment of one. Thus, the Round Number of event 1412 is two (i.e., one plus one). In other instances, an event can have a Round Number R if R is the minimum integer such that the event can strongly see (as described herein) at least M events defined and/or created by different members, which all have a round number R−1. If there is no such integer, the Round Number for an event can be a default value (e.g., 0, 1, etc.). In such instances, the Round Number for an event can be calculated without using a Round Increment. For example, in FIG. 14, if M is defined to be the least integer greater than $1/2$ times N, then M is three. Then event 1412 strongly sees the M events 1401, 1402, and 1408, each of which was defined by a different member and has a Round Number of 1. The event 1412 cannot strongly see at least M events with Round Number of 2 that were defined by different members. Therefore, the Round Number for event 1412 is 2. In some instances, the first event in the distributed database includes a Round Number of 1. In other instances, the first event in the distributed database can include a Round Number of 0 or any other suitable number.

"Forking": an event X is a fork with event Y if they are defined and/or created by the same member, and neither is a self-ancestor of the other. For example, in FIG. 15, member Dave forks by creating and/or defining events 1503 and 1504, both having the same self-parent (i.e., event 1501), so that event 1503 is not a self-ancestor of event 1504, and event 1504 is not a self-ancestor of event 1503.

"Identification" of forking: forking can be "identified" by a third event created and/or defined after the two events that are forks with each other, if those two events are both ancestors of the third event. For example, in FIG. 15, member Dave forks by creating events 1503 and 1504, neither of which is a self-ancestor of the other. This forking can be identified by later event 1506 because events 1503 and 1504 are both ancestors of event 1506. In some instances, identification of forking can indicate that a particular member (e.g., Dave) has cheated.

"Identification" of an event: an event X "identifies" or "sees" an ancestor event Y if X has no ancestor event Z that is a fork with Y. For example, in FIG. 14, event 1412 identifies (also referred to as "sees") event 1403 because event 1403 is an ancestor of event 1412, and event 1412 has no ancestor events that are forks with event 1403. In some instances, event X can identify event Y if X does not identify forking prior to event Y. In such instances, even if event X identifies forking by the member defining event Y subsequent to event Y, event X can see event Y. Event X does not identify events by that member subsequent to forking. Moreover, if a member defines two different events that are both that member's first events in history, event X can identify forking and does not identify any event by that member.

"Strong identification" (also referred to herein as "strongly seeing") of an event: an event X "strongly identifies" (or "strongly sees") an ancestor event Y created and/or defined by the same member as X, if X identifies Y. Event X "strongly identifies" an ancestor event Y that is not created and/or defined by the same member as X, if there exists a set S of events that (1) includes both X and Y and (2) are ancestors of event X and (3) are descendants of ancestor event Y and (4) are identified by X and (5) can each identify Y and (6) are created and/or defined by at least M different members. For example, in FIG. 14, if M is defined to be the least integer that is more than $2/3$ of N (i.e., M=1+floor(2N/3), which would be four in this example), then event 1412 strongly identifies ancestor event 1401 because the set of events 1401, 1402, 1406, and 1412 is a set of at least four events that are ancestors of event 1412 and descendants of event 1401, and they are created and/or defined by the four members Dave, Carol, Bob, and Ed, respectively, and event 1412 identifies each of events 1401, 1402, 1406, and 1412, and each of events 1401, 1402, 1406, and 1412 identifies event 1401. Similarly stated, an event X (e.g., event 1412) can "strongly see" event Y (e.g., event 1401) if X can see at least M events (e.g., events 1401, 1402, 1406, and 1412) created or defined by different members, each of which can see Y.

"Round R first" event (also referred to herein as a "witness"): an event is a "round R first" event (or a "witness") if the event (1) has Round Number R, and (2) has a self-parent having a Round Number smaller than R or has no self-parent. For example, in FIG. 14, event 1412 is a "round 2 first" event because it has a Round Number of two, and its self-parent is event 1408, which has a Round Number of one (i.e., smaller than two).

In some instances, the Round Increment for an event X is defined to be 1 if and only if X "strongly identifies" at least M "round R first" events, where R is the maximum Round Number of its parents. For example, in FIG. 14, if M is defined to be the least integer greater than ½ times N, then M is three. Then event 1412 strongly identifies the M events 1401, 1402, and 1408, all of which are round 1 first events. Both parents of 1412 are round 1, and 1412 strongly identifies at least M round 1 firsts, therefore the round increment for 1412 is one. The events in the diagram marked with "RI=0" each fail to strongly identify at least M round 1 firsts, therefore their round increments are 0.

In some instances, the following method can be used for determining whether event X can strongly identify ancestor event Y. For each round R first ancestor event Y, maintain an array A1 of integers, one per member, giving the lowest sequence number of the event X, where that member created and/or defined event X, and X can identify Y. For each event Z, maintain an array A2 of integers, one per member, giving the highest sequence number of an event W created and/or defined by that member, such that Z can identify W. To determine whether Z can strongly identify ancestor event Y, count the number of element positions E such that A1[E]<=A2[E]. Event Z can strongly identify Y if and only if this count is greater than M. For example, in FIG. 14, members Alice, Bob, Carol, Dave and Ed can each identify event 1401, where the earliest event that can do so is their events {1404, 1403, 1402, 1401, 1408}, respectively. These events have sequence numbers A1={1, 1,1,1,1}. Similarly, the latest event by each of them that is identified by event 1412 is event {NONE, 1406, 1402, 1401, 1412}, where Alice is listed as "NONE" because 1412 cannot identify any events by Alice. These events have sequence numbers of A2={0,2,1,1,2}, respectively, where all events have positive sequence numbers, so the 0 means that Alice has no events that are identified by 1412. Comparing the list A1 to the list A2 gives the results {1<-0, 1<-2, 1<-1, 1<-1, 1<-2} which is equivalent to {false, true, true, true, true} which has four values that are true. Therefore, there exists a set S of four events that are ancestors of 1412 and descendants of 1401. Four is at least M, therefore 1412 strongly identifies 1401.

Yet another variation on implementing the method for determining, with A1 and A2, whether event X can strongly identify ancestor event Y is as follows. If the integer elements in both arrays are less than 128, then it is possible to store each element in a single byte, and pack 8 such elements into a single 64-bit word, and let A1 and A2 be arrays of such words. The most significant bit of each byte in A1 can be set to 0, and the most significant bit of each byte in A2 can be set to 1. Subtract the two corresponding words, then perform a bitwise AND with a mask to zero everything but the most significant bits, then right shift by 7 bit positions, to get a value that is expressed in the C programming language as: ((A2[i]−A1[i]) & 0x8080808080808080)>>7). This can be added to a running accumulator S that was initialized to zero. After doing this multiple times, convert the accumulator to a count by shifting and adding the bytes, to get ((S & 0xff)+((S>>8) & 0xff)+((S>>16) & 0xff)+((S>>24) & 0xff)+((S>>32) & 0xff)+((S>>40) & 0xff)+((S>>48) & 0xff)+((S>>56) & 0xff)). In some instances, these calculations can be performed in programming languages such as C, Java, and/or the like. In other instances, the calculations can be performed using processor-specific instructions such as the Advanced Vector Extensions (AVX) instructions provided by Intel and AMD, or the equivalent in a graphics processing unit (GPU) or general-purpose graphics processing unit (GPGPU). On some architectures, the calculations can be performed faster by using words larger than 64 bits, such as 128, 256, 512, or more bits.

"Famous" event: a round R event X is "famous" if (1) the event X is a "round R first" event (or "witness") and (2) a decision of "YES" is reached via execution of a Byzantine agreement protocol, described below. In some embodiments, the Byzantine agreement protocol can be executed by an instance of a distributed database (e.g., distributed database instance 114) and/or a database convergence module (e.g., database convergence module 211). For example, in FIG. 14, there are five round 1 firsts shown: 1401, 1402, 1403, 1404, and 1408. If M is defined to be the least integer greater than ½ times N, which is three, then 1412 is a round 2 first. If the protocol runs longer, then the hashDAG will grow upward, and eventually the other four members will also have round 2 firsts above the top of this figure. Each round 2 first will have a "vote" on whether each of the round 1 firsts is "famous". Event 1412 would vote YES for 1401, 1402, and 1403 being famous, because those are round 1 firsts that it can identify. Event 1412 would vote NO for 1404 being famous, because 1412 cannot identify 1404. For a given round 1 first, such as 1402, its status of being "famous" or not will be decided by calculating the votes of each round 2 first for whether it is famous or not. Those votes will then propagate to round 3 firsts, then to round 4 firsts and so on, until eventually agreement is reached on whether 1402 was famous. The same process is repeated for other firsts.

A Byzantine agreement protocol can collect and use the votes and/or decisions of "round R first" events to identify "famous events. For example, a "round R+1 first" Y will vote "YES" if Y can "identify" event X, otherwise it votes "NO." Votes are then calculated for each round G, for G=R+2, R+3, R+4, etc., until a decision is reached by any member. Until a decision has been reached, a vote is calculated for each round G. Some of those rounds can be "majority" rounds, while some other rounds can be "coin" rounds. In some instances, for example, Round R+2 is a majority round, and future rounds are designated as either a majority or a coin round (e.g., according to a predefined schedule). For example, in some instances, whether a future round is a majority round or a coin round can be arbitrarily determined, subject to the condition that there cannot be two consecutive coin rounds. For example, it might be predefined that there will be five majority rounds, then one coin round, then five majority rounds, then one coin round, repeated for as long as it takes to reach agreement.

In some instances, if round G is a majority round, the votes can be calculated as follows. If there exists a round G event that strongly identifies at least M round G−1 firsts voting V (where V is either "YES" or "NO"), then the consensus decision is V, and the Byzantine agreement protocol ends. Otherwise, each round G first event calculates a new vote that is the majority of the round G−1 firsts that each round G first event can strongly identify. In instances where there is a tie rather than majority, the vote can be designated "YES."

Similarly stated, if X is a round R witness (or round R first), then the results of votes in rounds R+1, R+2, and so on can be calculated, where the witnesses in each round are voting for whether X is famous. In round R+1, every witness that can see X votes YES, and the other witnesses vote NO. In round R+2, every witness votes according to the majority of votes of the round R+1 witnesses that it can strongly see. Similarly, in round R+3, every witness votes according to the majority of votes of the round R+2 witness that it can strongly see. This can continue for multiple rounds. In case of a tie, the vote can be set to YES. In other instances, the tie can be set to NO or can be randomly set. If any round has at least M of the witnesses voting NO, then the election ends, and X is not famous. If any round has at least M of the witnesses voting YES, then the election ends, and X is famous. If neither YES nor NO has at least M votes, the election continues to the next round.

As an example, in FIG. 14, consider some round first event X that is below the figure shown. Then, each round 1 first will have a vote on whether X is famous. Event 1412 can strongly identify the round 1 first events 1401, 1402, and 1408. So its vote will be based on their votes. If this is a majority round, then 1412 will check whether at least M of {1401, 1402, 1408} have a vote of YES. If they do, then the decision is YES, and the agreement has been achieved. If at least M of them vote NO, then the decision is NO, and the agreement has been achieved. If the vote doesn't have at least M either direction, then 1412 is given a vote that is a majority of the votes of those of 1401, 1402, and 1408 (and would break ties by voting YES, if there were a tie). That vote would then be used in the next round, continuing until agreement is reached.

In some instances, if round G is a coin round, the votes can be calculated as follows. If event X can identify at least M round G−1 firsts voting V (where V is either "YES" or "NO"), then event X will change its vote to V. Otherwise, if round G is a coin round, then each round G first event X changes its vote to the result of a pseudo-random determination (akin to a coin flip in some instances), which is defined to be the least significant bit of the signature of event X.

Similarly stated, in such instances, if the election reaches a round R+K (a coin round), where K is a designated factor (e.g., a multiple of a number such as 3, 6, 7, 8, 16, 32 or any other suitable number), then the election does not end on that round. If the election reaches this round, it can continue for at least one more round. In such a round, if event Y is a round R+K witness, then if it can strongly see at least M witnesses from round R+K−1 that are voting V, then Y will vote V. Otherwise, Y will vote according to a random value (e.g., according to a bit of the signature of event Y (e.g., least significant bit, most significant bit, randomly selected bit) where 1=YES and 0=NO, or vice versa, according to a time stamp of the event Y, using a cryptographic "shared coin" protocol and/or any other random determination). This random determination is unpredictable before Y is created, and thus can increase the security of the events and consensus protocol.

For example, in FIG. 14, if round 2 is a coin round, and the vote is on whether some event before round 1 was famous, then event 1412 will first check whether at least M of {1401, 1402, 1408} voted YES, or at least M of them voted NO. If that is the case, then 1412 will vote the same way. If there are not at least M voting in either direction, then 1412 will have a random or pseudorandom vote (e.g., based on the least significant bit of the digital signature that Ed created for event 1412 when he signed it, at the time he created and/or defined it).

In some instances, the result of the pseudo-random determination can be the result of a cryptographic shared coin protocol, which can, for example, be implemented as the least significant bit of a threshold signature of the round number.

A system can be built from any one of the methods for calculating the result of the pseudo-random determination described above. In some instances, the system cycles through the different methods in some order. In other instances, the system can choose among the different methods according to a predefined pattern.

"Received round": An event X has a "received round" of R if R is the minimum integer such that at least half of the famous round R first events (or famous witnesses) with round number R are descendants of and/or can see X. In other instances, any other suitable percentage can be used. For example, in another instance, an event X has a "received round" of R if R is the minimum integer such that at least a predetermined percentage (e.g., 40%, 60%, 80%, etc.) of the famous round R first events (or famous witnesses) with round number R are descendants of and/or can see X.

In some instances, the "received generation" of event X can be calculated as follows. Find which member created and/or defined each round R first event that can identify event X. Then determine the generation number for the earliest event by that member that can identify X. Then define the "received generation" of X to be the median of that list.

In some instances, a "received timestamp" T of an event X can be the median of the timestamps in the events that include the first event by each member that identifies and/or sees X. For example, the received timestamp of event 1401 can be the median of the value of the timestamps for events 1402, 1403, 1403, and 1408. In some instances, the timestamp for event 1401 can be included in the median calculation. In other instances, the received timestamp for X can be any other value or combination of the values of the timestamps in the events that are the first events by each member to identify or see X. For example, the received timestamp for X can be based on an average of the timestamps, a standard deviation of the timestamps, a modified average (e.g., by removing the earliest and latest timestamps from the calculation), and/or the like. In still other instances, an extended median can be used.

In some instances, the total order and/or consensus order for the events is calculated by sorting the events by their received round (also referred to herein as an order value), breaking ties by their received timestamp, and breaking those ties by their signatures. In other instances, the total order for the events can be calculated by sorting the events by their received round, breaking ties by their received generation, and breaking those ties by their signatures. The foregoing paragraphs specify functions used to calculate and/or define an event's received round, received timestamp, and/or received generation.

In other instances, instead of using the signature of each event, the signature of that event XORed with the signatures of the famous events or famous witnesses with the same received round and/or received generation in that round can be used. In other instances, any other suitable combination of event signatures can be used to break ties to define the consensus order of events.

In still other instances, instead of defining the "received generation" as the median of a list, the "received generation" can be defined to be the list itself. Then, when sorting by received generation, two received generations can be compared by the middle elements of their lists, breaking ties by the element immediately before the middle, breaking those ties by the element immediately after the middle, and continuing by alternating between the element before those used so far and the element after, until the tie is broken.

In some instances, the median timestamp can be replaced with an "extended median." In such instances, a list of timestamps can be defined for each event rather than a single received timestamp. The list of timestamps for an event X can include the first event by each member that identifies and/or sees X. For example, in FIG. 14, the list of timestamps for event 1401 can include the timestamps for events 1402, 1403, 1403, and 1408. In some instances, the timestamp for event 1401 can also be included. When breaking a tie with the list of timestamps (i.e., two events have the same received round), the middle timestamps of each event's list (or a predetermined of the first or second of the two middle timestamps, if of even length) can be compared. If these timestamps are the same, the timestamps immediately after the middle timestamps can be compared. If these timestamps are the same, the timestamps immediately preceding the middle timestamps can be compared. If these timestamps are also the same, the timestamps after the three already compared timestamps are compared. This can continue to alternate until the tie is broken. Similar to the above discussion, if the two lists are identical, the tie can be broken by the signatures of the two elements.

In still other instances, a "truncated extended median" can be used instead of an "extended median." In such an instance, an entire list of timestamps is not stored for each event. Instead, only a few of the values near the middle of the list are stored and used for comparison.

The median timestamp received can potentially be used for other purposes in addition to calculating a total order of events. For example, Bob might sign a contract that says he agrees to be bound by the contract if and only if there is an event X containing a transaction where Alice signs that same contract, with the received timestamp for X being on or before a certain deadline. In that case, Bob would not be bound by the contract if Alice signs it after the deadline, as indicated by the "received median timestamp", as described above.

In some instances, a state of the distributed database can be defined after a consensus is achieved. For example, if S(R) is the set of events that can be seen by the famous witnesses in round R, eventually all of the events in S(R) will have a known received round and received timestamp. At that point, the consensus order for the events in S(R) is known and will not change. Once this point is reached, a member can calculate and/or define a representation of the events and their order. For example, a member can calculate a hash value of the events in S(R) in their consensus order. The member can then digitally sign the hash value and include the hash value in the next event that member defines. This can be used to inform the other members that that member has determined that the events in S(R) have the given order that will not change. After at least M of the members (or any other suitable number or percentage of members) have signed the hash value for S(R) (and thus agreed with the order represented by the hash value), that consensus list of events along with the list of signatures of the members can form a single file (or other data structure) that can be used to prove that the consensus order was as claimed for the events in S(R). In other instances, if events contain transactions that update a state of the distributed database system (as described herein), then the hash value can be of the state of the distributed database system after applying the transactions of the events in S(R) in the consensus order.

In some instances, M (as described above) can be based on weight values (also referred to herein as stake values) assigned to each member, rather than just a fraction, percentage and/or value of the number of total members. In such an instance, each member has a stake associated with its interest and/or influence in the distributed database system. Such a stake can be a weight value and/or a stake value. Each event defined by that member can be said to have the weight value of its defining member. M can then be a fraction of the total stake of all members and can be referred to as a stake value criterion and/or threshold. The events described above as being dependent on M will occur when a set of members with a stake sum of at least M agree (i.e., meet a stake value criterion). Thus, based on their stake, certain members can have a greater influence on the system and how the consensus order is derived. In some instances, a transaction in an event can change the stake of one or more members, add new members, and/or delete members. If such a transaction has a received round of R, then after the received round has been calculated, the events after the round R witnesses will recalculate their round numbers and other information using the modified stakes and modified list of members. In some instances, the votes on whether round R events are famous can use the old stakes and member list, but the votes on the rounds after R can use the new stakes and member list.

In some further instances predetermined weight or stake values can be assigned to each member of the distributed database system. Accordingly, a consensus reached via the Byzantine agreement protocol can be implemented with an associated security level to protect a group of members or population from potential Sybil attacks. In some instances, such a security level can be mathematically guaranteed. For example, attackers may want to impact the outcome of one or more events by reorganizing the partial order of events registered in the hashDAG. An attack can be made by reorganizing one or more hashDAG partial orders before consensus and/or a final agreement is reached among the members of a distributed database. In some instances, controversies can arise regarding the timing on which multiple competing events occurred. As discussed above, an outcome associated with an event can depend on the value of M. As such, in some instances, the determination of whether Alice or Bob acted first with respect to an event (and/or a transaction within an event) can be made when the number of votes or the stake sum of the voting members in agreement is greater or equal to the value of M.

Some types of event order reorganization attacks require the attacker to control at least a fraction or percentage (e.g., 1/10, 1/4, 1/3, etc.) of N depending on the value of M. In some instances, the value of M can be configured to be, for example, 2/3 of the group or population N. In such a case, as long as more than 2/3 of the members of the group or population are not participants of an attack, an agreement can be reached by the members that are not part of the attack and the distributed database will continue to reach consensus and operate as intended. Moreover, in such an instance, an attacker would have to control at least N minus M (N−M) members of the group or population (1/3 of the members in this example) during the attack period to stop the database from converging, to cause the distributed database to converge in the attacker's favor (e.g., to cause the database to converge in an unfair order), to converge to two different states (e.g., such that the members officially agree on both of two contradictory states) or to counterfeit currency (when the distributed database system operates with a cryptocurrency).

In some implementations, weights or stakes can be assigned to each of the members of a group or population, and N will be the total sum of all their weights or stakes. Accordingly, a higher weight or stake value can be assigned to a subset of the group of members or population based on trustfulness or reliability. For example, a higher weight or stake value can be assigned to members that are less likely to engage in an attack or have some indicator showing their lack of propensity to participate in dishonest behaviors.

In some instances, the distributed database system security level can be increased by choosing M to be a larger fraction of N. For example, when M corresponds to the least integer number that is more than 2/3 of the number of members of a group or population, N, and all the members have equal voting power, an attacker will need to have control or influence over at least 1/3 of N to prevent an agreement to be reached among non-attacker members and to cause the distributed database to fail to reach consensus. Similarly, in such an instance, the attacker will need to have control or influence over at least 1/3 of N to cause the distributed database system to converge and/or reach an agreement in the attacker's favor (e.g., to cause the database to converge in an unfair order), to converge to two different states (e.g., such that the members officially agree on both of two contradictory states) or to counterfeit currency (when the distributed database system operates with a cryptocurrency).

In some instances, for example, a dishonest member may vote two different ways to cause the distributed database to converge on two different states. If, for example, N=300 and 100 members are dishonest, there are 200 honest members with, for example, 100 voting "yes" and 100 voting "no" for a transaction. If the 100 dishonest members send a message (or event) to the 100 honest "yes" voters that the 100 dishonest members vote "yes", the 100 honest "yes" voters will believe that the final consensus is "yes" since they will believe that 2/3 of the members vote "yes". Similarly, if the 100 dishonest members send a message (or event) to the 100 honest "no" voters that the 100 dishonest members vote "no", the 100 honest "no" voters will believe that the final consensus is "no" since they will believe that 2/3 of the members vote "no". Thus, in this situation, some honest members will believe the consensus is "yes" while other honest members will believe the consensus is "no", causing the distributed database to converge to two different states. If, however, the number of dishonest members is less than 100, the honest members will eventually converge on a single value (either "yes" or "no") since the dishonest members will be unable to push both the "yes" and "no" votes over 200 (i.e., 2/3 of N). Other suitable values of M can be used according to specifications and/or specific requirements of an application of the distributed database system.

In some further instances, when members have unequal voting power, for example, when the most reliable or trustful voters have a voting power (e.g., a weight value or stake value) of one unit while the rest of the members have a fraction of a unit, an agreement can be reached when the stake or weight sum reaches the value of M. Thus, in some instances, an agreement can be sometimes reached even when a majority of members are in discord with a final decision but a majority of reliable or trustful members are in agreement. In other words, the voting power of untrusted members can be diluted to prevent or mitigate possible attacks. Accordingly, in some instances, the security level can be increased by requiring consensus of members with a total stake of M, rather than just a count of M members. A higher value for M means that a larger portion of the stake (e.g., a greater number of members in an unweighted system) have to agree to cause the distributed database system to converge.

In some instances, the distributed database system can support multiple participation security protocols including but not limited to the protocols shown in Table 1 and any combination thereof. The protocols shown in Table 1 describe multiple techniques to assign a stake or weight to the members of a group or a population. The protocols in Table 1 can be implemented with cryptocurrencies such as, for example, Bitcoin, a derivative of a native cryptocurrency, a cryptocurrency defined within the distributed database system or any other suitable type of cryptocurrency. While described with respect to cryptocurrency, in other instances the protocols shown in Table 1 can be used in any other suitable distributed database system, and with any other method for assigning stake.

TABLE 1

Example of participation security protocols

| Protocol Name | Description |
|---|---|
| Proof-of- | Each member can associate themselves with one or more cryptocurrency wallets they own, and their voting stake is set to |

TABLE 1-continued

Example of participation security protocols

| Protocol Name | Description |
|---|---|
| stake | a value associated to the total balance of those one or more cryptocurrency wallets. |
| Proof-of-burn | Similar to proof-of-stake, but the members prove that they destroyed or consumed the cryptocurrency at issue. In other words, a fee is paid to join the voting population, and the voting stake is proportional to the amount paid. |
| Proof-of-work | Members can earn voting stakes by executing computational tasks or solving a puzzle Unlike conventional cryptocurrencies, the computational cost can be incurred to earn voting stake power, rather than to mine a block.<br>In this protocol the members of a population may be required to keep performing computational tasks or solving puzzles to keep up with the system demands, and not lose their ability to keep the system safe. This protocol can also be configured to make voting stakes decay over time, to encourage continual work of the members. |
| Permissioned | Each member gets a voting stake of exactly one unit. Members can be only allowed to become a member if they have permission. The permission to join the population can be subjected to a vote of the existing members, a proof of membership in some existing organization, or any other suitable condition. |
| Hybrid | The founding members of a population can start with an equal voting stake. The founding members can invite other members to join the population, so membership can spread virally. Each member will split their own voting stake with those they invite. In this way, if a member were to invite 1000 sock puppets to be members, then all 1001 of them together would still have the same total voting stake as the member had originally. So sock puppets will not help in launching a Sybil attack. |
| Trivial | Every member is provided with a voting stake corresponding to one unit. Any member can invite new members to join the population. New members are provided with a voting stake corresponding to one unit. |

The selection of one participation security protocol over another one can depend on specific applications. For example, the hybrid protocol can be suitable for the implementation of casual low-value transactions, a business collaboration application, a computer game and other similar type of applications where the trade-off between security and minimal computational expense leans towards the latter. The hybrid protocol can be effective at preventing a single disgruntled member from disrupting or attacking a group of members or population.

For another example, the permissioned protocol may be desirable when security requirements are the highest priority and the population members are not complete strangers or unknown. The permissioned protocol can be used to implement applications directed to, for example, banks and similar type of financial entities or entities bound in a consortium. In such a case, banks in a consortium can become members of the population and each bank can be restricted to participate as a single member. Accordingly, M can be set to the least integer that is more than two-thirds of the population. The banks may not mutually trust each other as an individual entity but may rely on the security level provided by the distributed database system, which in this example constrains the number of dishonest members to be no more than one-third of the banks in the population.

For yet another example, the proof-of-burn protocol can be implemented when the population includes a large number of strangers or unknown members. In such a case, an attacker may be able to obtain control over a fraction of the total stake exceeding the value given to M. The entry fee, however, can be set high enough such that the cost of an attack exceeds any expected benefits or profits.

For another example, the proof-of-stake protocol can be suitable for larger groups. The proof-of-stake protocol can be an optimal or desirable solution when there is a large group of members who own substantial amounts of the cryptocurrency in roughly equal parts, and it is not foreseen or probable that a disruptive member would acquire a higher cryptocurrency amount than the amount collectively owned by the large group of members.

In other instances, other further or more complex protocols can be derived from a protocol or a combination of protocols shown in Table 1. For example, a distributed database system can be configured to implement a hybrid protocol, which follows a permissioned protocol for a predetermined period of time and eventually allows members to sell voting stakes to each other. For another example, a distributed database system can be configured to implement a proof-of-burn protocol, and eventually transition to a proof-of-stake protocol once the value of the events or involved transactions reaches a threshold or a predetermined cryptocurrency value.

The foregoing terms, definitions, and algorithms are used to illustrate the embodiments and concepts described in FIGS. 14-17b. FIGS. 16a and 16b illustrate a first example application of a consensus method and/or process shown in mathematical form. FIGS. 17a and 17b illustrate a second example application of a consensus method and/or process shown in mathematical form.

In other instances and as described in further detail herein, the database convergence module 211 can initially define a vector of values for a parameter, and can update the vector of values as it receives additional values for the parameter from other compute devices. For example, the database convergence module 211 can receive additional values for the parameter from other compute devices via the communication module 212. In some instances, the database convergence module can select a value for the parameter based on the defined and/or updated vector of values for the parameter, as described in further detail herein. In some embodiments, the database convergence module 211 can also send a value for the parameter to other compute devices via the communication module 212, as described in further detail herein.

In some embodiments, the database convergence module 211 can send a signal to memory 220 to cause to be stored in memory 220 (1) the defined and/or updated vector of values for a parameter, and/or (2) the selected value for the parameter based on the defined and/or updated vector of values for the parameter. For example, (1) the defined and/or updated vector of values for the parameter and/or (2) the selected value for the parameter based on the defined and/or updated vector of values for the parameter, can be stored in a distributed database instance 221 implemented in memory 220. In some embodiments, the distributed database instance 221 can be similar to distributed database instances 114, 124, 134, 144 of the distributed database system 100 shown in FIG. 1.

In FIG. 2, the database convergence module 211 and the communication module 212 are shown in FIG. 2 as being implemented in processor 210. In other embodiments, the database convergence module 211 and/or the communication module 212 can be implemented in memory 220. In still other embodiments, the database convergence module 211 and/or the communication module 212 can be hardware based (e.g., ASIC, FPGA, etc.).

Figure 7:
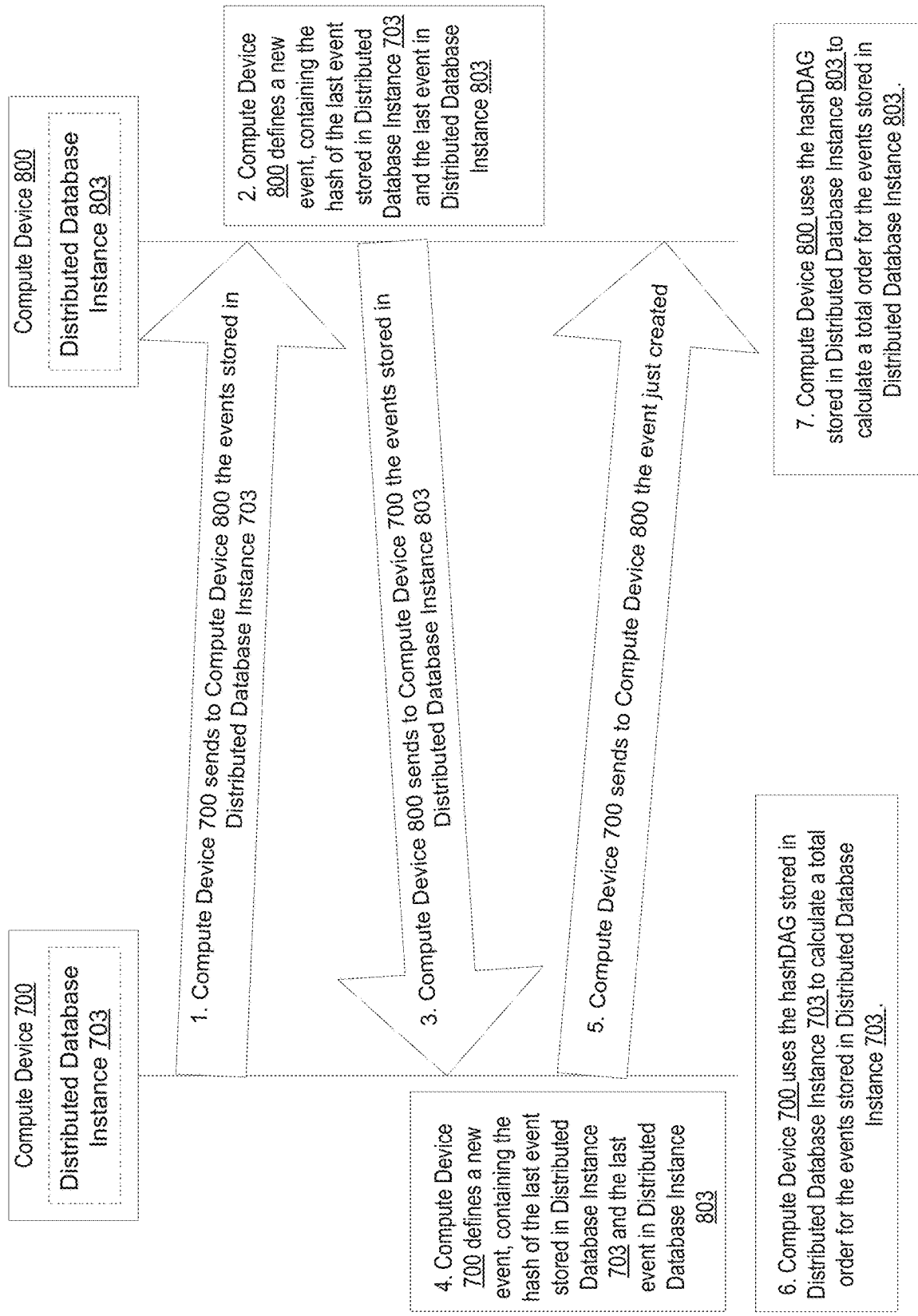
FIG. 7 is a flow diagram that illustrates a communication flow between a first compute device and a second compute device, according to an embodiment.

FIG. 7 illustrates a signal flow diagram of two compute devices syncing events, according to an embodiment. Specifically, in some embodiments, the distributed database instances 703 and 803 can exchange events to obtain convergence. The compute device 700 can select to sync with the compute device 800 randomly, based on a relationship with the compute device 700, based on proximity to the compute device 700, based on an ordered list associated with the compute device 700, and/or the like. In some embodiments, because the compute device 800 can be chosen by the compute device 700 from the set of compute devices belonging to the distributed database system, the compute device 700 can select the compute device 800 multiple times in a row or may not select the compute device 800 for awhile. In other embodiments, an indication of the previously selected compute devices can be stored at the compute device 700. In such embodiments, the compute device 700 can wait a predetermined number of selections before being able to select again the compute device 800. As explained above, the distributed database instances 703 and 803 can be implemented in a memory of compute device 700 and a memory of compute device 800, respectively.

FIGS. 3-6 illustrate examples of a hashDAG, according to an embodiment. There are five members, each of which is represented by a dark vertical line. Each circle represents an event. The two downward lines from an event represent the hashes of two previous events. Every event in this example has two downward lines (one dark line to the same member and one light line to another member), except for each member's first event. Time progresses upward. In FIGS. 3-6, compute devices of a distributed database are indicated as Alice, Bob, Carol, Dave and Ed. In should be understood that such indications refer to compute devices structurally and functionally similar to the compute devices 110, 120, 130 and 140 shown and described with respect to FIG. 1.

Example System 1: If the compute device 700 is called Alice, and the compute device 800 is called Bob, then a sync between them can be as illustrated in FIG. 7. A sync between Alice and Bob can be as follows:

Alice sends Bob the events stored in distributed database 703.
Bob creates and/or defines a new event which contains:
  a hash of the last event Bob created and/or defined
  a hash of the last event Alice created and/or defined
  a digital signature by Bob of the above
Bob sends Alice the events stored in distributed database 803.
Alice creates and/or defines a new event.
Alice sends Bob that event.
Alice calculates a total order for the events, as a function of a hashDAG
Bob calculates a total order for the events, as a function of a hashDAG At any given time, a member can store the events received so far, along with an identifier associated with the compute device and/or distributed database instance that created and/or defined each event. Each event contains the hashes of two earlier events, except for an initial event (which has no parent hashes), and the first event for each new member (which has a single parent event hash, representing the event of the existing member that invited them to join). A diagram can be drawn representing this set of events. It can show a vertical line for each member, and a dot on that line for each event created and/or defined by that member. A diagonal line is drawn between two dots whenever an event (the higher dot) includes the hash of an earlier event (the lower dot). An event can be said to be linked to another event if that event can reference the other event via a hash of that event (either directly or though intermediary events).

Figure 3:
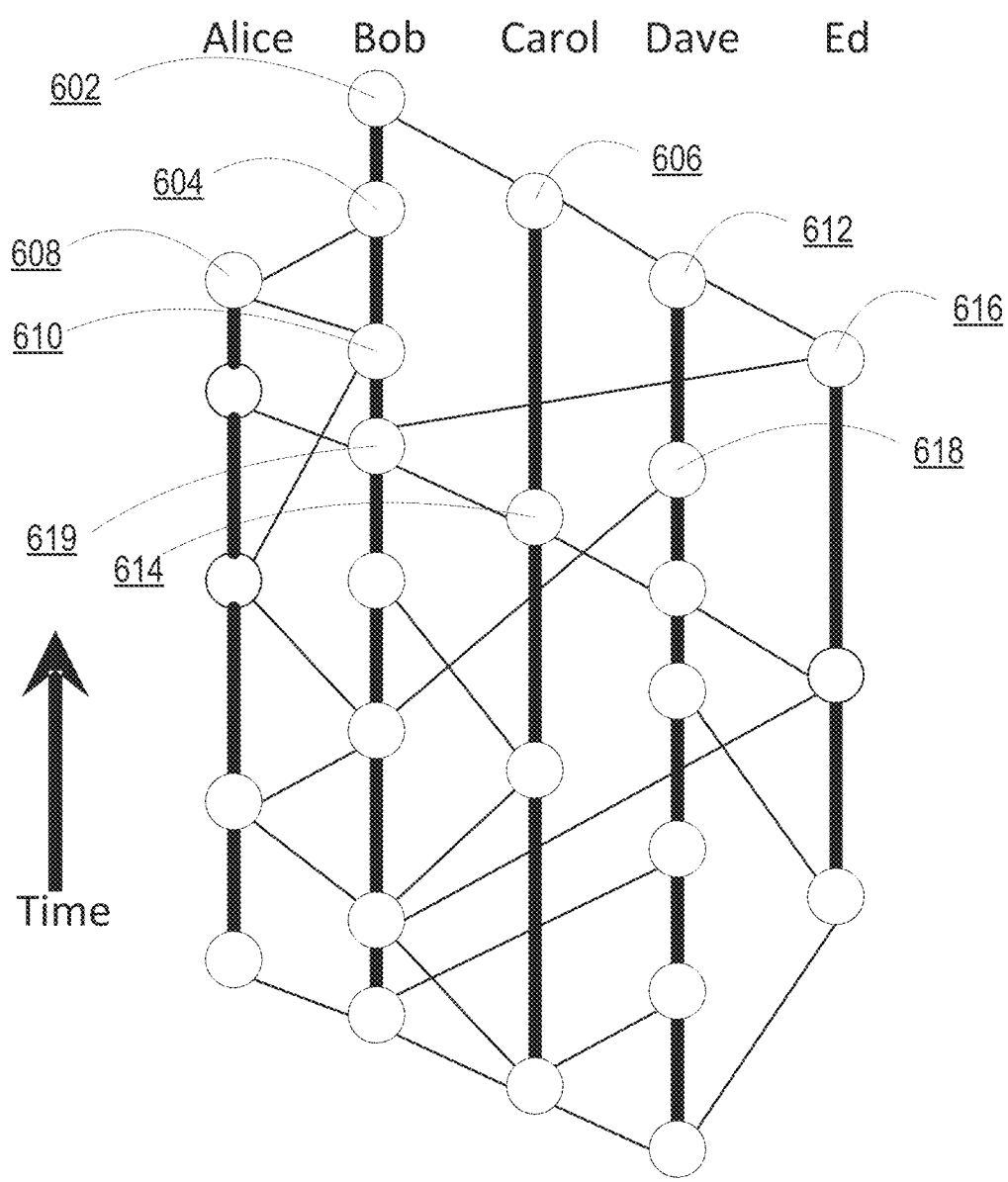
FIGS. 3-6 illustrate examples of a hashDAG, according to an embodiment.

For example, FIG. 3 illustrates an example of a hashDAG 600. Event 602 is created and/or defined by Bob as a result of and after syncing with Carol. Event 602 includes a hash of event 604 (the previous event created and/or defined by Bob) and a hash of event 606 (the previous event created and/or defined by Carol). In some embodiments, for example, the hash of event 604 included within event 602 includes a pointer to its immediate ancestor events, events 608 and 610. As such, Bob can use the event 602 to reference events 608 and 610 and reconstruct the hashDAG using the pointers to the prior events. In some instances, event 602 can be said to be linked to the other events in the hashDAG 600 since event 602 can reference each of the events in the hashDAG 600 via earlier ancestor events. For example, event 602 is linked to event 608 via event 604. For another example, event 602 is linked to event 616 via events 606 and event 612.

Example System 2: The system from Example System 1, where the event also includes a "payload" of transactions or other information to record. Such a payload can be used to update the events with any transactions and/or information that occurred and/or was defined since the compute device's immediate prior event. For example, the event 602 can include any transactions performed by Bob since event 604 was created and/or defined. Thus, when syncing event 602 with other compute devices, Bob can share this information. Accordingly, the transactions performed by Bob can be associated with an event and shared with the other members using events.

Example System 3: The system from Example System 1, where the event also includes the current time and/or date, useful for debugging, diagnostics, and/or other purposes. The time and/or date can be the local time and/or date when the compute device (e.g., Bob) creates and/or defines the event. In such embodiments, such a local time and/or date is not synchronized with the remaining devices. In other embodiments, the time and/or date can be synchronized across the devices (e.g., when exchanging events). In still other embodiments, a global timer can be used to determine the time and/or date.

Example System 4: The system from Example System 1, where Alice does not send Bob events created and/or defined by Bob, nor ancestor events of such an event. An event x is an ancestor of an event y if y contains the hash of x, or y contains the hash of an event that is an ancestor of x. Similarly stated, in such embodiments Bob sends Alice the events not yet stored by Alice and does not send events already stored by Alice.

Figure 4:
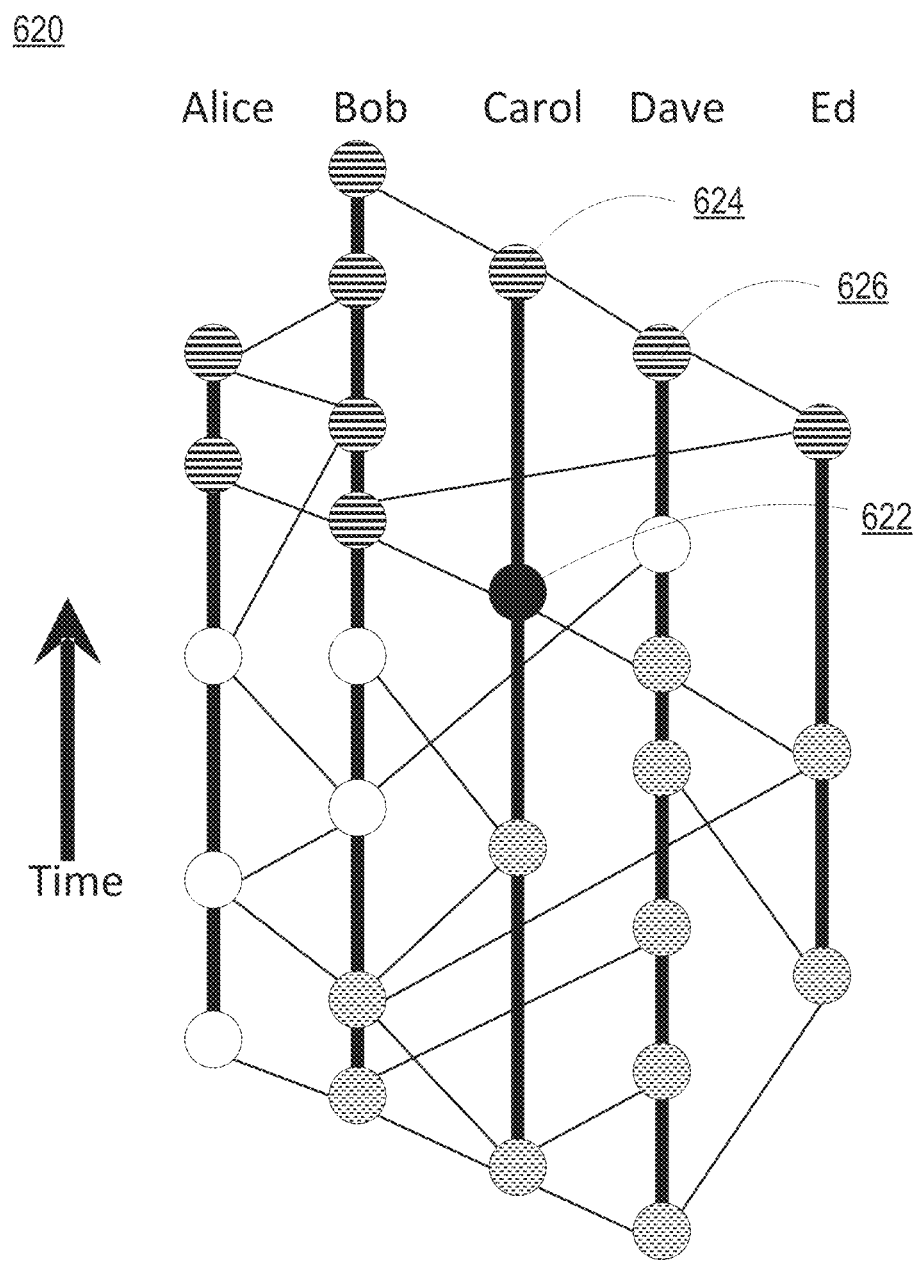
Figure 5:
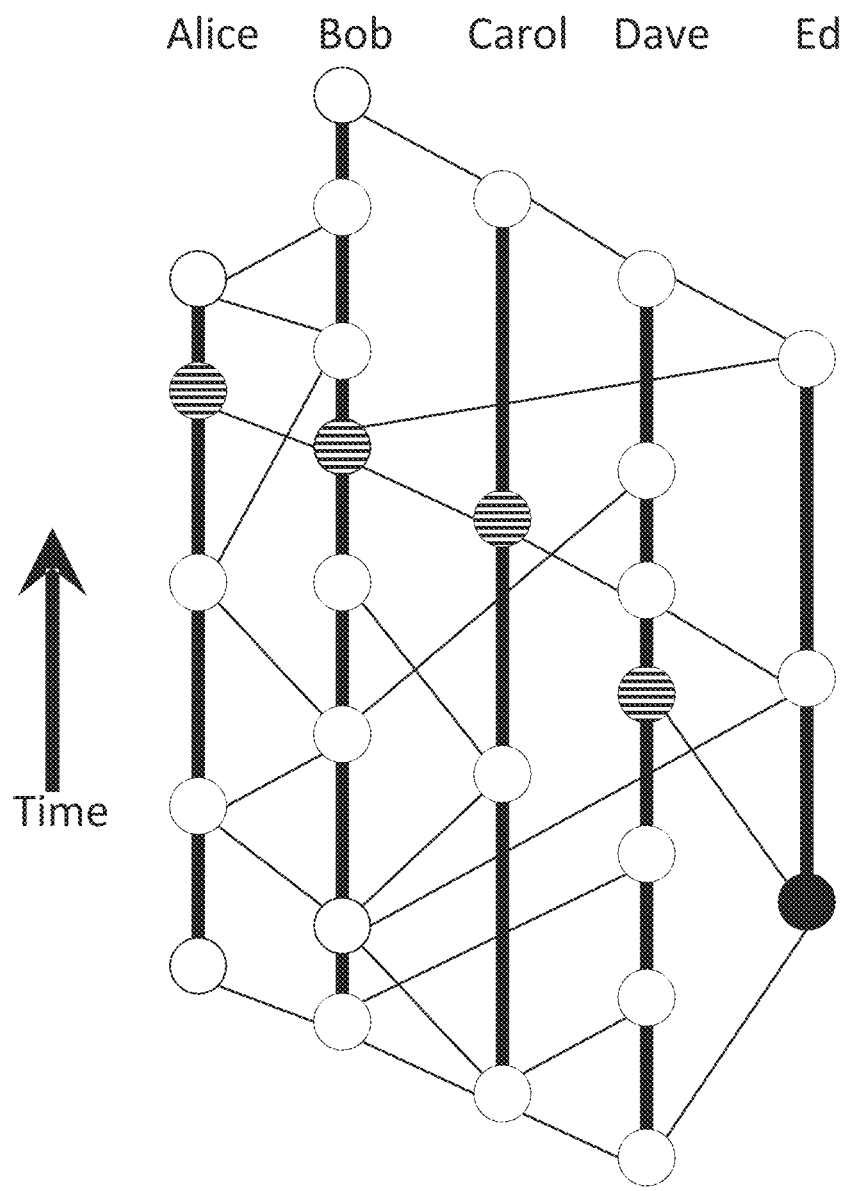

For example, FIG. 4 illustrates an example hashDAG 620 illustrating the ancestor events (dotted circles) and descendent events (striped circles) of the event 622 (the black circle). The lines establish a partial order on the events, where the ancestors come before the black event, and the descendants come after the black event. The partial order does not indicate whether the white events are before or after the black event, so a total order is used to decide their sequence. For another example, FIG. 5 illustrates an example hashDAG illustrating one particular event (solid circle) and the first time each member receives an indication of that event (striped circles). When Carol syncs with Dave to create and/or define event 624, Dave does not send to Carol ancestor events of event 622 since Carol is already aware of and has received such events. Instead, Dave sends to Carol the events Carol has yet to receive and/or store in Carol's distributed database instance. In some embodiments, Dave can identify what events to send to Carol based on what Dave's hashDAG reveals about what events Carol has previously received. Event 622 is an ancestor of event 626. Therefore, at the time of event 626, Dave has already received event 622. FIG. 4 shows that Dave received event 622 from Ed who received event 622 from Bob who received event 622 from Carol. Furthermore, at the time of event 624, event 622 is the last event that Dave has received that was created and/or defined by Carol. Therefore, Dave can send Carol the events that Dave has stored other than event 622 and its ancestors. Additionally, upon receiving event 626 from Dave, Carol can reconstruct the hashDAG based on the pointers in the events stored in Carol's distributed database instance. In other embodiments, Dave can identify what events to send to Carol based on Carol sending event 622 to Dave (not shown in FIG. 4) and Dave identifying using event 622 (and the references therein) to identify the events Carol has already received.

Example System 5: The system from Example System 1 where both members send events to the other in an order such that an event is not sent until after the recipient has received and/or stored the ancestors of that event. Accordingly, the sender sends events from oldest to newest, such that the recipient can check the two hashes on each event as the event is received, by comparing the two hashes to the two ancestor events that were already received. The sender can identify what events to send to the receiver based on the current state of the sender's hashDAG (e.g., a database state variable defined by the sender) and what that hashDAG indicates the receiver has already received. Referring to FIG. 3, for example, when Bob is syncing with Carol to define event 602, Carol can identify that event 619 is the last event created and/or defined by Bob that Carol has received. Therefore Carol can determine that Bob knows of that event, and its ancestors. Thus Carol can send Bob event 618 and event 616 first (i.e., the oldest events Bob has yet to receive that Carol has received). Carol can then send Bob event 612 and then event 606. This allows Bob to easily link the events and reconstruct Bob's hashDAG. Using Carol's hashDAG to identify what events Bob has yet to receive can increase the efficiency of the sync and can reduce network traffic since Bob does not request events from Carol.

In other embodiments, the most recent event can be sent first. If the receiver determines (based on the hash of the two previous events in the most recent event and/or pointers to previous events in the most recent event) that they have not yet received one of the two previous events, the receiver can request the sender to send such events. This can occur until the receiver has received and/or stored the ancestors of the most recent event. Referring to FIG. 3, in such embodiments, for example, when Bob receives event 606 from Carol, Bob can identify the hash of event 612 and event 614 in event 606. Bob can determine that event 614 was previously received from Alice when creating and/or defining event 604. Accordingly, Bob does not need to request event 614 from Carol. Bob can also determine that event 612 has not yet been received. Bob can then request event 612 from Carol. Bob can then, based on the hashes within event 612, determine that Bob has not received events 616 or 618 and can accordingly request these events from Carol. Based on events 616 and 618, Bob will then be able to determine that he has received the ancestors of event 606.

Example System 6: The system from Example System 5 with the additional constraint that when a member has a choice between several events to send next, the event is chosen to minimize the total number of bytes sent so far created and/or defined by that member. For example, if Alice has only two events left to send Bob, and one is 100 bytes and was created and/or defined by Carol, and one is 10 bytes and was created and/or defined by Dave, and so far in this sync Alice has already sent 200 bytes of events by Carol and 210 by Dave, then Alice should send the Dave event first, then subsequently send the Carol event. Because 210+ 10<100+200. This can be used to address attacks in which a single member either sends out a single gigantic event, or a flood of tiny events. In the case in which the traffic exceeds a byte limit of most members (as discussed with respect to Example System 7), the method of Example System 6 can ensure that the attacker's events are ignored rather than the events of legitimate users. Similarly stated, attacks can be reduced by sending the smaller events before bigger ones (to defend against one giant event tying up a connection). Moreover, if a member can't send each of the events in a single sync (e.g., because of network limitation, member byte limits, etc.), then that member can send a few events from each member, rather than merely sending the events defined and/or created by the attacker and none (of few) events created and/or defined by other members.

Example System 7: The system from Example System 1 with an additional first step in which Bob sends Alice a number indicating a maximum number of bytes he is willing to receive during this sync, and Alice replies with her limit. Alice then stops sending when the next event would exceed this limit. Bob does the same. In such an embodiment, this limits the number of bytes transferred. This may increase the time to convergence, but will reduce the amount of network traffic per sync.

Example System 8: The system from Example System 1, in which the following steps added at the start of the syncing process:

Alice identifies S, the set of events that she has received and/or stored, skipping events that were created and/or defined by Bob or that are ancestors of events created and/or defined by Bob.

Alice identifies the members that created and/or defined each event in S, and sends Bob the list of the member's ID numbers. Alice also send a number of events that were created and/or defined by each member that she has already received and/or stored.

Bob replies with a list of how many events he has received that were created and/or defined by the other members.

Alice then sends Bob only the events that he has yet to receive. For example, if Alice indicates to Bob that she has received 100 events created and/or defined by Carol, and Bob replies that he has received 95 events created and/or defined by Carol, then Alice will send only the most recent 5 events created and/or defined by Carol.

Example System 9: The system from Example System 1, with an additional mechanism for identifying and/or handling cheaters. Each event contains two hashes, one from the last event created and/or defined by that member (the "self hash"), and one from the last event created and/or defined by another member (the "foreign hash"). If a member creates and/or defines two different events with the same self hash, then that member is a "cheater". If Alice discovers Dave is a cheater, by receiving two different events created and/or defined by him with the same self hash, then she stores an indicator that he is a cheater, and refrains from syncing with him in the future. If she discovers he is a cheater and yet still syncs with him again and creates and/or defines a new event recording that fact, then Alice becomes a cheater, too, and the other members who learn of Alice further syncing with Dave stop syncing with Alice. In some embodiments, this only affects the syncs in one way. For example, when Alice sends a list of identifiers and the number of events she has received for each member, she doesn't send an ID or count for the cheater, so Bob won't reply with any corresponding number. Alice then sends Bob the cheater's events that she has received and for which she hasn't received an indication that Bob has received such events. After that sync is finished, Bob will also be able to determine that Dave is a cheater (if he hasn't already identified Dave as a cheater), and Bob will also refuse to sync with the cheater.

Example System 10: The system in Example System 9, with the addition that Alice starts a sync process by sending Bob a list of cheaters she has identified and of whose events she is still storing, and Bob replies with any cheaters he has identified in addition to the cheaters Alice identified. Then they continue as normal, but without giving counts for the cheaters when syncing with each other.

Example System 11: The system in Example System 1, with a process that repeatedly updates a current state (e.g., as captured by a database state variable defined by a member of the system) based on transactions inside of any new events that are received during syncing. This also can include a second process that repeatedly rebuilds that state (e.g., the order of events), whenever the sequence of events changes, by going back to a copy of an earlier state, and recalculating the present state by processing the events in the new order. In some embodiments, the current state is a state, balance, condition, and/or the like associated with a result of the transactions. Similarly stated, the state can include the data structure and/or variables modified by the transactions. For example, if the transactions are money transfers between bank accounts, then the current state can be the current balance of the accounts. For another example, if the transactions are associated with a multiplayer game, the current state can be the position, number of lives, items obtained, sate of the game, and/or the like associated with the game.

Example System 12: The system in Example System 11, made faster by the use of "fast clone" arrayList to maintain the state (e.g., bank account balances, game state, etc.). A fast clone arrayList is a data structure that acts like an array with one additional feature: it supports a "clone" operation that appears to create and/or define a new object that is a copy of the original. The close acts as if it were a true copy, because changes to the clone do not affect the original. The cloning operation, however, is faster than creating a true copy, because creating a clone does not actually involve copying and/or updating the entire contents of one arrayList to another. Instead of having two clones and/or copies of the original list, two small objects, each with a hash table and a pointer to the original list, can be used. When a write is made to the clone, the hash table remembers which element is modified, and the new value. When a read is performed on a location, the hash table is first checked, and if that element was modified, the new value from the hash table is returned. Otherwise, that element from the original arrayList is returned. In this way, the two "clones" are initially just pointers to the original arrayList. But as each is modified repeatedly, it grows to have a large hash table storing differences between itself and the original list. Clones can themselves be cloned, causing the data structure to expand to a tree of objects, each with its own hash table and pointer to its parent. A read therefore causes a walk up the tree until a vertex is found that has the requested data, or the root is reached. If vertex becomes too large or complex, then it can be replaced with a true copy of the parent, the changes in the hash table can be made to the copy, and the hash table discarded. In addition, if a clone is no longer needed, then during garbage collection it can be removed from the tree, and the tree can be collapsed.

Example System 13: The system in Example System 11, made faster by the use of a "fast clone" hash table to maintain the state (e.g., bank account balances, game state, etc.). This is the same as System 12, except the root of the tree is a hash table rather than an arrayList.

Example System 14: The system in Example System 11, made faster by the use of a "fast clone" relational database to maintain the state (e.g., bank account balances, game state, etc.). This is an object that acts as a wrapper around an existing Relational Database Management System (RDBMS). Each apparent "clone" is actually an object with an ID number and a pointer to an object containing the database. When the user's code tries to perform a Structure Query Language (SQL) query on the database, that query is first modified, then sent to the real database. The real database is identical to the database as seen by the client code, except that each table has one additional field for the clone ID. For example, suppose there is an original database with clone ID 1, and then two clones of the database are made, with IDs 2 and 3. Each row in each table will have a 1, 2, or 3 in the clone ID field. When a query comes from the user code into clone 2, the query is modified so that the query will only read from rows that have a 2 or 1 in that field. Similarly, reads to 3 look for rows with a 3 or 1 ID. If the Structured Query Language (SQL) command goes to clone 2 and says to delete a row, and that row has a 1, then the command should just change the 1 to a 3, which marks the row as no longer being shared by clones 2 and 3, and now just being visible to 3. If there are several clones in operation, then several copies of the row can be inserted, and each can be changed to the ID of a different clone, so that the new rows are visible to the clones except for the clone that just "deleted" the row. Similarly, if a row is added to clone 2, then the row is added to the table with an ID of 2. A modification of a row is equivalent to a deletion then an insertion. As before, if several clones are garbage collected, then the tree can be simplified. The structure of that tree will be stored in an additional table that is not accessible to the clones, but is purely used internally.

Example System 15: The system in Example System 11, made faster by the use of a "fast clone" file system to maintain the state. This is an object that acts as a wrapper around a file system. The file system is built on top of the existing file system, using a fast clone relational database to manage the different versions of the file system. The underlying file system stores a large number of files, either in one directory, or divided up according to filename (to keep directories small). The directory tree can be stored in the database, and not provided to the host file system. When a file or directory is cloned, the "clone" is just an object with an ID number, and the database is modified to reflect that this clone now exists. If a fast clone file system is cloned, it appears to the user as if an entire, new hard drive has been created and/or defined, initialized with a copy of the existing hard drive. Changes to one copy can have no effect on the other copies. In reality, there is just one copy of each file or directory, and when a file is modified through one clone the copying occurs.

Example System 16: The system in Example System 15 in which a separate file is created and/or defined on the host operating system for each N-byte portion of a file in the fast clone file system. N can be some suitable size, such as for example 4096 or 1024. In this way, if one byte is changed in a large file, only one chunk of the large file is copied and modified. This also increases efficiency when storing many files on the drive that differ in only a few bytes.

Example System 17: The system in Example System 11 where each member includes in some or all of the events they create and/or define a hash of the state at some previous time, along with the number of events that occurred up to that point, indicating that the member recognizes and/or identifies that there is now a consensus on the order of events. After a member has collected signed events containing such a hash from a majority of the users for a given state, the member can then store that as proof of the consensus state at that point, and delete from memory the events and transactions before that point.

Example System 18: The system in Example System 1 where operations that calculate a median or a majority is replaced with a weighted median or weighted majority, where members are weighted by their "stake". The stake is a number that indicates how much that member's vote counts. The stake could be holdings in a crypto currency, or just an arbitrary number assigned when the member is first invited to join, and then divided among new members that the member invites to join. Old events can be discarded when enough members have agreed to the consensus state so that their total stake is a majority of the stake in existence. If the total order is calculated using a median of ranks contributed by the members, then the result is a number where half the members have a higher rank and half have a lower. On the other hand, if the total order is calculated using the weighted median, then the result is a number where about half of the total stake is associated with ranks lower than that, and half above. Weighted voting and medians can be useful in preventing a Sybil attack, where one member invites a huge number of "sock puppet" users to join, each of whom are simply pseudonyms controlled by the inviting member. If the inviting member is forced to divide their stake with the invitees, then the sock puppets will not be useful to the attacker in attempts to control the consensus results. Accordingly, proof-of-stake may be useful in some circumstances.

Example System 19: The system in Example System 1 in which instead of a single, distributed database, there are multiple databases in a hierarchy. For example, there might be a single database that the users are members of, and then several smaller databases, or "chunks", each of which has a subset of the members. When events happen in a chunk, they are synced among the members of that chunk and not among members outside that chunk. Then, from time to time, after a consensus order has been decided within the chunk, the resulting state (or events with their consensus total order) can be shared with the entire membership of the large database.

Example System 20: The system in Example System 11, with the ability to have an event that updates the software for updating the state (e.g., as captured by a database state variable defined by a member of the system). For example, events X and Y can contain transactions that modify the state, according to software code that reads the transactions within those events, and then updates the state appropriately. Then, event Z can contain a notice that a new version of the software is now available. If a total order says the events happen in the order X, Z, Y, then the state can be updated by processing the transactions in X with the old software, then the transactions in Y with the new software. But if the consensus order was X, Y, Z, then both X and Y can be updated with the old software, which might give a different final state. Therefore, in such embodiments, the notice to upgrade the code can occur within an event, so that the community can achieve consensus on when to switch from the old version to the new version. This ensures that the members will maintain synchronized states. It also ensures that the system can remain running, even during upgrades, with no need to reboot or restart the process.

Example System 21: The system from Example System 1, where a proof-of-stake protocol is implemented to reach consensus and the voting power of each member is proportional to the member's amount of owned cryptocurrency. The cryptocurrency of this example will be referred to hereinafter as StakeCoin. The membership to the group or population is open, not permissioned, thus, there may be no trust among members.

The proof-of-stake protocol can be computationally less expensive than other protocols for example, proof-of-work protocol. In this example, M (as described above) can be ⅔ of the amount of StakeCoins collectively owned by the members. Thus, the distributed database system can be secure (and can converge as intended) if no attacker can obtain ⅓ of the total StakeCoins owned by the participating members put together. The distributed database system can remain functioning at a mathematically guaranteed security level as long as more than ⅔ of the StakeCoins are owned by honest active members. This allows the database to correctly converge.

A way for an attacker to gain control over the distributed database system can be achieved by negotiating individually with the StakeCoin owners within the distributed database system to purchase their StakeCoins. For example, Alice can obtain a majority of the StakeCoins by buying the StakeCoins owned by Bob, Carol and Dave leaving Ed in a vulnerable position. This is similar to cornering the market on a commodity, or trying to buy enough shares in a company for a hostile takeover. The described scenario represents not only an attack on the distributed database system that uses the StakeCoins but also it is an attack on StakeCoin itself. If a member gains a near-monopoly on a cryptocurrency, such a member can manipulate the cryptocurrency market value, and arrange to repeatedly sell high and buy low. This can be profitable in the short term, but may ultimately undermine trust in the cryptocurrency, and perhaps lead to it being universally abandoned. A currency market value can be independent from the technology used to convey the currency. For example, if an individual or entity gains ownership of the majority of the US dollars in the world, or the majority of the corn futures in the world, then such an individual or entity can profitably undermine the market.

An attack made by the acquisition of a near-monopoly of a cryptocurrency is harder if the cryptocurrency is both valuable and widespread. If the cryptocurrency is valuable, then it will cost a great deal to buy a large fraction of the StakeCoin currency supply. If the cryptocurrency is widespread, with many different people owning StakeCoins, then attempts to corner the StakeCoin market will become visible early on, which will naturally raise the price of a StakeCoin, making it even harder to gain the remaining currency supply.

A second type of attack can be made by obtaining an amount of StakeCoins that might be small compared to the collective amount of StakeCoins across multiple distributed database systems, but large compared to the amount of StakeCoins owned by the members participating in a particular distributed database system. This type of attack can be avoided when the cryptocurrency is specifically defined for use in an application of the distributed database system. In other words, the StakeCoins and an implementation of the distributed database system can be simultaneously defined to be linked to each other, and each contributes to the increasing value of the other. Similarly stated, there are not additional implementations of the distributed database that trade StakeCoins.

It can be desirable to have a valuable cryptocurrency from the beginning when an implementation of a distributed database system is newly defined. Although the cryptocurrency can increase its value over time, a valuable cryptocurrency can be beneficial at the early stages of the system. In some instances, a consortium of participating entities can initiate the cryptocurrency and its associated distributed database system. For example, ten large respected corporations or organizations that are the founders can be given a significant amount of StakeCoins to initiate the StakeCoin cryptocurrency and the distributed database system. The system can be configured such that the supply of cryptocurrency will not grow quickly, and will have some ultimate size limit. Each founding entity can have an incentive to participate as a member in the distributed database system and the implementation of the StakeCoin (e.g., implemented as a distributed database system that can be structured as a hashDAG with a consensus algorithm). Because there is no proof-of-work, it can be inexpensive to be a participating member running a node. The founding entities can be trustworthy enough that it is unlikely that any large fraction of them will collude to undermine the system, especially because that can destroy the value of their owned StakeCoins and the implemented distributed database system.

In some implementations, other members can join the distributed database system and other individuals or entities can buy StakeCoins, either directly from the founding entities, or on an exchange. The distributed database system can be configured to incentivize members to participate by paying small amounts of StakeCoins for participating. Over time, the system can become much more distributed, with the stake eventually spreading out, so that it becomes difficult for any individual or entity to corner the market, even if the founding entities collude to make an attack. At that point, the cryptocurrency can reach an independent value; the distributed database system can have an independent level of security; and the system can be open without permissioning requirements (e.g., without having to be invited to join by a founding member). Thus, saving recurrent computational costs demanded by systems implemented with alternative protocols, for example, systems implemented with proof-of-work protocols.

While described above with respect to using a hashDAG distributed database, any other suitable distributed database protocol can be used to implement Example System 21. For example, while the specific example numbers and stake may change, Example System 21 can be used to increase the security of any suitable distributed database system.

The systems described above are expected to create and/or achieve an efficient convergence mechanism for distributed consensus, with eventual consensus. Several theorems can be proved about this, as shown in the following.

Example Theorem 1: If event x precedes event y in the partial order, then in a given member's knowledge of the other members at a given time, each of the other members will have either received an indication of x before y, or will not yet have received an indication of y.

Proof: If event x precedes event y in the partial order, then x is an ancestor of y. When a member receives an indication of y for the first time, that member has either already received an indication of x earlier (in which case they heard of x before y), or it will be the case that the sync provides that member with both x and y (in which case they will hear of x before y during that sync, because the events received during a single sync are considered to have been received in an order consistent with ancestry relationships as described with respect to Example System 5). QED Example Theorem 2: For any given hashDAG, if x precedes y in the partial order, then x will precede y in the total order calculated for that hashDAG.

Proof: If x precedes y in the partial order, then by theorem 1:

for all i, rank(i,x)<rank(i,y)

where rank(i,x) is the rank assigned by member i to event x, which is 1 if x is the first event received by member i, 2 if it is second, and so on. Let med(x) be the median of the rank(i,x) over all i, and similarly for med(y).

For a given k, choose an i1 and i2 such that rank(i1,x) is the kth-smallest x rank, and rank(i2,y) is the kth-smallest y rank. Then:

rank(i1,x)<rank(i2,y)

This is because rank(i2,y) is greater than or equal to k of the y ranks, each of which is strictly greater than the corresponding x rank. Therefore, rank(i2,y) is strictly greater than at least k of the x ranks, and so is strictly greater than the kth-smallest x rank. This argument holds for any k.

Let n be the number of members (which is the number of i values). Then n must be either odd or even. If n is odd, then let k=(n+1)/2, and the kth-smallest rank will be the median. Therefore med(x)<med(y). If n is even, then when k=n/2, the kth-smallest x rank will be strictly less than the kth-smallest y rank, and also the (k+1)th-smallest x rank will be strictly less than the (k+1)th-smallest y rank. So the average of the two x ranks will be less than the average of the two y ranks. Therefore, med(x)<med(y). So in both cases, the median of x ranks is strictly less than the median of y ranks. So if the total order is defined by sorting the actions by median rank, then x will precede y in the total order. QED Example Theorem 3: If a "gossip period" is the amount of time for existing events to propagate through syncing to all the members, then:

after 1 gossip period: all members have received the events after 2 gossip periods: all members agree on the order of those events after 3 gossip periods: all members know that agreement has been reached after 4 gossip periods: all members obtain digital signatures from all other members, endorsing this consensus order.

Proof: Let S0 be the set of the events that have been created and/or defined by a given time T0. If every member will eventually sync with every other member infinitely often, then with probability 1 there will eventually be a time T1 at which the events in S0 have spread to every member, so that every member is aware of all of the events. That is the end of the first gossip period. Let S1 be the set of events that exist at time T1 and that didn't yet exist at T0. There will then with probability 1 eventually be a time T2 at which every member has received every event in set S1, which is those that existed at time T1. That is the end of the second gossip period. Similarly, T3 is when all events in S2, those existing by T2 but not before T1, have spread to all members. Note that each gossip period eventually ends with probability 1. On average, each will last as long as it takes to perform log 2(n) syncs, if there are n members.

By time T1, every member will have received every event in S0.

By time T2, a given member Alice will have received a record of each of the other members receiving every event in S0. Alice can therefore calculate the rank for every action in S0 for every member (which is the order in which that member received that action), and then sort the events by the median of the ranks. The resulting total order does not change, for the events in S0. That is because the resulting order is a function of the order in which each member first received an indication of each of those events, which does not change. It is possible, that Alice's calculated order will have some events from S1 interspersed among the S0 events. Those S1 events may still change where they fall within the sequence of S0 events. But the relative order of events in S0 will not change.

By time T3, Alice will have learned a total order on the union of S0 and S1, and the relative order of the events in that union will not change. Furthermore, she can find within this sequence the earliest event from S1, and can conclude that the sequence of the events prior to S1 will not change, not even by the insertion of new events outside of S0. Therefore, by time T3, Alice can determine that consensus has been achieved for the order of the events in history prior to the first S1 event. She can digitally sign a hash of the state (e.g., as captured by a database state variable defined by Alice) resulting from these events occurring in this order, and send out the signature as part of the next event she creates and/or defines.

By time T4, Alice will have received similar signatures from the other members. At that point she can simply keep that list of signatures along with the state they attest to, and she can discard the events she has stored prior to the first S1 event. QED The systems described herein describe a distributed database that achieves consensus quickly and securely. This can be a useful building block for many applications. For example, if the transactions describe a transfer of crypto currency from one crypto currency wallet to another, and if the state is simply a statement of the current amount in each wallet, then this system will constitute a crypto currency system that avoids the costly proof-of-work in existing systems. The automatic rule enforcement allows this to add features that are not common in current crypto currencies. For example, lost coins can be recovered, to avoid deflation, by enforcing a rule that if a wallet neither sends nor receives crypto currency for a certain period of time, then that wallet is deleted, and its value is distributed to the other, existing wallets, proportional to the amount they currently contain. In that way, the money supply would not grow or shrink, even if the private key for a wallet is lost.

Another example is a distributed game, which acts like a Massively Multiplayer Online (MMO) game being played on a server, yet achieves that without using a central server. The consensus can be achieved without any central server being in control.

Another example is a system for social media that is built on top of such a database. Because the transactions are digitally signed, and the members receive information about the other members, this provides security and convenience advantages over current systems. For example, an email system with strong anti-spam policies can be implemented, because emails could not have forged return addresses. Such a system could also become a unified social system, combining in a single, distributed database the functions currently done by email, tweets, texts, forums, wikis, and/or other social media.

Other applications can include more sophisticated cryptographic functions, such as group digital signatures, in which the group as a whole cooperates to sign a contract or document. This, and other forms of multiparty computation, can be usefully implemented using such a distributed consensus system.

Another example is a public ledger system. Anyone can pay to store some information in the system, paying a small amount of crypto currency (or real-world currency) per byte per year to store information in the system. These funds can then be automatically distributed to members who store that data, and to members who repeatedly sync to work to achieve consensus. It can automatically transfer to members a small amount of the crypto currency for each time that they sync.

These examples show that the distributed consensus database is useful as a component of many applications. Because the database does not use a costly proof-of-work, possibly using a cheaper proof-of-stake instead, the database can run with a full node running on smaller computers or even mobile and embedded devices.

While described above as an event containing a hash of two prior events (one self hash and one foreign hash), in other embodiments, a member can sync with two other members to create and/or define an event containing hashes of three prior events (one self hash and two foreign hashes). In still other embodiments, any number of event hashes of prior events from any number of members can be included within an event. In some embodiments, different events can include different numbers of hashes of prior events. For example, a first event can include two event hashes and a second event can include three event hashes.

While events are described above as including hashes (or cryptographic hash values) of prior events, in other embodiments, an event can be created and/or defined to include a pointer, an identifier, and/or any other suitable reference to the prior events. For example, an event can be created and/or defined to include a serial number associated with and used to identify a prior event, thus linking the events. In some embodiments, such a serial number can include, for example, an identifier (e.g., media access control (MAC) address, Internet Protocol (IP) address, an assigned address, and/or the like) associated with the member that created and/or defined the event and an order of the event defined by that member. For example, a member that has an identifier of 10 and the event is the 15th event created and/or defined by that member can assign an identifier of 1015 to that event. In other embodiments, any other suitable format can be used to assign identifiers for events.

In other embodiments, events can contain full cryptographic hashes, but only portions of those hashes are transmitted during syncing. For example, if Alice sends Bob an event containing a hash H, and J is the first 3 bytes of H, and Alice determines that of the events and hashes she has stored, H is the only hash starting with J, then she can send J instead of H during the sync. If Bob then determines that he has another hash starting with J, he can then reply to Alice to request the full H. In that way, hashes can be compressed during transmission.

While the example systems shown and described above are described with reference to other systems, in other embodiments any combination of the example systems and their associated functionalities can be implemented to create and/or define a distributed database. For example, Example System 1, Example System 2, and Example System 3 can be combined to create and/or define a distributed database. For another example, in some embodiments, Example System 10 can be implemented with Example System 1 but without Example System 9. For yet another example, Example System 7 can be combined and implemented with Example System 6. In still other embodiments, any other suitable combinations of the example systems can be implemented.

Figure 8:
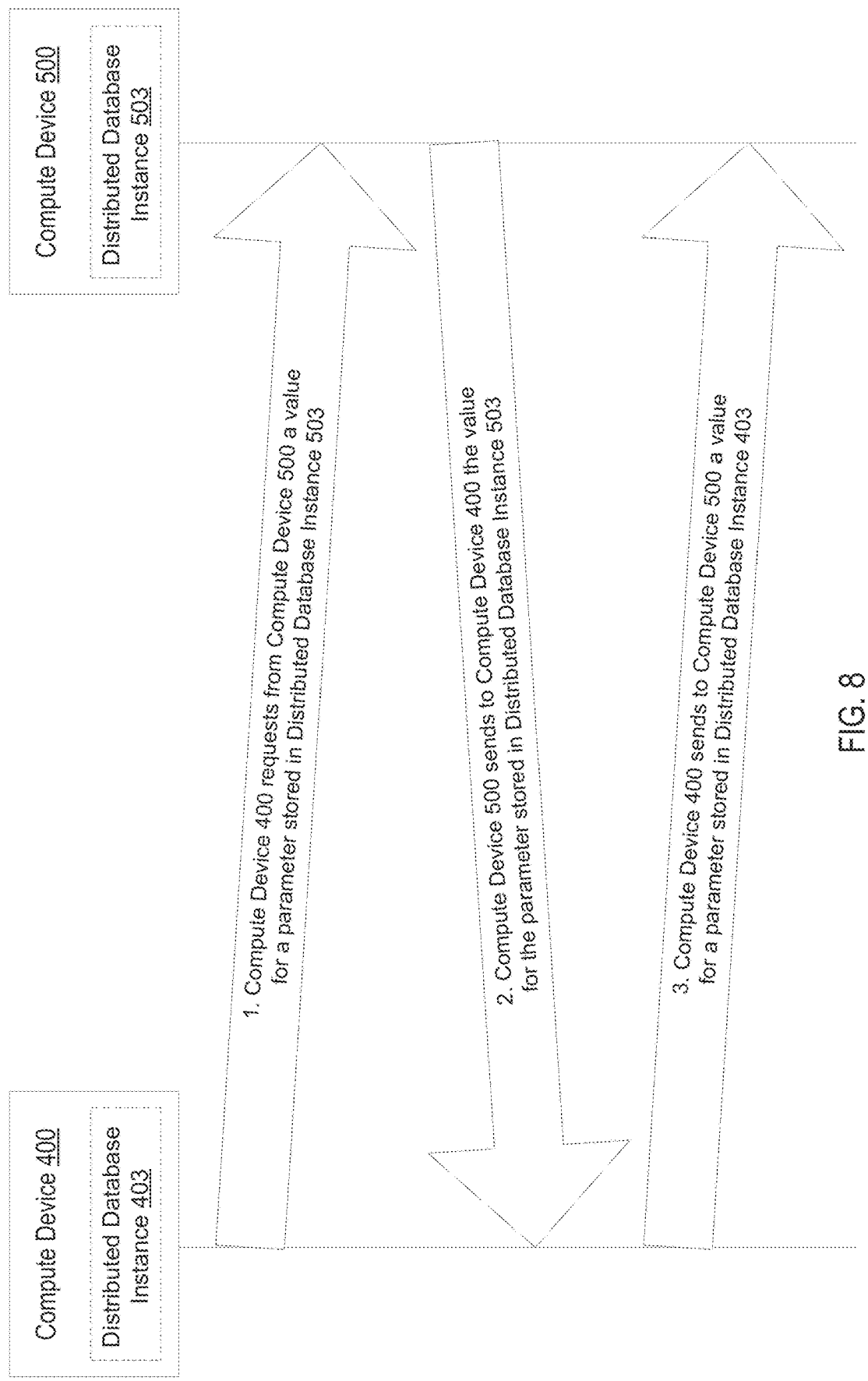
FIG. 8 is a flow diagram that illustrates a communication flow between a first compute device and a second compute device, according to an embodiment.

While described above as exchanging events to obtain convergence, in other embodiments, the distributed database instances can exchange values and/or vectors of values to obtain convergence as described with respect to FIGS. 8-13. Specifically, for example, FIG. 8 illustrates a communication flow between a first compute device 400 from a distributed database system (e.g., distributed database system 100) and a second compute device 500 from the distributed database system (e.g., distributed database system 100), according to an embodiment. In some embodiments, compute devices 400, 500 can be structurally and/or functionally similar to compute device 200 shown in FIG. 2. In some embodiments, compute device 400 and compute device 500 communicate with each other in a manner similar to how compute devices 110, 120, 130, 140 communicate with each other within the distributed database system 100, shown and described with respect to FIG. 1.

Similar to compute device 200, described with respect to FIG. 2, compute devices 400, 500 can each initially define a vector of values for a parameter, update the vector of values, select a value for the parameter based on the defined and/or updated vector of values for the parameter, and store (1) the defined and/or updated vector of values for the parameter and/or (2) the selected value for the parameter based on the defined and/or updated vector of values for the parameter. Each of the compute devices 400, 500 can initially define a vector of values for a parameter any number of ways. For example, each of compute devices 400, 500 can initially define a vector of values for a parameter by setting each value from the vector of values to equal the value initially stored in distributed database instances 403, 503, respectively. For another example, each of compute devices 400, 500 can initially define a vector of values for a parameter by setting each value from the vector of values to equal a random value. How the vector of values for a parameter is to be initially defined can be selected, for example, by an administrator of a distributed database system to which the compute devices 400, 500 belong, or individually or collectively by the users of the compute devices (e.g., the compute devices 400, 500) of the distributed database system.

The compute devices 400, 500 can also each store the vector of values for the parameter and/or the selected value for the parameter in distributed database instances 403, 503, respectively. Each of the distributed database instances 403, 503 can be implemented in a memory (not shown in FIG. 8) similar to memory 220, shown in FIG. 2.

In step 1, compute device 400 requests from compute device 500 a value for a parameter stored in distributed database instance 503 of compute device 500 (e.g., a value stored in a specific field of the distributed database instance 503). In some embodiments, compute device 500 can be chosen by compute device 400 from a set of compute devices belonging to a distributed database system. The compute device 500 can be chosen randomly, chosen based on a relationship with the compute device 400, based on proximity to the compute device 400, chosen based on an ordered list associated with the compute device 400, and/or the like. In some embodiments, because the compute device 500 can be chosen by the compute device 400 from the set of compute devices belonging to the distributed database system, the compute device 400 can select the compute device 500 multiple times in a row or may not select the compute device 500 for awhile. In other embodiments, an indication of the previously selected compute devices can be stored at the compute device 400. In such embodiments, the compute device 400 can wait a predetermined number of selections before being able to select again the compute device 500. As explained above, the distributed database instance 503 can be implemented in a memory of compute device 500.

In some embodiments, the request from compute device 400 can be a signal sent by a communication module of compute device 400 (not shown in FIG. 8). This signal can be carried by a network, such as network 105 (shown in FIG. 1), and received by a communication module of compute device 500. In some embodiments, each of the communication modules of compute devices 400, 500 can be implemented within a processor or memory. For example, the communication modules of compute devices 400, 500 can be similar to communication module 212 shown in FIG. 2.

After receiving, from compute device 400, the request for the value of the parameter stored in distributed database instance 503, the compute device 500 sends the value of the parameter stored in distributed database instance 503 to compute device 400 in step 2. In some embodiments, compute device 500 can retrieve the value of the parameter from memory, and send the value as a signal through a communication module of compute device 500 (not shown in FIG. 8). In some instance if the distributed database instance 503 does not already include a value for the parameter (e.g., the transaction has not yet been defined in distributed database instance 503), the distributed database instance 503 can request a value for the parameter from the compute device 403 (if not already provided in step 1) and store that value for the parameter in the distributed database instance 503. In some embodiments, the compute device 400 will then use this value as the value for the parameter in distributed database instance 503.

In step 3, compute device 400 sends to compute device 500 a value for a parameter stored in distributed database instance 403. In other embodiments, the value for the parameter stored in distributed database instance 403 (step 1) and the request for the value for the same parameter stored in distributed database instance 503 (step 3) can be sent as a single signal. In other embodiments, the value for the parameter stored in distributed database instance 403 can be sent in a signal different from the signal for the request for the value for the parameter stored in distributed database instance 503. In embodiments where the value for the parameter stored in distributed database instance 403 is sent in a signal different from signal for the request for the value for the parameter stored in distributed database instance 503, the value for the parameter stored in distributed database instance 403, the two signals can be sent in any order. In other words, either signal can be the sent before the other.

After the compute device 400 receives the value of the parameter sent from compute device 500 and/or the compute device 500 receives the value for the parameter sent from the compute device 400, in some embodiments, the compute device 400 and/or the compute device 500 can update the vector of values stored in distributed database instance 403 and/or the vector of values stored in distributed database instance 503, respectively. For example, compute devices 400, 500 can update the vector of values stored in distributed database instances 403, 503 to include the value of the parameter received by compute devices 400, 500, respectively. Compute devices 400, 500 can also update the value of the parameter stored in distributed database instance 403 and/or the value of the parameter stored in distributed database instance 503, respectively, based on the updated vector of values stored in distributed database instance 403 and/or the updated vector of values stored in distributed database instance 503, respectively.

Although the steps are labeled 1, 2, and 3 in FIG. 8 and in the discussion above, it should be understood steps 1, 2, and 3 can be performed in any order. For example, step 3 can be performed before steps 1 and 2. Furthermore, communication between compute device 400 and 500 is not limited to steps 1, 2, and 3 shown in FIG. 3, as described in detail herein. Moreover, after steps 1, 2 and 3 are complete, the compute device 400 can select another compute device from the set of compute devices within the distributed database system with which to exchange values (similar to steps 1, 2 and 3).

In some embodiments, data communicated between compute devices 400, 500 can include compressed data, encrypted data, digital signatures, cryptographic checksums, and/or the like. Furthermore, each of the compute devices 400, 500 can send data to the other compute device to acknowledge receipt of data previously sent by the other device. Each of the compute devices 400, 500 can also ignore data that has been repeatedly sent by the other device.

Each of compute devices 400, 500 can initially define a vector of values for a parameter, and store this vector of values for a parameter in distributed database instances 403, 503, respectively. FIGS. 9a-9c illustrate examples of vectors of values for a parameter. A vector can be any set of values for a parameter (e.g., a one dimensional array of values for a parameter, an array of values each having multiple parts, etc.). Three examples of vectors are provided in FIGS. 9a-9c for purposes of illustration. As shown, each of vectors 410, 420, 430 has five values for a particular parameter. It should, however, be understood that a vector of values can have any number of values. In some instances, the number of values included in a vector of values can be set by user, situation, randomly, etc.

A parameter can be any data object capable of taking on different values. For example, a parameter can be a binary vote, in which the vote value can be either "YES" or "NO" (or a binary "1" or "0"). As shown in FIG. 9a, the vector of values 410 is a vector having five binary votes, with values 411, 412, 413, 414, 415 being "YES," "NO," "NO," "YES," and "YES," respectively. For another example, a parameter can be a set of data elements. FIG. 9b shows an example where the parameter is a set of alphabet letters. As shown, the vector of values 420 has five sets of four alphabet letters, with values 421, 422, 423, 424, 425 being {A, B, C, D}, {A, B, C, E}, {A, B, C, F}, {A, B, F, G}, and {A, B, G, H}, respectively. For yet another example, a parameter can be a ranked and/or ordered set of data elements. FIG. 9c shows an example where the parameter is a ranked set of persons. As shown, vector of values 430 has five ranked sets of six persons, with values 431, 432, 433, 434, 435 being (1. Alice, 2. Bob, 3. Carol, 4. Dave, 5. Ed, 6. Frank),
(1. Bob, 2. Alice, 3. Carol, 4. Dave, 5. Ed, 6. Frank),
(1. Bob, 2. Alice, 3. Carol, 4. Dave, 5. Frank, 6. Ed),
(1. Alice, 2. Bob, 3. Carol, 4. Ed, 5. Dave, 6. Frank), and
(1. Alice, 2. Bob, 3. Ed, 4. Carol, 5. Dave, 6. Frank), respectively.

After defining a vector of values for a parameter, each of compute devices 400, 500 can select a value for the parameter based on the vector of values for the parameter. This selection can be performed according to any method and/or process (e.g., a rule or a set of rules). For example, the selection can be performed according to "majority rules," where the value for the parameter is selected to be the value that appears in more than 50% of the values included in the vector. To illustrate, vector of values 410 (shown in FIG. 9a) includes three "YES" values and two "NO" values. Under "majority rules," the value selected for the parameter based on the vector of values would be "YES," because "YES" appears in more than 50% of values 411, 412, 413, 414, 415 (of vector of values 410).

For another example, the selection can be performed according to "majority appearance," where the value for the parameter is selected to be a set of data elements, each data element appearing in more than 50% of the values included in the vector. To illustrate using FIG. 9b, data elements "A," "B," and "C" appear in more than 50% of the of values 421, 422, 423, 424, 425 of vector of values 420. Under "majority appearance," the value selected for the parameter based on the vector of values would be {A, B, C} because only these data elements (i.e., "A," "B," and "C") appear in three out of the five values of vector of values 420.

For yet another example, the selection can be performed according to "rank by median," where the value for the parameter is selected to be a ranked set of data elements (e.g., distinct data values within a value of a vector of values), the rank of each data element equal to the median rank of that data element across all values included in the vector. To illustrate, the median rank of each data element in FIG. 9c is calculated below:

| | | |
|---|---|---|
| Alice: | (1, 2, 2, 1, 1); | median rank = 1; |
| Bob: | (2, 1, 1, 2, 2); | median rank = 2; |
| Carol: | (3, 3, 3, 3, 4); | median rank = 3; |
| Dave: | (4, 4, 4, 5, 5); | median rank = 4; |
| Ed: | (5, 5, 6, 4, 3); | median rank = 5; |
| Frank: | (6, 6, 5, 6, 6); | median rank = 6. |

Thus, under "rank by median," the value for the ranked set of data elements calculated based on the vector of values 430 would be (1. Alice, 2. Bob, 3. Carol, 4. Dave, 5. Ed, 6. Frank). In some embodiments, if two or more data elements have a same median (e.g., a tie), the order can be determined by any suitable method (e.g., randomly, first indication of rank, last indication of rank, alphabetically and/or numerically, etc.).

For an additional example, the selection can be performed according to "Kemeny Young voting," where the value for the parameter is selected to be a ranked set of data elements, the rank being calculated to minimize a cost value. For example, Alice ranks before Bob in vectors of values 431, 434, 435, for a total of three out of the five vectors of values. Bob ranks before Alice in vectors of values 432 and 433, for a total of two out of the five vectors of values. The cost value for ranking Alice before Bob is ⅖ and the cost value for ranking Bob before Alice is ⅗. Thus, the cost value for Alice before Bob is lower, and Alice will be ranked before Bob under "Kemeny Young voting."

It should be understood that "majority rules," "majority appearance," "rank by median," and "Kemeny Young voting" are discussed as examples of methods and/or processes that can be used to select a value for the parameter based on the vector of values for the parameter. Any other method and/or process can also be used. For example, the value for the parameter can be selected to be the value that appears in more than x % of the values included in the vector, where x % can be any percentage (i.e., not limited to 50% as used in "majority rules"). The percentage (i.e., x %) can also vary across selections performed at different times, for example, in relation to a confidence value (discussed in detail herein).

In some embodiments, because a compute device can randomly select other compute devices with which to exchange values, a vector of values of a compute device may at any one time include multiple values from another single compute device. For example, if a vector size is five, a compute device may have randomly selected another compute device twice within the last five value exchange iterations. Accordingly, the value stored in the other compute device's distributed database instance would be included twice in the vector of five values for the requesting compute device.

FIGS. 10a-10d together illustrate, as an example, how a vector of values can be updated as one compute device communicates with another compute device. For example, compute device 400 can initially define a vector of values 510. In some embodiments, the vector of values 510 can be defined based on a value for a parameter stored in distributed database instance 403 at compute device 400. For example, when the vector of values 510 is first defined, each value from the vector of values 510 (i.e., each of values 511, 512, 513, 514, 515) can be set to equal the value for the parameter stored in distributed database instance 403. To illustrate, if the value for the parameter stored in distributed database instance 403, at the time the vector of values 510 is defined, is "YES," then each value from the vector of values 510 (i.e., each of values 511, 512, 513, 514, 515) would be set to "YES," as shown in FIG. 10a. When compute device 400 receives a value for the parameter stored in an instance of the distributed database of another compute device (e.g., distributed database instance 504 of compute device 500), compute device 400 can update the vector of values 510 to include the value for the parameter stored in distributed database instance 504. In some instances, the vector of values 510 can be updated according to First In, First Out (FIFO). For example, if the compute device 400 receives value 516 ("YES"), the compute device 400 can add value 516 to the vector of values 510 and delete value 511 from the vector of values 510, to define vector of values 520, as shown in FIG. 10b. For example, if at a later time compute device receives values 517, 518, compute device 400 can add values 517, 518 to the vector of values 510 and delete value 512, 513, respectively, from the vector of values 510, to define vector of values 530, 540, respectively. In other instances, the vector of values 510 can be updated according to schemes other than First In, First Out, such as Last In, First Out (LIFO).

After the compute device 400 updates the vector of values 510 to define vectors of values 520, 530, and/or 540, the compute device 400 can select a value for the parameter based on the vector of values 520, 530, and/or 540. This selection can be performed according to any method and/or process (e.g., a rule or a set of rules), as discussed above with respect to FIGS. 9a-9c.

In some instances, compute devices 400, 500 can belong to a distributed database system that stores information related to transactions involving financial instruments. For example, each of compute devices 400, 500 can store a binary vote (an example of a "value") on whether a particular stock is available for purchase (an example of a "parameter"). For example, the distributed database instance 403 of compute device 400 can store a value of "YES," indicating that the particular stock is indeed available for purchase. The distributed database instance 503 of compute device 500, on the other hand, can store a value of "NO," indicating that the particular stock is not available for purchase. In some instances, the compute device 400 can initially define a vector of binary votes based on the binary vote stored in the distributed database instance 403. For example, the compute device 400 can set each binary vote within the vector of binary votes to equal the binary vote stored in the distributed database instance 403. In this case, the compute device 400 can define a vector of binary votes similar to vector of values 510. At some later time, the compute device 400 can communicate with compute device 500, requesting compute device 500 to send its binary vote on whether the particular stock is available for purchase. Once compute device 400 receives the binary vote of compute device 500 (in this example, "NO," indicating that the particular stock is not available for purchase), the compute device 400 can update its vector of binary votes. For example, the updated vector of binary votes can be similar to vector of values 520. This can occur indefinitely, until a confidence value meets a predetermined criterion (described in further detail herein), periodically, and/or the like.

Figure 11:
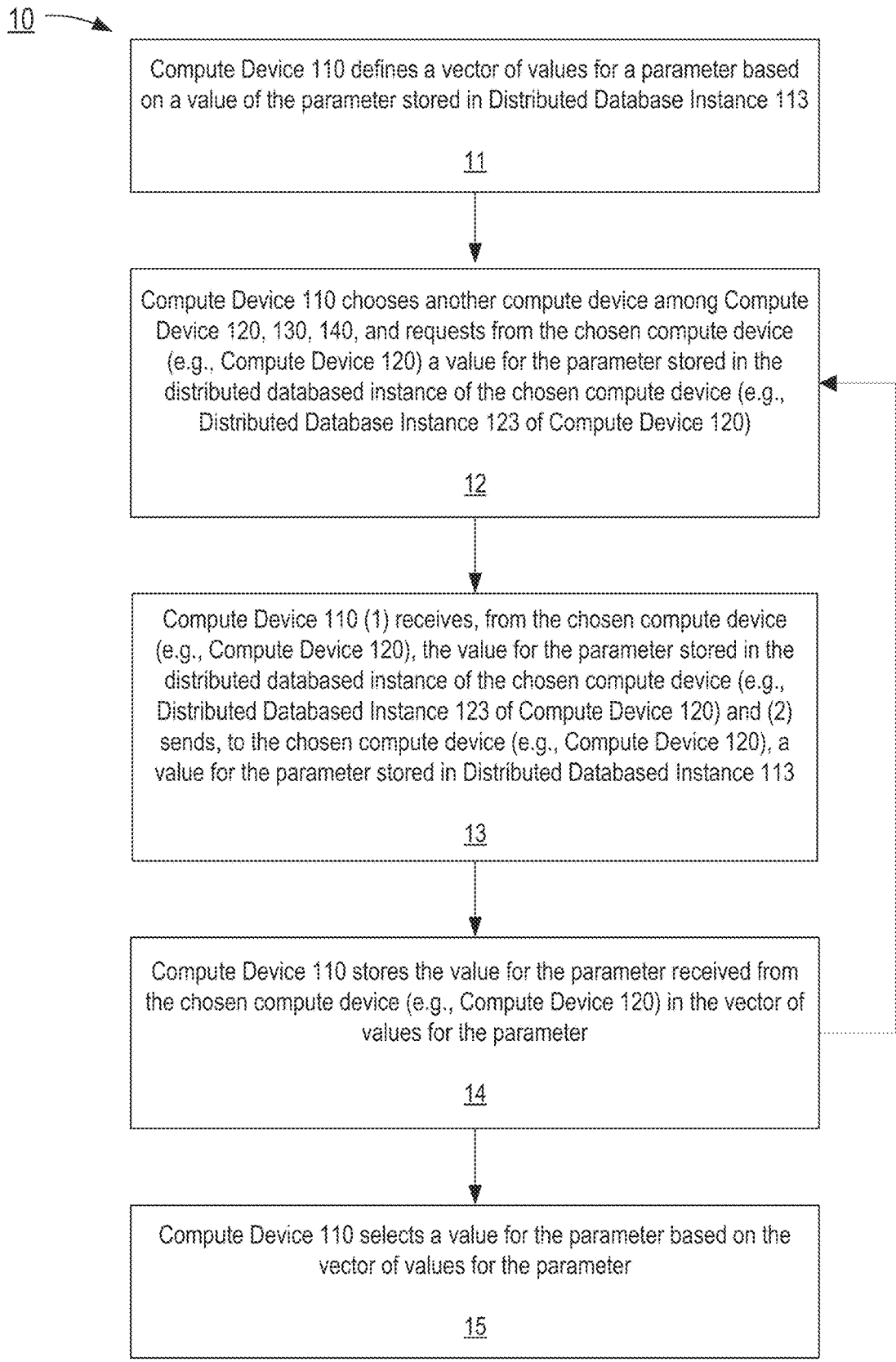
FIG. 11 is a flow chart that illustrates operation of a distributed database system, according to an embodiment.

FIG. 11 shows a flow chart 10 illustrating the steps performed by the compute device 110 within the distributed database system 100, according to an embodiment. In step 11, the compute device 110 defines a vector of values for a parameter based on a value of the parameter stored in the distributed database instance 113. In some embodiments, the compute device 110 can define a vector of values for the parameter based on a value for a parameter stored in the distributed database instance 113. In step 12, the compute device 110 chooses another compute device within the distributed database system 110 and requests from the chosen compute device a value for the parameter stored in the distributed database instance of the chosen compute device. For example, the compute device 110 can randomly choose the compute device 120 from among compute devices 120, 130, 140, and request from the compute device 120 a value for the parameter stored in the distributed database instance 123. In step 13, compute device 110 (1) receives, from the chosen compute device (e.g., the compute device 120), the value for the parameter stored in the distributed database instance of the chosen compute device (e.g., the distributed database instance 123) and (2) sends, to the chosen compute device (e.g., the compute device 120), a value for the parameter stored in the distributed database instance 113. In step 14, the compute device 110 stores the value for the parameter received from the chosen compute device (e.g., the compute device 120) in the vector of values for the parameter. In step 15, the compute device 110 selects a value for the parameter based on the vector of values for the parameter. This selection can be performed according to any method and/or process (e.g., a rule or a set of rules), as discussed above with respect to FIGS. 9a-9c. In some embodiments, the compute device 110 can repeat the selection of a value for the parameter at different times. The compute device 110 can also repeatedly cycle through steps 12 through 14 between each selection of a value for the parameter.

In some instances, the distributed database system 100 can store information related to transactions within a Massively Multiplayer Game (MMG). For example, each compute device belonging to the distributed database system 100 can store a ranked set of players (an example of a "value") on the order in which a particular item was possessed (an example of a "parameter"). For example, the distributed database instance 114 of the compute device 110 can store a ranked set of players (1. Alice, 2. Bob, 3. Carol, 4. Dave, 5. Ed, 6. Frank), similar to value 431, indicating that the possession of the particular item began with Alice, was then passed to Bob, was then passed to Carol, was then passed to Dave, was then passed to Ed, and was finally passed to Frank. The distributed database instance 124 of the compute device 120 can store a value of a ranked set of players similar to value 432: (1. Bob, 2. Alice, 3. Carol, 4. Dave, 5. Ed, 6. Frank); the distributed database instance 134 of the compute device 130 can store a value of a ranked set of players similar to value 433: (1. Bob, 2. Alice, 3. Carol, 4. Dave, 5. Frank, 6. Ed); the distributed database instance 144 of the compute device 140 can store a value of a ranked set of players similar to value 434: (1. Alice, 2. Bob, 3. Carol, 4. Ed, 5. Dave, 6. Frank); the distributed database instance of a fifth compute device (not shown in FIG. 1) can store a value of a ranked set of players similar to value 435: (1. Alice, 2. Bob, 3. Ed, 4. Carol, 5. Dave, 6. Frank).

After the compute device 110 defines a vector of ranked set of players, the compute device can receive values of ranked sets of players from the other compute devices of the distributed database system 100. For example, the compute device 110 can receive (1. Bob, 2. Alice, 3. Carol, 4. Dave, 5. Ed, 6. Frank) from the compute device 120; (1. Bob, 2. Alice, 3. Carol, 4. Dave, 5. Frank, 6. Ed) from the compute device 130; (1. Alice, 2. Bob, 3. Carol, 4. Ed, 5. Dave, 6. Frank) from the compute device 140; and (1. Alice, 2. Bob, 3. Ed, 4. Carol, 5. Dave, 6. Frank) from the fifth compute device (not shown in FIG. 1). As the compute device 110 receives values of ranked sets of players from the other compute devices, the compute device 110 can update its vector of ranked sets of players to include the values of ranked sets of players received from the other compute devices. For example, the vector of ranked sets of players stored in distributed database instance 114 of the compute device 110, after receiving the values of ranked sets listed above, can be updated to be similar to vector of values 430. After the vector of ranked sets of players has been updated to be similar to vector of values 430, the compute device 110 can select a ranked set of players based on the vector of ranked sets of players. For example, the selection can be performed according to "rank by median," as discussed above with respect to FIGS. 9a-9c. Under "rank by median," the compute device 110 would select (1. Alice, 2. Bob, 3. Carol, 4. Dave, 5. Ed, 6. Frank) based on the vector of ranked sets of players similar to vector of values 430.

In some instances, the compute device 110 does not receive the whole value from another compute device. In some instances, the compute device 110 can receive an identifier associated with portions of the whole value (also referred to as the composite value), such as a cryptographic hash value, rather than the portions themselves. To illustrate, the compute device 110, in some instances, does not receive (1. Alice, 2. Bob, 3. Carol, 4. Ed, 5. Dave, 6. Frank), the entire value 434, from the compute device 140, but receives only (4. Ed, 5. Dave, 6. Frank) from the compute device 140. In other words, the compute device 110 does not receive from the compute device 140 (1. Alice, 2. Bob, 3. Carol), certain portions of the value 434. Instead, the compute device 110 can receive from the compute device 140 a cryptographic hash value associated with these portions of the value 434, i.e., (1. Alice, 2. Bob, 3. Carol).

A cryptographic hash value uniquely represents the portions of the value that it is associated with. For example, a cryptographic hash representing (1. Alice, 2. Bob, 3. Carol) will be different from cryptographic hashes representing:
 (1. Alice);
 (2. Bob);
 (3. Carol);
 (1. Alice, 2. Bob);
 (2. Bob, 3. Carol);
 (1. Bob, 2. Alice, 3. Carol);
 (1. Carol, 2. Bob, 3. Alice);
 etc.

After the compute device 110 receives from the compute device 140 a cryptographic hash value associated with certain portions of the value 434, the compute device 110 can (1) generate a cryptographic hash value using the same portions of the value 431 stored in the distributed database instance 113 and (2) compare the generated cryptographic hash value with the received cryptographic hash value.

For example, the compute device 110 can receive from the compute device 140 a cryptographic hash value associated with the certain portions of the value 434, indicated by italics: (1. *Alice*, 2. *Bob*, 3. *Carol*, 4. Ed, 5. Dave, 6. Frank). The compute device can then generate a cryptographic hash value using the same portions of the value 431 (stored in the distributed database instance 113), indicated by italics: (1. *Alice*, 2. *Bob*, 3. *Carol*, 4. Dave, 5. Ed, 6. Frank). Because the italicized portions of value 434 and the italicized portions of value 431 are identical, the received cryptographic hash value (associated with the italicized portions of value 434) will also be identical to the generated cryptographic hash value (associated with italicized portions of value 431).

By comparing the generated cryptographic hash value with the received cryptographic hash value, the compute device 110 can determine whether to request from the compute device 140 the actual portions associated with the received cryptographic hash value. If the generated cryptographic hash value is identical to the received cryptographic hash value, the compute device 110 can determine that a copy identical to the actual portions associated with the received cryptographic hash value is already stored in the distributed database instance 113, and therefore the actual portions associated with the received cryptographic hash value is not needed from the compute device 140. On the other hand, if the generated cryptographic hash value is not identical to the received cryptographic hash value, the compute device 110 can request the actual portions associated with the received cryptographic hash value from the compute device 140.

Although the cryptographic hash values discussed above are associated with portions of single values, it should be understood that a cryptographic hash value can be associated with an entire single value and/or multiple values. For example, in some embodiments, a compute device (e.g., the compute device 140) can store a set of values in its distributed database instance (e.g., the distributed database instance 144). In such embodiments, after a predetermined time period since a value has been updated in the database instance, after a confidence value (discussed with respect to FIG. 13) for the value meets a predetermined criterion (e.g., reaches a predetermined threshold), after a specified amount of time since the transaction originated and/or based on any other suitable factors, that value can be included in a cryptographic hash value with other values when data is requested from and sent to another database instance. This reduces the number of specific values that are sent between database instances.

In some instances, for example, the set of values in the database can include a first set of values, including transactions between the year 2000 and the year 2010; a second set of values, including transactions between the year 2010 and the year 2013; a third set of values, including transactions between the year 2013 and the year 2014; and a fourth set of values, including transactions between 2014 and the present. Using this example, if the compute device 110 requests from the compute device 140 data stored in distributed database instance 144 of the compute device 140, in some embodiments, the compute device 140 can send to the compute device 110 (1) a first cryptographic hash value associated with the first set of values, (2) a second cryptographic hash value associated with the second set of values, (3) a third cryptographic hash value associated with the third set of values; and (4) each value from the fourth set of values. Criteria for when a value is added to a cryptographic hash can be set by an administrator, individual users, based on a number of values already in the database instance, and/or the like. Sending cryptographic hash values instead of each individual value reduces the number of individual values provided when exchanging values between database instances.

When a receiving compute device (e.g., compute device 400 in step 2 of FIG. 8) receives a cryptographic hash value (e.g., generated by compute device 500 based on values in distributed database instance 503), that compute device generates a cryptographic hash value using the same method and/or process and the values in its database instance (e.g., distributed database instance 403) for the parameters (e.g., transactions during a specified time period) used to generate the received cryptographic hash value. The receiving compute device can then compare the received cryptographic hash value with the generated cryptographic hash value. If the values do not match, the receiving compute device can request the individual values used to generate the received cryptographic hash from the sending compute device (e.g., compute device 500 in FIG. 8) and compare the individual values from the sending database instance (e.g., distributed database instance 503) with the individual values for those transactions in the received database instance (e.g., distributed database instance 403).

For example, if the receiving compute device receives the cryptographic hash value associated with the transactions between the year 2000 and the year 2010, the receiving compute device can generate a cryptographic hash using the values for the transactions between the year 2000 and the year 2010 stored in its database instance. If the received cryptographic hash value matches the locally-generated cryptographic hash value, the receiving compute device can assume that the values for the transactions between the year 2000 and the year 2010 are the same in both databases and no additional information is requested. If, however, the received cryptographic hash value does not match the locally-generated cryptographic hash value, the receiving compute device can request the individual values the sending compute device used to generate the received cryptographic hash value. The receiving compute device can then identify the discrepancy and update a vector of values for that individual value.

The cryptographic hash values can rely on any suitable process and/or hash function to combine multiple values and/or portions of a value into a single identifier. For example, any suitable number of values (e.g., transactions within a time period) can be used as inputs to a hash function and a hash value can be generated based on the hash function.

Although the above discussion uses cryptographic hash values as the identifier associated with values and/or portions of values, it should be understood that other identifiers used to represent multiple values and/or portions of values can be used. Examples of other identifiers include digital fingerprints, checksums, regular hash values, and/or the like.

Figure 12:
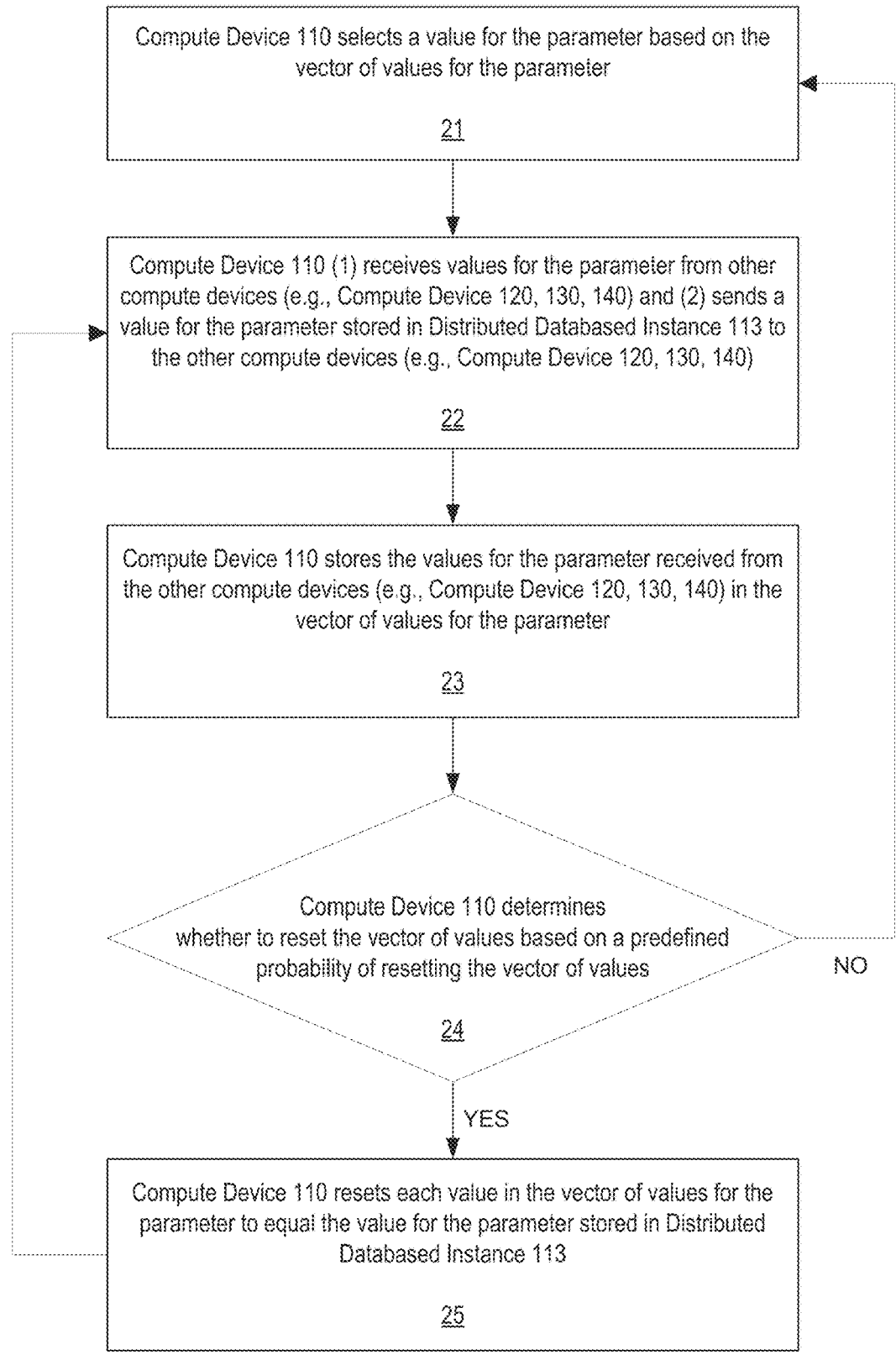
FIG. 12 is a flow chart that illustrates operation of a distributed database system, according to an embodiment.

FIG. 12 shows a flow chart (flow chart 20) illustrating steps performed by the compute device 110 within the distributed database system 100, according to an embodiment. In the embodiment illustrated by FIG. 12, the vector of values is reset based on a predefined probability. Similarly stated, each value in the vector of values can be reset to a value every so often and based on a probability. In step 21, the compute device 110 selects a value for the parameter based on the vector of values for the parameter, similar to step 15 illustrated in FIG. 11 and discussed above. In step 22, the compute device 110 receives values for the parameter from other compute devices (e.g., compute devices 120, 130, 140) and sends a value for the parameter stored in the distributed database instance 113 to the other compute devices (e.g., compute devices 120, 130, 140). For example, step 22 can include performing steps 12 and 13, illustrated in FIG. 11 and discussed above, for each of the other compute devices. In step 23, the compute device 110 stores the values for the parameter received from the other compute devices (e.g., compute devices 120, 130, 140) in the vector of values for the parameter, similar to step 14 illustrated in FIG. 11 and discussed above. In step 24, the compute device 110 determines whether to reset the vector of values based on a predefined probability of resetting the vector of values. In some instances, for example, there is a 10% probability that the compute device 110 will reset the vector of values for the parameter after each time the compute device 110 updates the vector of values for the parameter stored in distributed database instance 114. In such a scenario, the compute device 110, at step 24, would determine whether or not to reset, based on the 10% probability. The determination can be performed, in some instances, by processor 111 of the compute device 110.

If the compute device 110 determines to reset the vector of values based on the predefined probability, the compute device 110, at step 25, resets the vector of values. In some embodiments, the compute device 110 can reset each value in the vector of values for the parameter to equal the value for the parameter stored in the distributed database instance 113 at the time of reset. For example, if, just prior to reset, the vector of values is vector of values 430, and the value for the parameter stored in the distributed database instance 113 is (1. Alice, 2. Bob, 3. Carol, 4. Dave, 5. Ed, 6. Frank) (for example, under "rank by median"), then each value in the vector of values would be reset to equal (1. Alice, 2. Bob, 3. Carol, 4. Dave, 5. Ed, 6. Frank). In other words, each of values 431, 432, 433, 434, 435 of vector of values 430 would be reset to equal value 431. Resetting each value in the vector of values for the parameter to equal the value for the parameter stored in the distributed database instance at the time of reset, every so often and based on a probability, aids a distributed database system (to which a compute device belongs) in reaching consensus. Similarly stated, resetting facilitates agreement on the value for a parameter among the compute devices of a distributed database system.

For example, the distributed database instance 114 of the compute device 110 can store a ranked set of players (1. Alice, 2. Bob, 3. Carol, 4. Dave, 5. Ed, 6. Frank), similar to value 431, indicating that the possession of the particular item began with Alice, was then passed to Bob, was then passed to Carol, was then passed to Dave, was then passed to Ed, and was finally passed to Frank.

Figure 13:
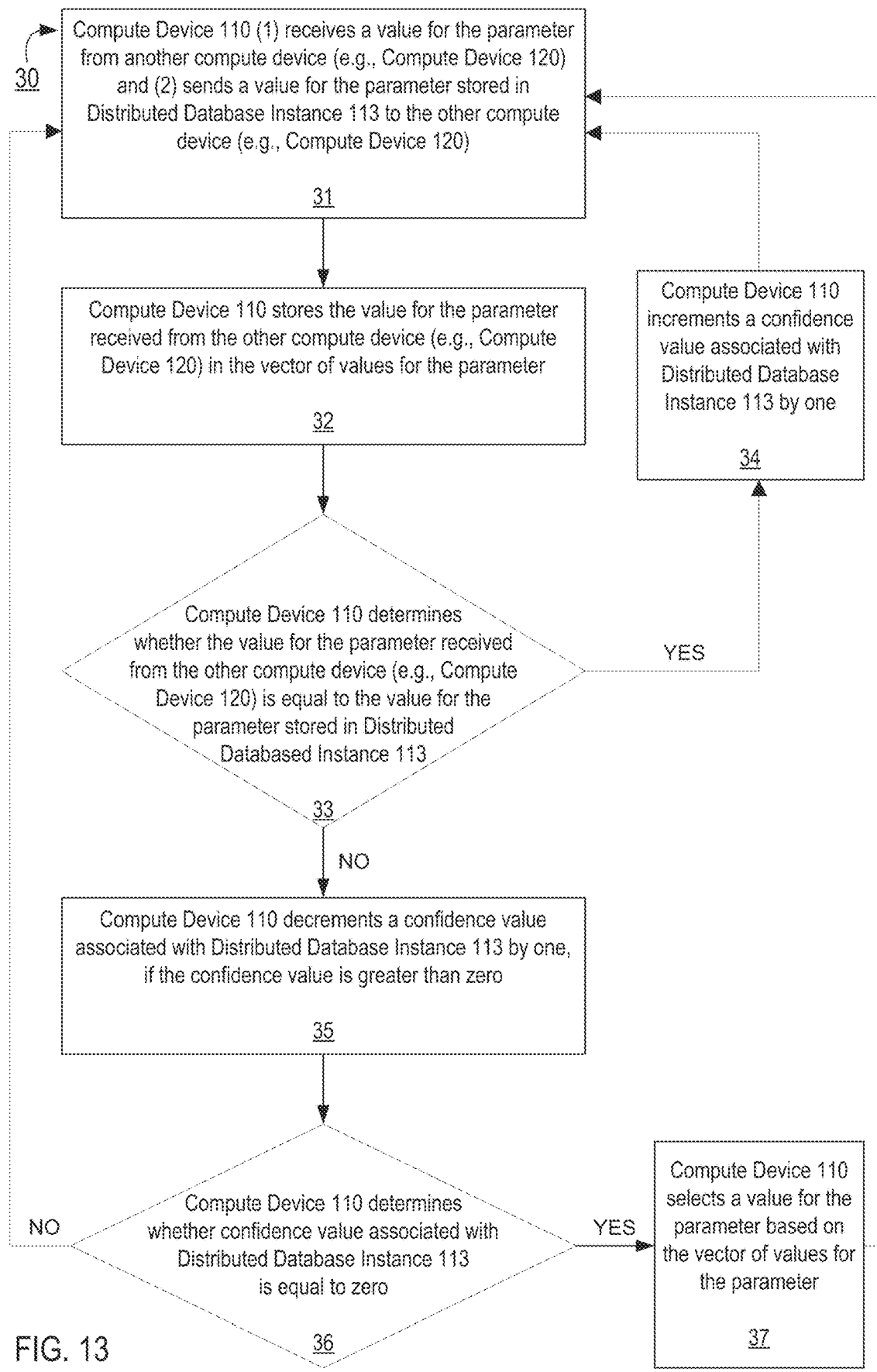
FIG. 13 is a flow chart that illustrates operation of a distributed database system, according to an embodiment.

FIG. 13 shows a flow chart (flow chart 30) illustrating steps performed by the compute device 110 within the distributed database system 100, according to an embodiment. In the embodiment illustrated by FIG. 13, selection for a value of the parameter based on a vector of values for the parameter occurs when a confidence value associated with an instance of the distributed database is zero. The confidence value can indicate the level of "consensus," or agreement, between the value of the parameter stored in the compute device 110 and the values of the parameter stored in the other compute devices (e.g., compute devices 120, 130, 140) of the distributed database system 100. In some embodiments, as described in detail herein, the confidence value is incremented (e.g., increased by one) each time a value for the parameter received from another compute device by the compute device 110 is equal to the value for the parameter stored in the compute device 110, and the confidence value is decremented (i.e., decreased by one) each time a value for the parameter received from another compute device by the compute device 110 does not equal to the value for the parameter stored in the compute device 110, if the confidence value is above zero.

In step 31, the compute device 110 receives a value for the parameter from another compute device (e.g., compute device 120) and sends a value for the parameter stored in distributed database instance 113 to the other compute device (e.g., compute device 120). For example, step 31 can include performing steps 12 and 13, illustrated in FIG. 11 and discussed above. In step 32, the compute device 110 stores the value for the parameter received from the other compute device (e.g., compute device 120) in the vector of values for the parameter, similar to step 14 illustrated in FIG. 11 and discussed above. In step 33, the compute device 110 determines whether the value for the parameter received from the other compute device (e.g., compute device 120) is equal to the value for the parameter stored in distributed database instance 113. If the value for the parameter received from the other compute device (e.g., compute device 120) is equal to the value for the parameter stored in distributed database instance 113, then the compute device 110, at step 34, increments a confidence value associated with distributed database instance 113 by one, and the process illustrated by flow chart 30 loops back to step 31. If the value for the parameter received from the other compute device (e.g., compute device 120) is not equal to the value for the parameter stored in distributed database instance 113, then the compute device 110, at step 35, decrements the confidence value associated with distributed database instance 113 by one, if the confidence value is greater than zero.

At step 36, the compute device 110 determines whether confidence value associated with distributed database instance 113 is equal to zero. If the confidence value is equal to zero, then the compute device, at step 37, selects a value for the parameter based on the vector of values for the parameter. This selection can be performed according to any method and/or process (e.g., a rule or a set of rules), as discussed above. If the confidence value is not equal to zero, then the process illustrated by flow chart 30 loops back to step 31.

As discussed above, confidence values are associated with distributed database instances. However, it should be understood that a confidence value can also be associated with a value of a vector stored in a distributed database instance and/or the compute device storing the value of a vector (e.g., within its distributed database instance) instead of, or in addition to, the distributed database instance.

The values related to the confidence values (e.g., thresholds, increment values, and decrement values) used with respect to FIG. 13 are for illustrative purposes only. It should be understood that other values related to the confidence values (e.g., thresholds, increment values, and decrement values) can be used. For example, increases and/or decreases to the confidence value, used in steps 34 and 35, respectively, can be any value. For another example, the confidence threshold of zero, used in steps 35 and 36, can also be any value. Furthermore, the values related to the confidence values (e.g., thresholds, increment values, and decrement values) can change during the course of operation, i.e., as the process illustrated by flow chart 30 loops.

In some embodiments, the confidence value can impact the communication flow between a first compute device from a distributed database system and a second compute device from the distributed database system, described above with respect to FIG. 8. For example, if the first compute device (e.g., compute device 110) has a high confidence value associated with its distributed database instance (e.g., distributed database instance 114), then the first compute device can request from the second compute device a smaller portion of a value for a parameter (and a cryptographic hash value associated with a larger portion of the value for the parameter) than the first compute device would otherwise request from the second compute device (e.g., if the first compute device has a low confidence value associated with its distributed database instance). The high confidence value can indicate that the value for the parameter stored in the first compute device is likely to be in agreement with values for the parameter stored in other compute devices from the distributed database system and as such, a cryptographic hash value is used to verify the agreement.

In some instances, the confidence value of the first compute device can increase to reach a threshold at which the first compute device determines that it no longer should request particular values, particular portions of values, and/or cryptographic hash values associated with particular values and/or particular portions of values from other compute devices from the distributed database system. For example, if a value's confidence value meets a specific criterion (e.g., reaches a threshold), the first compute device can determine that the value has converged and not further request to exchange this value with other devices. For another example, the value can be added to a cryptographic hash value based on its confidence value meeting a criterion. In such instances, the cryptographic hash value for the set of values can be sent instead of the individual value after the confidence value meets the criterion, as discussed in detail above. The exchange of fewer values, and/or smaller actual portions (of values) with cryptographic hash values associated with the remaining portions (of values) can facilitate efficient communication among compute devices of a distributed database system.

In some instances, as the confidence value for specific value of a parameter of a distributed database instance increases, the compute device associated with that distributed database instance can request to exchange values for that parameter with other compute devices less frequently. Similarly, in some instances, as the confidence value for a specific value of a parameter of a distributed database instance decreases, the compute device associated with that distributed database instance can request to exchange values for that parameter with other compute devices more frequently. Thus, the confidence value can be used to decrease a number of values exchanged between compute devices.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a memory storing an instance of a distributed directed acyclic graph (DAG) at a first compute device configured to be included within a plurality of compute devices that implements the distributed DAG via a network operatively coupled to the plurality of compute devices, each compute device from the plurality of compute devices being associated with a stake value indicative of an influence that compute device has on the distributed DAG; and
a processor of the first compute device operatively coupled to the memory, the processor configured to:
receive a first event from an instance of the distributed DAG at a second compute device from the plurality of compute devices,
define a second event based on the first event, the second event being linked to a set of events, each event from the set of events being defined by a different compute device from a first set of compute devices from the plurality of compute devices,
define an order value for a third event using a consensus protocol based on a collective stake value associated with the first set of compute devices meeting a first stake value criterion, the collective stake value associated with the first set of compute devices being a sum of stake values associated with each compute device from the first set of compute devices,
update a state value associated with the distributed DAG based on the order value,
receive an indication that a second set of compute devices from the plurality of compute devices has agreed to the state value, and
delete, from the instance of the distributed DAG at the first compute device, events used to calculate the state value when a collective stake value associated with the second set of compute devices meets a second stake value criterion.

2. The apparatus of claim 1, wherein the set of events are descendant events of the third event.

3. The apparatus of claim 1, wherein the second event includes a reference to the first event and a reference to a fourth event, the second event being linked to the set of events via the reference to the first event and the reference to the fourth event.

4. The apparatus of claim 1, wherein the stake value for each compute device from the plurality of compute devices is associated with an amount of cryptocurrency held by that compute device.

5. The apparatus of claim 1, wherein the first stake value criterion is based on a sum of stake values associated with each compute device from the plurality of compute devices.

6. A non-transitory processor-readable medium storing code representing instructions to be executed by a processor, the code comprising code to cause the processor to:
receive a first event from an instance of a distributed database at a first compute device from a plurality of compute devices that implements the distributed database via a network operatively coupled to the plurality of compute devices;
define, based on the first event and a second event, a third event, the third event being linked to a set of events;
define an order value for a fourth event using a consensus protocol based on a collective stake value associated with the set of events meeting a first stake value criterion;
update a state value associated with the distributed database based on the order value;
receive an indication that a set of compute devices from the plurality of compute devices has agreed to the state value; and
delete, from an instance of the distributed database at a second compute device from the plurality of compute devices, events used to calculate the state value when a collective stake value associated with the set of compute devices meets a second stake value criterion.

7. The non-transitory processor-readable medium of claim 6, further comprising code to cause the processor to:
calculate the collective stake value associated with the set of events based on a sum of a set of stake values, each stake value from the set of stake values associated with an instance of the distributed database that defined an event from the set of events.

8. The non-transitory processor-readable medium of claim 6, wherein the set of events is a first set of events, each event from the first set of events is (1) defined by a different instance of the distributed database and (2) identified by the third event, the code further comprising code to cause the processor to:

determine, based on the collective stake value associated with the first set of events meeting the first stake value criterion, a second set of events, each event from the second set of events being identified by the first set of events.

9. The non-transitory processor-readable medium of claim 6, wherein the set of events is a first set of events, the code further comprising code to cause the processor to:

calculate a first round number for the third event based on a determination that a sum of stake values associated with each event from the first set of events meets the first stake value criterion, each event from the first set of events being (1) identified by a second set of events and (2) associated with a second round number less than the first round number.

10. The non-transitory processor-readable medium of claim 6, wherein the set of events is a first set of events, the first set of events including the third event, the code further comprising code to cause the processor to:

determine, based on the collective stake value associated with the first set of events meeting the first stake value criterion, a second set of events, each event from the second set of events is identified by the first set of events, each event from the first set of events being defined by a different instance of the distributed database.

11. The non-transitory processor-readable medium of claim 6, wherein the code to cause the processor to define the order value for the fourth event includes code to cause the processor to determine a received round number associated with the fourth event based on the fourth event being identified by a subset of events from the set of events such that the collective stake value associated with the set of events meets the first stake value criterion.

12. The non-transitory processor-readable medium of claim 6, wherein the set of events is a subset of events from a first set of events, the code further comprising code to cause the processor to:

determine the subset of events based on a value associated with each event from the subset of events being equal to a value associated with the remaining events from the subset of events, the value associated with each event from the subset of events being (1) associated with a fifth event and (2) based on a value for each event from a second set of events that that event from the subset of events can identify, the first stake value criterion being met by the collective stake value associated with the subset of events when the collective stake value associated with the subset of events is greater than a threshold based on the collective stake value associated with the first set of events.

13. The non-transitory processor-readable medium of claim 6, wherein the first stake value criterion is based on a predefined ratio associated with a collective stake value of the distributed database, the code further comprising code to cause the processor to:

associate the round number of a fifth event as a received round number for the fourth event based on the first stake value criterion being met by the collective stake value associated with the set of events such that the fifth event is designated as a famous event.

14. The non-transitory processor-readable medium of claim 6, wherein the set of events is a subset of events from a plurality of events, the code further comprising code to cause the processor to:

determine a value for the third event based on a value for each event from the subset of events, the third event having a round number greater than a round number of each event from the plurality of events, the collective stake value associated with the subset of events being greater than a collective stake value associated with the remaining events from the plurality of events, the first stake value criterion being met by the collective stake value associated with the subset of events when the collective stake value associated with the subset of events is less than a threshold, the threshold being based on a collective stake value associated with the distributed database.

15. The non-transitory processor-readable medium of claim 6, wherein the set of events is a subset of events from a plurality of events, the code further comprising code to cause the processor to:

determine a value for the third event as a pseudorandom value based on the first stake value criterion associated with the subset of events being met, the third event having a round number greater than a round number of each event from the plurality of events, the collective stake value associated with the subset of events being greater than a collective stake value associated with the remaining events from the plurality of events, the first stake value criterion being met by the collective stake value associated with the subset of events when the collective stake value associated with the subset of events is less than a threshold, the threshold being based on a collective stake value associated with the distributed database.

16. The non-transitory processor-readable medium of claim 6, wherein the set of events is a subset of events from a first set of events, the code further comprising code to cause the processor to:

identify the subset of events based on a value associated with each event from the subset of events being equal to a value associated with the remaining events from the subset of events, the value associated with each event from the subset of events being (1) associated with a fifth event and (2) based on a value for each event from a second set of events that that event from the subset of events can identify, the first set of events having a round number greater than a round number of the second set of events, the collective stake value associated with the subset of events being greater than a collective stake value associated with the remaining events from the first set of events, the first stake value criterion being met by the collective stake value associated with the subset of events when the collective stake value associated with the subset of events is less than a threshold, the threshold being based on the collective stake value of the first set of events; and identify, based on the first stake value criterion being met by the subset of events, a third set of events having a collective stake value used to determine the order value for the fourth event, the third set of events having a round number greater than the round number of the first set of events, a value for each event from the third set of events being based on a value associated with each event from the first set of events that that event from the third set of events can identify.

17. The non-transitory processor-readable medium of claim 6, wherein each event from the set of events is (1) defined by a different instance of the distributed database and (2) identified by the third event,
the order value for the fourth event is further based on a pseudorandom determination associated with a digital signature of the third event.

18. The non-transitory processor-readable medium of claim 6, wherein the first stake value criterion is based at least in part on a sum of a set of stake values associated with a cryptocurrency, each stake value from the set of stake values associated with an amount of cryptocurrency held by a different instance of the distributed database.

19. The non-transitory processor-readable medium of claim 6, wherein the first stake value criterion is met when the collective stake value associated with the set of events is greater than a predetermined threshold, the predetermined threshold based at least in part on a collective stake value of the distributed database.

20. An apparatus, comprising:
a memory including an instance of a distributed database at a first compute device configured to be included within a plurality of compute devices that implements the distributed database via a network operatively coupled to the plurality of compute devices; and
a processor operatively coupled to the instance of the distributed database,
the processor configured to define, at a first time, a first event linked to a first plurality of events,
the processor configured to receive, at a second time after the first time and from a second compute device from the plurality of compute devices, a signal representing a second event (1) defined by the second compute device and (2) linked to a second plurality of events,
the processor configured to identify an order associated with a third plurality of events using a consensus protocol based at least on a stake value associated with each compute device from the plurality of compute devices, each event from the third plurality of events being from at least one of the first plurality of events or the second plurality of events,
the processor configured to update a state value associated with the distributed database based on the order associated with the third plurality of events,
the processor configured to receive an indication that a set of compute devices from the plurality of compute devices has agreed to the state value,
the processor configured to delete, from the instance of the distributed database, events used to calculate the state value when a collective stake value associated with the set of compute devices meets a stake value criterion.

21. The apparatus of claim 20, wherein the stake value associated with each compute device from the plurality of compute devices is proportional to an amount of cryptocurrency associated with an instance of the distributed database at that compute device from the plurality of compute devices.

22. The apparatus of claim 20, wherein each event from the third plurality of events is associated with a value for each attribute from a set of attributes,
the value for a first attribute from the set of attributes for each event from the third plurality of events including a first value based on whether a relationship between that event and a collective stake value of a first set of events linked to that event satisfies a criterion,
each event from the first set of events being (1) an ancestor of that event from the third plurality of events and (2) associated with a same first common attribute as the remaining events from the first set of events, the first common attribute indicative of an initial instance that a first event defined by each compute device from the plurality of compute devices is associated with a particular value,
the value for a second attribute from the set of attributes including a numeric value based on a relationship between that event from the third plurality of events and a second set of events linked to that event from the third plurality of events,
each event from the second set of events being a descendant of the event from the third plurality of events and associated with a second common attribute as the remaining events from the second set of events.

23. The apparatus of claim 20, wherein:
each event from the third plurality of events is associated with a value for each attribute from a set of attributes,
the value for an attribute from the set of attributes for each event from the third plurality of events includes a first value based on whether a relationship between that event and a collective stake value of a set of events linked to that event satisfies a criterion,
the criterion is based on a threshold value defined based on a collective stake value of the plurality of compute devices.

* * * * *